（12）United States Patent
Shibata et al.

(10) Patent No.: US 9,975,076 B2
(45) Date of Patent: *May 22, 2018

(54) HONEYCOMB FILTER

(71) Applicant: IBIDEN CO., LTD., Ogaki-shi (JP)

(72) Inventors: Toshiaki Shibata, Ibi-gun (JP); Yuki Miwa, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 627 days.

This patent is subject to a terminal disclaimer.

(21) Appl. No.: 14/565,439

(22) Filed: Dec. 10, 2014

(65) Prior Publication Data

US 2015/0096275 A1    Apr. 9, 2015

Related U.S. Application Data

(63) Continuation of application No. PCT/JP2013/066238, filed on Jun. 12, 2013.

(30) Foreign Application Priority Data

Jun. 15, 2012  (JP) .................... PCT/JP2012/065391

(51) Int. Cl.
*B01D 50/00* (2006.01)
*B01D 39/06* (2006.01)
(Continued)

(52) U.S. Cl.
CPC ......... *B01D 46/10* (2013.01); *B01D 39/2068* (2013.01); *B01D 46/247* (2013.01);
(Continued)

(58) Field of Classification Search
CPC .............. B01D 53/869; B01D 46/2455; B01D 46/2466; B01D 46/247; B01D 2046/2496;
(Continued)

(56) References Cited

U.S. PATENT DOCUMENTS 4,416,676 A    11/1983  Montierth
4,417,908 A    11/1983  Pitcher, Jr.
(Continued)

FOREIGN PATENT DOCUMENTS

DE    102008042372    4/2009
EP       1493479       1/2005
(Continued)

OTHER PUBLICATIONS

Office Action with Form PTO-892 Notice of References Cited issued by the United States Patent and Trademark Office for the co-pending U.S. Appl. No. 14/448,989, dated May 9, 2016.
(Continued)

*Primary Examiner* — Amber R Orlando
(74) *Attorney, Agent, or Firm* — Mori & Ward, LLP

(57) ABSTRACT

A honeycomb filter includes a plurality of honeycomb fired bodies and adhesive layers. Each of the plurality of honeycomb fired bodies includes a plurality of cells, porous cell walls, and an outer wall. The plurality of cells includes exhaust gas introduction cells and exhaust gas emission cells. The exhaust gas introduction cells and the exhaust gas emission cells each have a uniform cross-sectional shape throughout from the exhaust gas inlet side to the exhaust gas outlet side excluding a plugged portion in a cross section perpendicular to a longitudinal direction of the plurality of cells. Each of the exhaust gas emission cells is adjacently surrounded fully by the exhaust gas introduction cells across the porous cell walls. The plurality of cells includes outer cells which are adjacent to the outer wall and which include the exhaust gas introduction cells.

26 Claims, 19 Drawing Sheets

(51) Int. Cl.
  *B01D 39/14* (2006.01)
  *B01D 39/20* (2006.01)
  *B01D 46/10* (2006.01)
  *F01N 3/022* (2006.01)
  *B01D 46/24* (2006.01)

(52) U.S. Cl.
  CPC ........ *F01N 3/0222* (2013.01); *F01N 2330/34* (2013.01); *F01N 2330/48* (2013.01); *Y02T 10/20* (2013.01)

(58) Field of Classification Search
  CPC ............... F01N 3/0222; F01N 2330/06; F01N 2330/34; F01N 2340/00
  See application file for complete search history.

(56) References Cited

U.S. PATENT DOCUMENTS

| | | | |
|---|---|---|---|
| 4,420,316 | A | 12/1983 | Frost et al. |
| 4,519,820 | A | 5/1985 | Oyobe et al. |
| 5,962,103 | A | 10/1999 | Luthra et al. |
| 6,395,370 | B1 | 5/2002 | Noda et al. |
| 6,669,751 | B1 | 12/2003 | Ohno et al. |
| 7,208,214 | B2 | 4/2007 | Ichikawa |
| 7,247,184 | B2 | 7/2007 | Frost |
| 7,452,591 | B2 | 11/2008 | Tabuchi et al. |
| 7,556,782 | B2 | 7/2009 | Ohno et al. |
| 7,585,471 | B2 | 9/2009 | Oshimi |
| 7,601,194 | B2 | 10/2009 | Beall et al. |
| 7,892,308 | B2 | 2/2011 | Mizutani |
| 8,062,603 | B2 | 11/2011 | Komori et al. |
| 8,283,019 | B2 | 10/2012 | Ohno et al. |
| 9,080,479 | B2 | 7/2015 | Sakashita et al. |
| 9,080,484 | B2 | 7/2015 | Miyairi |
| 9,289,711 | B2 | 3/2016 | Hirakawa et al. |
| 9,394,814 | B2 * | 7/2016 | Shibata ................. F01N 3/0222 |
| 9,650,928 | B2 * | 5/2017 | Shibata ................. F01N 3/0222 |
| 9,650,929 | B2 * | 5/2017 | Shibata ................. F01N 3/0222 |
| 9,702,283 | B2 * | 7/2017 | Shibata ............... B01D 46/247 |
| 9,707,516 | B2 * | 7/2017 | Goto .................... B01D 53/869 |
| 2003/0021949 | A1 | 1/2003 | Tomita et al. |
| 2003/0041574 | A1 | 3/2003 | Noguchi et al. |
| 2004/0161373 | A1 | 8/2004 | Ichikawa et al. |
| 2004/0170803 | A1 | 9/2004 | Ichikawa |
| 2005/0011174 | A1 | 1/2005 | Hong et al. |
| 2005/0016141 | A1 | 1/2005 | Hong et al. |
| 2005/0076627 | A1 | 4/2005 | Itou et al. |
| 2005/0102987 | A1 | 5/2005 | Kudo |
| 2006/0029768 | A1 | 2/2006 | Furukawa et al. |
| 2006/0159602 | A1 | 7/2006 | Ohno et al. |
| 2007/0184240 | A1 | 8/2007 | Ichikawa |
| 2007/0231535 | A1 | 10/2007 | Mizutani |
| 2008/0190083 | A1 | 8/2008 | Oshimi |
| 2008/0311340 | A1 | 12/2008 | Kasai et al. |
| 2009/0205301 | A1 | 8/2009 | Komori et al. |
| 2009/0246453 | A1 | 10/2009 | Yamaguchi |
| 2010/0058725 | A1 | 3/2010 | Konomi et al. |
| 2010/0216634 | A1 | 8/2010 | Ohno et al. |
| 2010/0218473 | A1 | 9/2010 | Kikuchi et al. |
| 2010/0300291 | A1 | 12/2010 | Vincent et al. |
| 2011/0085953 | A1 | 4/2011 | Ogyu et al. |
| 2011/0224069 | A1 | 9/2011 | Goto et al. |
| 2011/0229684 | A1 | 9/2011 | Naruse et al. |
| 2012/0093697 | A1 | 4/2012 | Iwakura et al. |
| 2012/0251402 | A1 | 10/2012 | Goto et al. |
| 2013/0316129 | A1 | 11/2013 | Yabuki et al. |
| 2015/0013284 | A1 | 1/2015 | Ota et al. |
| 2015/0072104 | A1 | 3/2015 | Iwasaki et al. |

FOREIGN PATENT DOCUMENTS

| | | |
|---|---|---|
| EP | 2862611 | 4/2015 |
| JP | 58-196820 | 11/1983 |
| JP | 2004-000896 | 1/2004 |
| JP | 2005-125237 | 5/2005 |
| JP | 2009-095827 | 5/2009 |
| JP | 2009-537741 | 10/2009 |
| WO | WO 2004/024293 | 3/2004 |
| WO | WO 2004/024294 | 3/2004 |
| WO | WO 2009/112384 | 9/2009 |
| WO | WO 2010/149908 | 12/2010 |
| WO | WO 2013/150970 | 10/2013 |

OTHER PUBLICATIONS

Office Action with Form PTO-892 Notice of References Cited issued by the United States Patent and Trademark Office for the co-pending U.S. Appl. No. 14/448,882, dated Sep. 21, 2016.
Office Action with Form PTO-892 Notice of References Cited issued by the United States Patent and Trademark Office for the co-pending U.S. Appl. No. 14/448,951, dated Oct. 18, 2016.
Office Action with Form PTO-892 Notice of References Cited issued by the United States Patent and Trademark Office for the co-pending U.S. Appl. No. 14/449,008, dated Sep. 22, 2016.
Office Action with Form PTO-892 Notice of References Cited issued by the United States Patent and Trademark Office for the co-pending U.S. Appl. No. 14/449,023, dated Oct. 18, 2016.
Notice of Allowance issued by the United States Patent and Trademark Office for the co-pending U.S. Appl. No. 14/448,989, dated Sep. 12, 2016.
Office Action issued by the United States Patent and Trademark Office for the co-pending U.S. Appl. No. 14/565,438, dated May 15, 2017.
Notice of Allowance issued by the United States Patent and Trademark Office for the co-pending U.S. Appl. No. 14/449,008, dated Apr. 14, 2017.
Notice of Allowance issued by the United States Patent and Trademark Office for the co-pending U.S. Appl. No. 14/448,882, dated Apr. 13, 2017.
Office Action issued by the United States Patent and Trademark Office for the co-pending U.S. Appl. No. 14/449,023, dated Feb. 22, 2017.
Office Action issued by the United States Patent and Trademark Office for the co-pending U.S. Appl. No. 14/448,951, dated Mar. 1, 2017.
Notice of Allowance issued by the United States Patent and Trademark Office for the co-pending U.S. Appl. No. 14/565,438, dated Sep. 1, 2017.
Office Action with Form PTO-892 Notice of References Cited issued by the United States Patent and Trademark Office for the co-pending U.S. Appl. No. 14/645,425, dated Dec. 5, 2017.

* cited by examiner

A-A line cross-sectional view

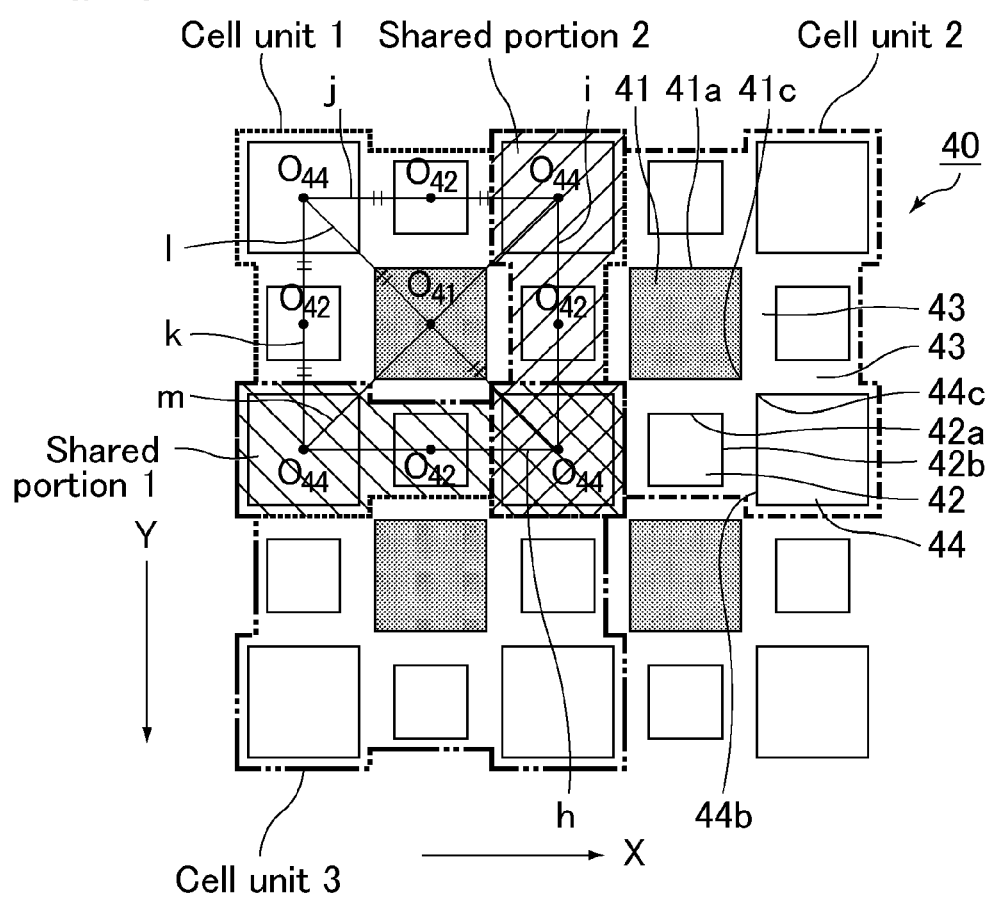

BACKGROUND ART

HONEYCOMB FILTER

CROSS-REFERENCE TO RELATED APPLICATIONS

The present application is a continuation application of International Application No. PCT/JP2013/066238, filed Jun. 12, 2013, which claims priority to International Application No. PCT/JP2012/065391, filed Jun. 15, 2012. The contents of these International Applications are incorporated herein by reference in their entirety.

BACKGROUND OF THE INVENTION

Technical Field

The present invention relates to a honeycomb filter.

Background Art

Exhaust gas discharged from an internal combustion engine such as a diesel engine contains particulates such as soot (hereinafter also referred to as PM). The PM adversely affects the environment and human bodies, which has been a recent issue. Since exhaust gas contains toxic gas components such as CO, HC, and NOx, there has also been a concern about the effect of the toxic gas components on the environment and human bodies.

To overcome this problem, various filters including a honeycomb structure (a honeycomb filter) formed of porous ceramics such as cordierite and silicon carbide have been proposed as exhaust gas purifying apparatuses. Such a honeycomb filter is connected to an internal combustion engine to capture PM in exhaust gas or to convert toxic gas components such as CO, HC, and NOx in the exhaust gas into nontoxic gas.

Regarding those honeycomb filters, in order to enhance the fuel economy of an internal combustion engine and eliminate troubles due to an increase in the pressure loss during operation, various honeycomb filters have been proposed including those in which the initial pressure loss is low and those in which the rate of increase in the pressure loss is low when accumulation of PM reaches a certain amount.

Such filters are disclosed, for example, in WO 2004/024294 and U.S. Pat. No. 4,417,908.

FIG. 17A is a perspective view schematically illustrating a honeycomb filter disclosed in WO 2004/024294. FIG. 17B is a perspective view schematically illustrating a honeycomb fired body forming the honeycomb filter.

As shown in FIGS. 17A and 17B, WO 2004/024294 discloses a honeycomb filter 90 that includes a plurality of honeycomb fired bodies 100 combined with one another via adhesive layers 105 therebetween, and a peripheral coat layer 106 formed on the periphery of the combined honeycomb fired bodies, wherein the honeycomb fired bodies 100 each include exhaust gas introduction cells 102 each having an open end at an exhaust gas inlet side and a plugged end at an exhaust gas outlet side, and exhaust gas emission cells 101 each having an open end at the exhaust gas outlet side and a plugged end at the exhaust gas inlet side; the exhaust gas emission cells 101 each have a square cross section perpendicular to the longitudinal direction of the cells; the exhaust gas introduction cells 102 each have an octagonal cross section perpendicular to the longitudinal direction of the cells; and the exhaust gas emission cells 101 and the exhaust gas introduction cells 102 are arranged alternately (in a grid-like pattern).

Hereinafter, in the explanation of the embodiments of the present invention and background arts, a cell having an open end at an exhaust gas outlet side and a plugged end at an exhaust gas inlet side is simply referred to as an exhaust gas emission cell. Additionally, a cell having an open end at an exhaust gas inlet side and a plugged end at an exhaust gas outlet side is simply referred to as an exhaust gas introduction cell, a first exhaust gas introduction cell, or a second exhaust gas introduction cell.

The simple term "cell" refers to both the exhaust gas emission cell and exhaust gas introduction cell.

Moreover, the cross section perpendicular to the longitudinal direction of the cells such as exhaust gas introduction cells, exhaust gas emission cells, or the like is simply referred to as the cross section of the exhaust gas introduction cells, the cross section of the exhaust gas emission cells, or the like.

FIG. 18A is a perspective view schematically illustrating a honeycomb filter disclosed in U.S. Pat. No. 4,417,908. FIG. 18B is a view schematically illustrating an end face of the honeycomb filter.

U.S. Pat. No. 4,417,908 discloses a honeycomb filter 110 in which all the cells have the same square cross-sectional shape as shown in FIGS. 18A and 18B, and exhaust gas emission cells 111 each having an open end at an exhaust gas outlet side and a plugged end at an exhaust gas inlet side are adjacently surrounded fully by exhaust gas introduction cells 112 and 114 each having an open end at the exhaust gas inlet side and a plugged end at the exhaust gas outlet side across cell walls 113. In the cross-sectional shape, a side of the exhaust gas introduction cell 112 faces the exhaust gas emission cell 111 across the cell wall 113, while the exhaust gas introduction cell 114 is arranged such that the corners thereof face the corners of the exhaust gas emission cells 111. Thus, none of the sides forming the cross section of each exhaust gas introduction cell 114 faces the exhaust gas emission cell 111.

SUMMARY OF THE INVENTION

According to one aspect of the present invention, a honeycomb filter includes a plurality of honeycomb fired bodies and adhesive layers provided between the plurality of honeycomb fired bodies to combine the plurality of honeycomb fired bodies with one another. Each of the plurality of honeycomb fired bodies includes a plurality of cells, porous cell walls, and an outer wall. The plurality of cells defines exhaust gas passages. The plurality of cells includes exhaust gas introduction cells and exhaust gas emission cells. The exhaust gas introduction cells each have an open end at an exhaust gas inlet side and a plugged end at an exhaust gas outlet side. The exhaust gas emission cells each have an open end at the exhaust gas outlet side and a plugged end at the exhaust gas inlet side. Porous cell walls define the plurality of cells. The outer wall is provided on an outer periphery of each of the plurality of honeycomb fired bodies. The exhaust gas introduction cells and the exhaust gas emission cells each have a uniform cross-sectional shape throughout from the exhaust gas inlet side to the exhaust gas outlet side excluding a plugged portion in a cross section perpendicular to a longitudinal direction of the plurality of cells. Each of the exhaust gas emission cells is adjacently surrounded fully by the exhaust gas introduction cells across the porous cell walls. The plurality of cells includes outer cells which are adjacent to the outer wall and which include the exhaust gas introduction cells.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings.

FIG. 13 is an enlarged cross-sectional view perpendicular to the longitudinal direction of the honeycomb filter, which illustrates how each cell unit (cell structure) is two-dimensionally (i.e. in X and Y directions) repeated in the case where the first exhaust gas introduction cells, the second exhaust gas introduction cells, and the exhaust gas emission cells are square in the cross section of the cells, and which also illustrates how the first exhaust gas introduction cells and the second exhaust gas introduction cells are shared between the cell units (cell structures).

DESCRIPTION OF THE EMBODIMENTS

Figure 1A:
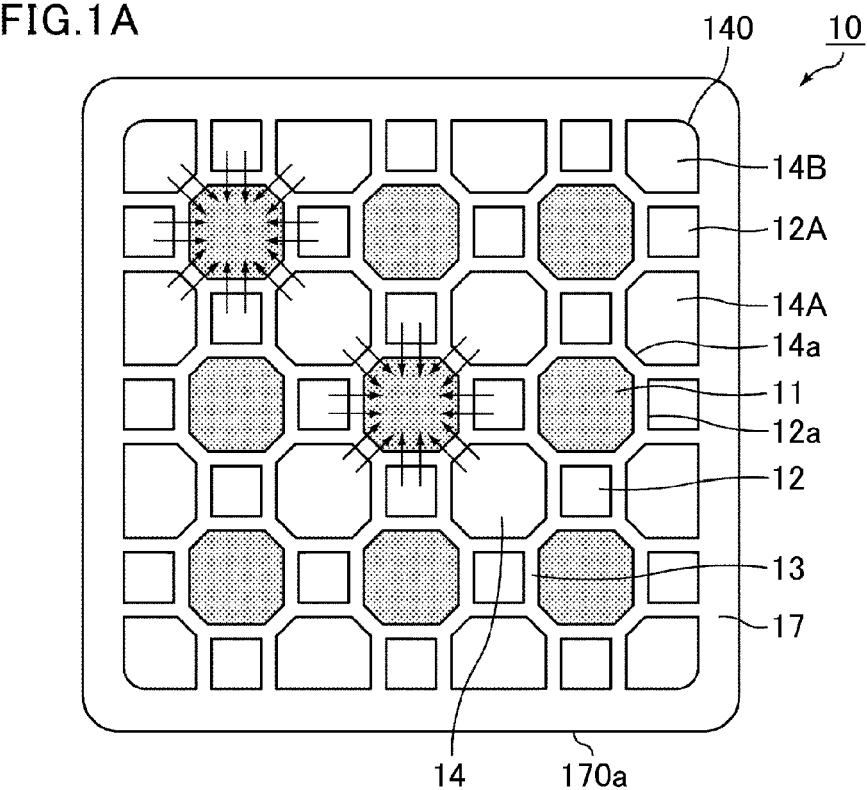
FIG. 1A is an end face view illustrating an end face of a honeycomb filter according to one embodiment of the present invention.

A honeycomb filter according to the embodiments of the present invention includes a plurality of honeycomb fired bodies combined with one another by adhesive layers residing therebetween, each honeycomb fired body including a plurality of cells as exhaust gas passages, the cells including exhaust gas introduction cells and exhaust gas emission cells, the exhaust gas introduction cells each having an open end at an exhaust gas inlet side and a plugged end at an exhaust gas outlet side, the exhaust gas emission cells each having an open end at the exhaust gas outlet side and a plugged end at the exhaust gas inlet side;

porous cell walls defining the plurality of cells; and an outer wall on an outer periphery thereof, wherein the exhaust gas introduction cells and the exhaust gas emission cells each have a uniform cross-sectional shape throughout from the end at the exhaust gas inlet side to the end at the exhaust gas outlet side excluding the plugged portion in a direction perpendicular to the longitudinal direction of the cells;

each exhaust gas emission cell is adjacently surrounded fully by the exhaust gas introduction cells across the porous cell walls; and the cells adjacent to the outer wall include the exhaust gas introduction cells.

The honeycomb filter according to the embodiments of the present invention has a structure in which each exhaust gas emission cell is adjacently surrounded fully by exhaust gas introduction cells across porous cell walls, and the cells adjacent to the outer wall include exhaust gas introduction cells. Thus, the entire cell walls around the exhaust gas emission cells can be utilized. Moreover, the exhaust gas emission cells are orderly arranged, which allows exhaust gas to flow uniformly and smoothly therethrough. Thus, the pressure loss is low at an initial stage and is less likely to increase even after accumulation of PM.

The present inventors consider that the pressure loss occurs due to (a) inflow resistance generated upon flowing of exhaust gas into the honeycomb filter, (b) flow resistance of the exhaust gas introduction cells, (c) passage resistance of the cell wall, (d) passage resistance generated upon passage of exhaust gas through a layer of accumulated PM, (e) flow resistance of the exhaust gas emission cells, and (f) outflow resistance generated upon flowing of exhaust gas out of the honeycomb filter. The studies of the inventors have revealed that the factors (c), (e), and (f) are controlling factors of the initial pressure loss that occurs before accumulation of PM, and that the factors (a), (b), and (d) are controlling factors of the transitional pressure loss that occurs after accumulation of a certain amount of PM. One of the controlling factors of the initial pressure loss is not the factor (b) flow resistance of the exhaust gas introduction cells but the factor (e) flow resistance of the exhaust gas emission cells because the aperture ratio of the honeycomb filter based on the exhaust gas emission cells is smaller than the aperture ratio of the honeycomb filter based on the exhaust gas introduction cells. Similarly, the inventors presume that the factor (f) outflow resistance generated upon flowing of exhaust gas out of the honeycomb filter, not the factor (a) inflow resistance generated upon flowing of exhaust gas into the honeycomb filter, is one of the controlling factors of the initial pressure loss because a vortex is formed near the outlet of the cell when the gas rapidly expands upon emission from the cell, and the resistance generated upon disturbance of emission of the exhaust gas by vortex is higher than the resistance that compresses the gas.

The honeycomb filter according to the embodiments of the present invention has a structure in which each exhaust gas emission cell is adjacently surrounded fully by exhaust gas introduction cells across porous cell walls, and also the cells adjacent to the outer wall include exhaust gas introduction cells. This structure allows easy flow of exhaust gas from the exhaust gas introduction cells uniformly into all the exhaust gas emission cells, thereby lowering the outflow resistance of the factor (f). Moreover, since the entire cell walls can be utilized, PM is likely to be thinly and uniformly accumulated on the inner walls of the exhaust gas emission cells, lowering the passage resistance of the factor (d). Thus, in the provided honeycomb filter, the pressure loss is low at an initial stage and is less likely to increase even after accumulation of PM.

The effects of the honeycomb filter according to the embodiments of the present invention are now described with reference to the drawings.

The honeycomb filter shown in FIG. 1A has the above-mentioned structure. The thickness of the outer wall 17 is uniform. Furthermore, each first exhaust gas introduction cell 12A adjacent to the outer wall 17 has the same cross-sectional shape as that of each first exhaust gas introduction cell 12 not adjacent to the outer wall 17. The cross-sectional shape of each second exhaust gas introduction cell 14A adjacent to the outer wall 17 is partially deformed, compared to the cross-sectional shape of each second exhaust gas introduction cell 14 not adjacent to the outer wall 17, in accordance with the straight line along the inner walls 120, which forms the outer wall 17, of the first exhaust gas introduction cells 12 adjacent to the outer wall 17.

The honeycomb filter shown in FIG. 1A has a structure in which each exhaust gas emission cell 11 is adjacently surrounded fully by the exhaust gas introduction cells 12 and 14 across the porous cell walls 13, and also the cells adjacent to the outer wall 17 include the first exhaust gas introduction cells 12A and the second exhaust gas introduction cells 14A and 14B. This structure allows easy flow of exhaust gas from the first exhaust gas introduction cells 12 and 12A and the second exhaust gas introduction cells 14, 14A, and 14B uniformly into all the exhaust gas emission cells 11, thereby lowering the outflow resistance of the factor (f). Moreover, since the entire cell walls 13 can be utilized, PM is likely to be thinly and uniformly accumulated on the inner walls of the cell walls 13 of the exhaust gas emission cells 11, lowering the passage resistance of the factor (d) in the PM layer. Thus, in the provided honeycomb filter, the pressure loss is low at an initial stage and is less likely to increase even after accumulation of PM.

In the honeycomb filter according to the embodiments of the present invention, in addition to the above structure, preferably the exhaust gas introduction cells include two kinds of cells including first exhaust gas introduction cells and second exhaust gas introduction cells having a larger cross-sectional area than the first exhaust gas introduction cells in a direction perpendicular to the longitudinal direction of the cells, the cross-sectional area of each exhaust gas emission cell in a direction perpendicular to the longitudinal direction of the cell is equal to or larger than that of each second exhaust gas introduction cell in a direction perpendicular to the longitudinal direction of the cell, in the cross section perpendicular to the longitudinal direction of the cells, the exhaust gas emission cells and the exhaust gas introduction cells are all polygonal, and a side facing the exhaust gas emission cell among sides forming the cross-sectional shape of each first exhaust gas introduction cell is longer than a side facing the exhaust gas emission cell among sides forming the cross-sectional shape of each second exhaust gas introduction cell; or one of the sides forming the cross-sectional shape of each first exhaust gas introduction cell faces the exhaust gas emission cell and none of the sides forming the cross-sectional shape of each second exhaust gas introduction cell faces the exhaust gas emission cells.

The following describes the cross-sectional shapes or other features of the exhaust gas emission cells, the first exhaust gas introduction cells, and the second exhaust gas introduction cells. The first exhaust gas introduction cells and the second exhaust gas introduction cells each have a uniform cross-sectional shape throughout from the end at the exhaust gas inlet side to the end at the exhaust gas outlet side in a direction perpendicular to the longitudinal direction of the cells excluding the plugged portions. This also applies to the case of no distinction between the first exhaust gas introduction cells and the second exhaust gas introduction cells.

Figure 6A:
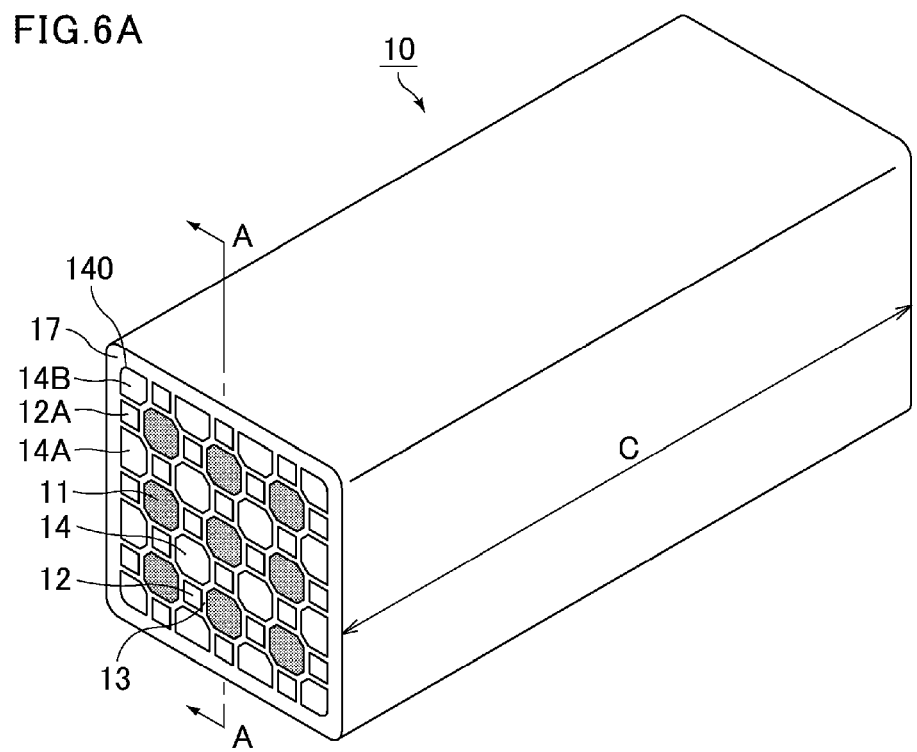
FIG. 6A is a perspective view schematically illustrating one example of the honeycomb fired body forming the honeycomb filter shown in FIG. 5.
Figure 10A:
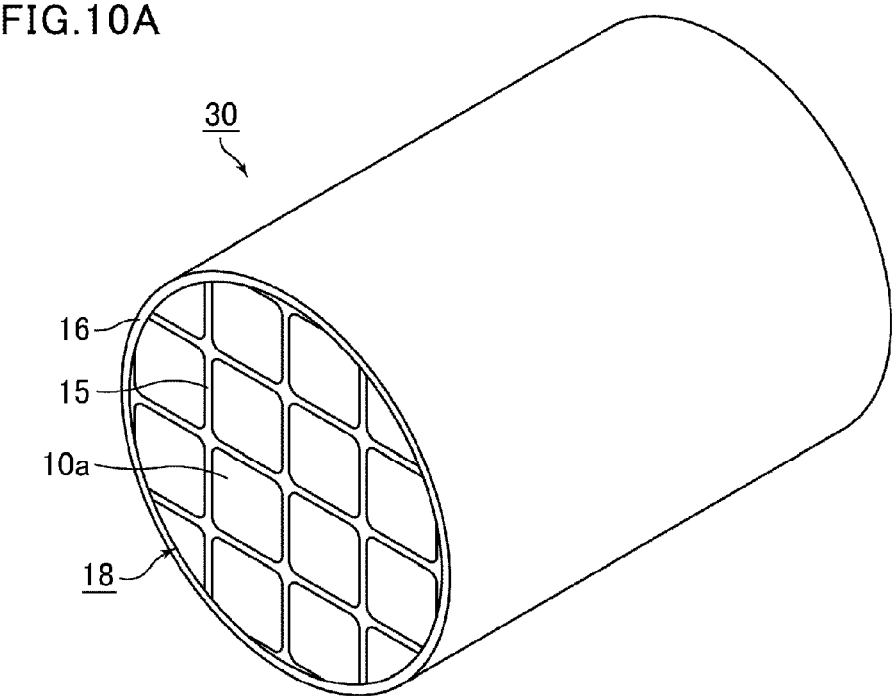
FIG. 10A is a perspective view schematically illustrating one example of a honeycomb filter according to a second embodiment of the present invention.
Figure 10B:
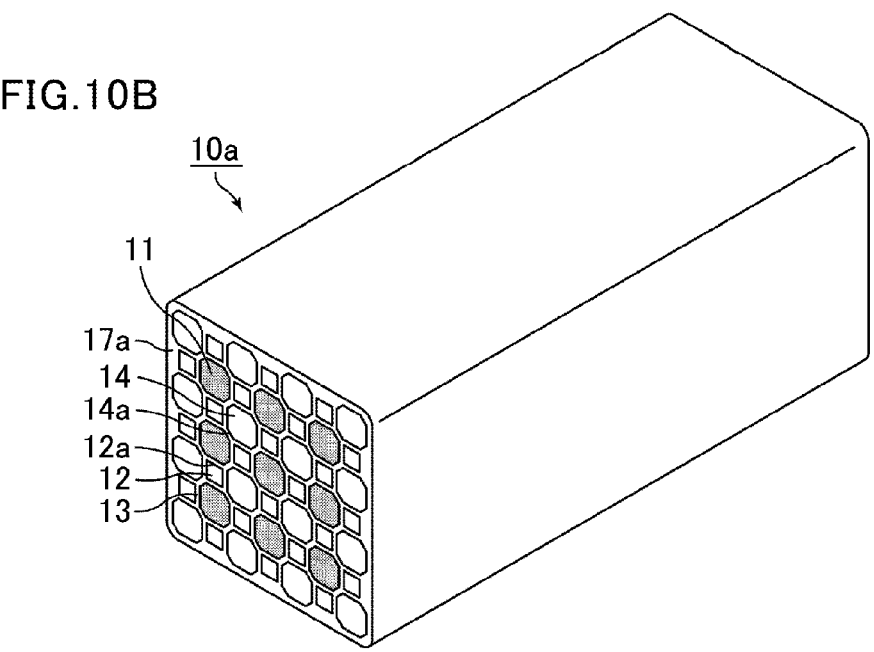
FIG. 10B is a perspective view illustrating a honeycomb fired body forming the honeycomb filter.
Figure 11A:
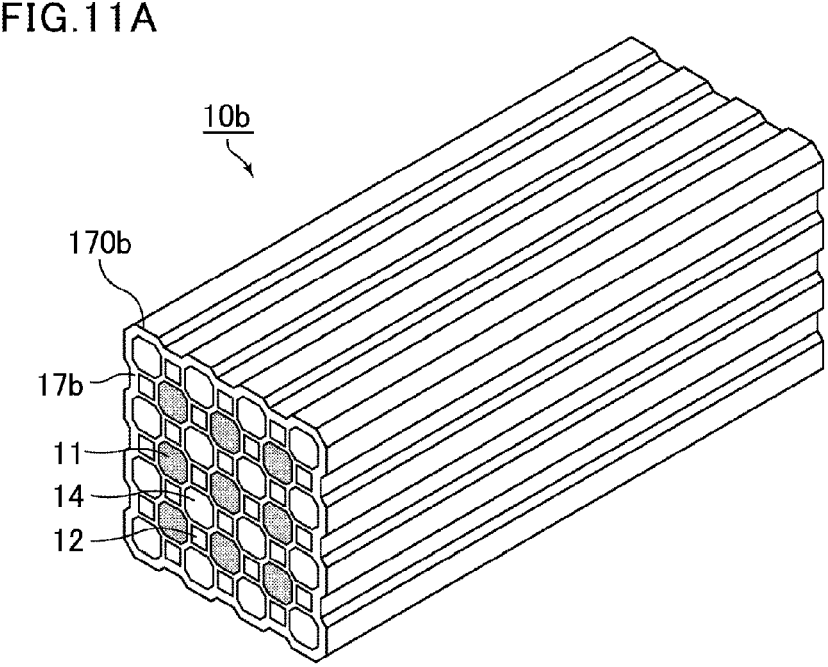
FIG. 11A is a perspective view schematically illustrating one modified example of a honeycomb fired body forming the honeycomb filter according to the second embodiment of the present invention.
Figure 11B:
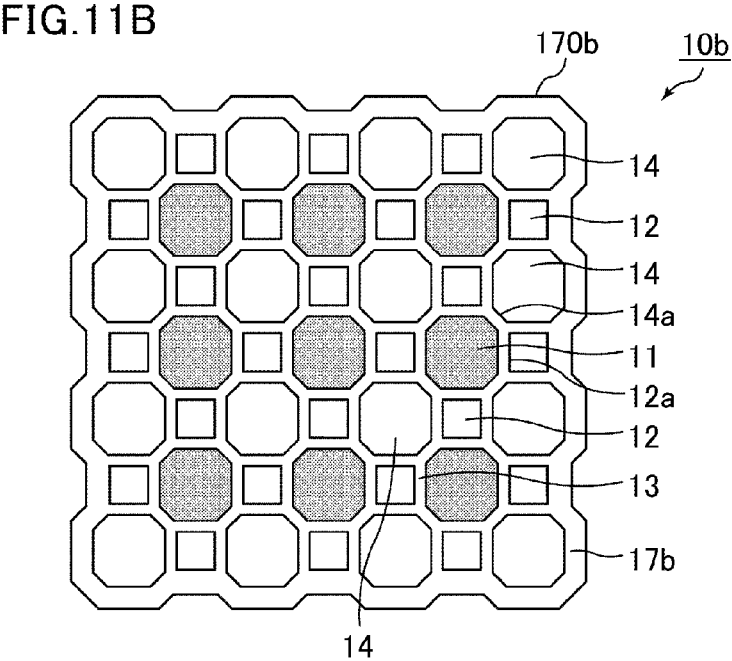
FIG. 11B is an end face view of the honeycomb filter in FIG. 11A.
Figure 12A:
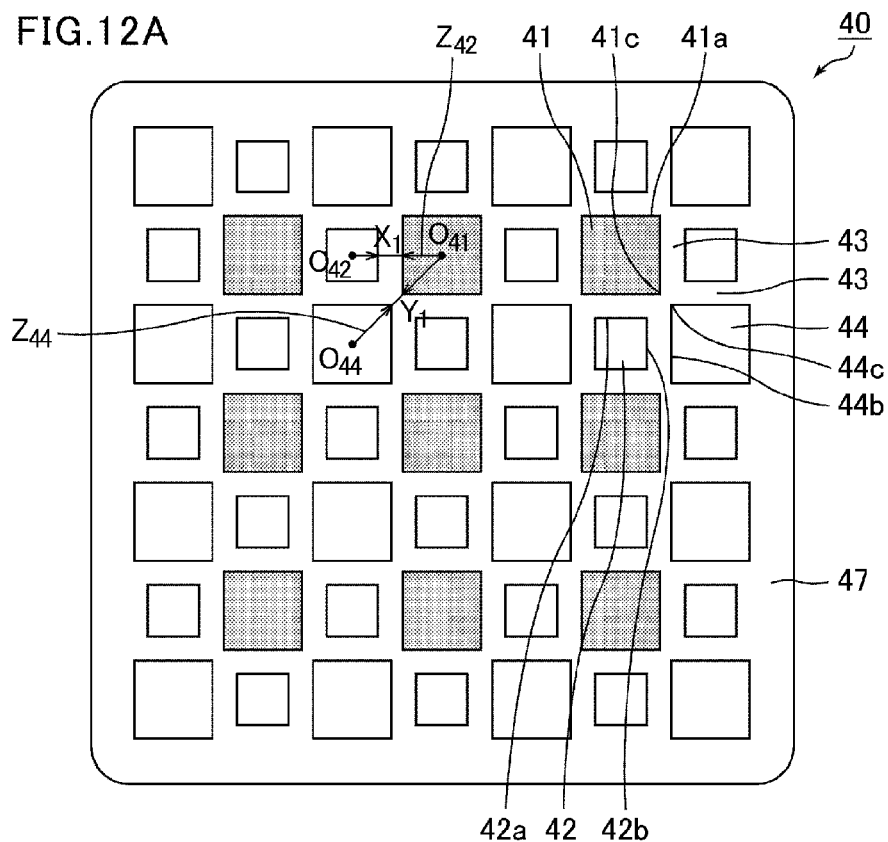
FIG. 12A is an end face view schematically illustrating one example of the cell arrangement at an end face of a honeycomb fired body forming a honeycomb filter according to a third embodiment of the present invention.
Figure 12B:
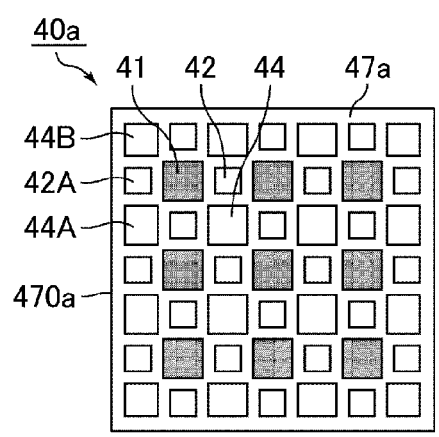
FIG. 12B is an end face view illustrating one modified example of the honeycomb filter according to the third embodiment of the present invention.
Figure 12C:
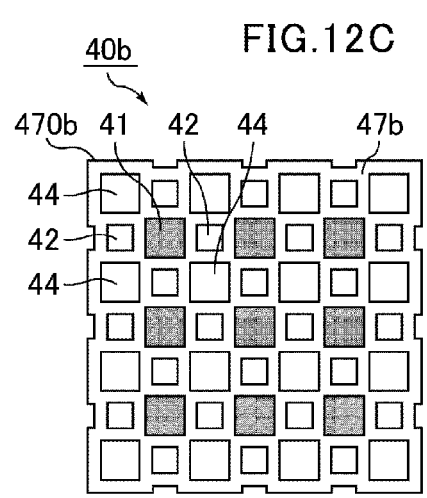
FIG. 12C is an end face view illustrating another modified example of the honeycomb filter according to the third embodiment of the present invention.

In the honeycomb filter according to the embodiments of the present invention, the following three patterns of shapes may be mentioned for the shapes of the outer wall and the exhaust gas introduction cells adjacent to the outer wall:

(1) As illustrated in FIG. 10B and FIG. 12A, the thickness of the outer wall is not uniform, and each first exhaust gas introduction cell and each second exhaust gas introduction cell adjacent to the outer wall respectively have the same shape as that of each first exhaust gas introduction cell and that of each second exhaust gas introduction cell not adjacent to the outer wall;

(2) As illustrated in FIG. 6A and FIG. 12B, the thickness of the outer wall is uniform, each first exhaust gas introduction cell adjacent to the outer wall has the same shape as that of each first exhaust gas introduction cell not adjacent to the outer wall, and the cross-sectional shape of each second exhaust gas introduction cell adjacent to the outer wall is partially deformed, compared to the cross-sectional shape of each second exhaust gas introduction cell not adjacent to the outer wall, in accordance with the straight line along the inner walls, which forms the outer wall, of the first exhaust gas introduction cell adjacent to the outer wall; and (3) As illustrated in FIG. 11B and FIG. 12C, the thickness of the outer wall is uniform in accordance with the cross-sectional shapes of the exhaust gas introduction cells adjacent to the outer wall, and each first exhaust gas introduction cell and each second exhaust gas introduction cell adjacent to the outer wall respectively have the same shape as that of each first exhaust gas introduction cell and that of each second exhaust gas introduction cell not adjacent to the outer wall.

In addition to the above-mentioned effects, the honeycomb filter having the above structure can not only reduce the initial pressure loss as compared with conventional honeycomb filters but also reduce the rate of increase in the pressure loss even after accumulation of a considerable amount of PM on the cell walls. The honeycomb filter can greatly reduce the pressure loss throughout the use from the initial stage to after accumulation of PM in an amount close to the limit.

The term "cross-sectional shape" herein refers to a shape defined by the inner cell walls of each exhaust gas emission cell, first exhaust gas introduction cell, or second exhaust gas introduction cell in the direction perpendicular to the longitudinal direction of the cells.

The term "cross-sectional area" herein refers to the area of a cross-sectional shape defined by the inner cell walls of each exhaust gas emission cell, first exhaust gas introduction cell, or second exhaust gas introduction cell in a cross section perpendicular to the longitudinal direction of the cells. The term "inner cell walls" refers to a part of the surface of the cell walls defining each cell, wherein the part specifically corresponds to the surface on the inside of the cell.

Moreover, the term "side" herein refers to a segment between vertices of a polygon in the case where cross-sectional shape defined by the inner cell walls of each exhaust gas emission cell, first exhaust gas introduction cell, or second exhaust gas introduction cell is a polygon in a direction perpendicular to the longitudinal direction of the cells.

Further, the term "length of a side" refers to the length of the segment. In the case where the vertex portions are formed by curved lines (i.e., chamfered), the "length of a side" refers to the length of a straight line excluding the curved line portions for the following reasons.

In the case where the vertex portions are formed by curved lines, the cell walls separating the cells in the curve portions are thick, and thus the passage resistance is high at the curve portions. This causes exhaust gas to preferentially flow into straight line portions, and thus the length of the straight portions must be adjusted. Hence, it is reasonable to exclude the curve portions from consideration.

Provided that the straight portions of a polygon are hypothetically extended and intersections of the hypothetical straight lines are considered as hypothetical vertices, then the length of the straight portion of the side excluding the curve portions is preferably not less than 80% of the length of a hypothetical side formed by connecting the hypothetical vertices. Thus, in the case of the cell having a polygonal cross-sectional shape in which the length of each side is not less than 80% of the length of the hypothetical side, a main-passage-switching effect, which is a functional effect of the embodiments of the present invention, can be achieved by adjusting the length of the sides.

In the honeycomb filter according to the embodiments of the present invention, among the sides forming the cross-sectional shape of each first exhaust gas introduction cell or each second exhaust gas introduction cell, a side is considered to face an exhaust gas emission cell when the following condition is satisfied. Provided that, in the cross section perpendicular to the longitudinal direction of the cells, a hypothetical perpendicular line (hereinafter referred to as a perpendicular bisector) that bisects a side of a polygon defined by the inner cell walls of a first exhaust gas introduction cell or a second exhaust gas introduction cell is drawn toward the outside of the first exhaust gas introduction cell or the second exhaust gas introduction cell, then the perpendicular bisector intersects a shape region defined by the inner cell walls of an exhaust gas emission cell adjacent to the first exhaust gas introduction cell or the second exhaust gas introduction cell across the cell wall.

In this case, the exhaust gas emission cell having a side facing a first exhaust gas introduction cell or a second exhaust gas introduction cell is considered to face the first exhaust gas introduction cell or the second exhaust gas introduction cell.

In the honeycomb filter according to the embodiments of the present invention, among the sides forming the cross-sectional shape of each exhaust gas emission cell, a side is considered to face the first exhaust gas introduction cell or the second exhaust gas introduction cell when the following condition is satisfied. Provided that, in the cross section perpendicular to the longitudinal direction of the cells, a hypothetical perpendicular line (hereinafter referred to as a perpendicular bisector) that bisects a side of a polygon defined by the inner cell walls of an exhaust gas emission cell is drawn toward the outside of the exhaust gas emission cell, then the perpendicular bisector intersects a shape region defined by the inner cell walls of the first exhaust gas introduction cell or the second exhaust gas introduction cell adjacent to the exhaust gas emission cell across the cell wall.

In this case, the exhaust gas emission cell having a side facing the first exhaust gas introduction cell or the second exhaust gas introduction cell is considered to face the first exhaust gas introduction cell or the second exhaust gas introduction cell.

Moreover, in the honeycomb filter according to the embodiments of the present invention, among the sides forming each first exhaust gas introduction cell, a side is considered to face the second exhaust gas introduction cell when the following condition is satisfied. Provided that, in the cross section perpendicular to the longitudinal direction of the cells, a hypothetical perpendicular line (hereinafter referred to as a perpendicular bisector) that bisects a side of a polygon defined by the inner cell walls of the first exhaust gas introduction cell is drawn toward the outside of the first exhaust gas introduction cell, then the perpendicular bisector intersects a shape region defined by the inner cell walls of the second exhaust gas introduction cell adjacent to the first exhaust gas introduction cell across the cell wall.

In this case, the first exhaust gas introduction cell having a side facing the second exhaust gas introduction cell is considered to face the second exhaust gas introduction cell.

Furthermore, in the honeycomb filter according to the embodiments of the present invention, among the sides forming each second exhaust gas introduction cell, a side is considered to face the first exhaust gas introduction cell when the following condition is satisfied. Provided that, in the cross section perpendicular to the longitudinal direction of the cells, a hypothetical perpendicular line (hereinafter referred to as a perpendicular bisector) that bisects a side of a polygon defied by the inner cell walls of the second exhaust gas introduction cell is drawn toward the outside of the second exhaust gas introduction cell, then the perpendicular bisector intersects a shape region defined by the inner cell walls of the first exhaust gas introduction cell adjacent to the second exhaust gas introduction cell across the cell wall.

In this case, the second exhaust gas introduction cell having a side facing the first exhaust gas introduction cell is considered to face the first exhaust gas introduction cell.

In addition, in the honeycomb filter according to the embodiments of the present invention, the thickness of the cell wall separating two cells is defined as follows.

Specifically, in the cross section perpendicular to the longitudinal direction of the cells, the centroid of the cross-sectional figure defined by the inner cell walls is determined for two cells; a hypothetical straight line is drawn which connects these centroids; and the length of a segment of the straight line overlapping the cell wall region is defined as the cell wall thickness. Although the cells are void, the centroid herein refers to the geometric center of gravity of the cross-sectional figure defined by the inner cell walls, and thus the centroid can be defined even for the cross-sectional figure of voids such as cells.

The terms "adjacent" and "adjacently" used in the description of the honeycomb filter according to the embodiments of the present invention mean "adjacent" and "adjacently" as expressed in Japanese. These terms "adjacent" and "adjacently" are used not only in the case where the exhaust gas introduction cells are arranged so as to face the exhaust gas emission cells across the porous cell walls but also in the case where the exhaust gas introduction cells do not face the exhaust gas emission cells but the exhaust gas introduction cells are arranged diagonally to the exhaust gas emission cells across the porous cell walls. In Japanese, "the terms "adjacent" and "adjacently" are appropriately used as in an expression "the grids are diagonally adjacent to each other".

Figure 1B:
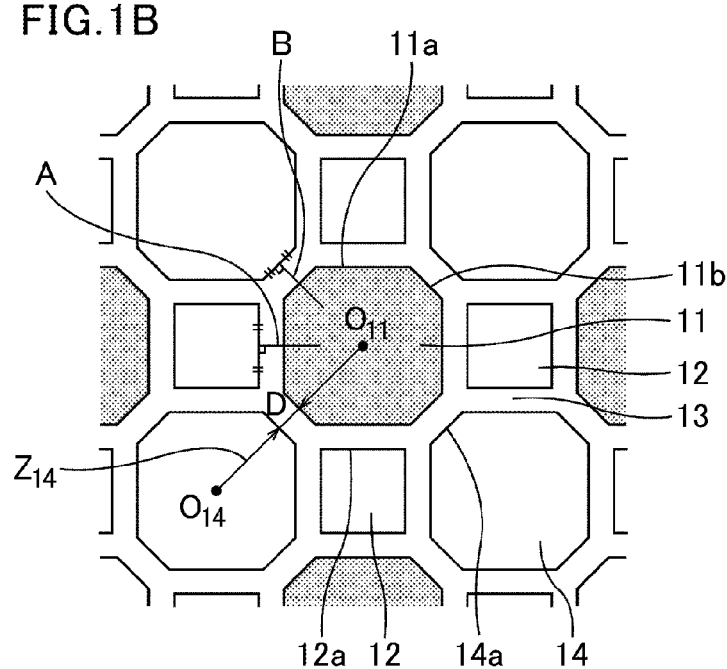
FIG. 1B is an enlarged end face view illustrating an enlarged image of a part of an end face of a honeycomb filter according to one embodiment of the present invention.
Figure 14:
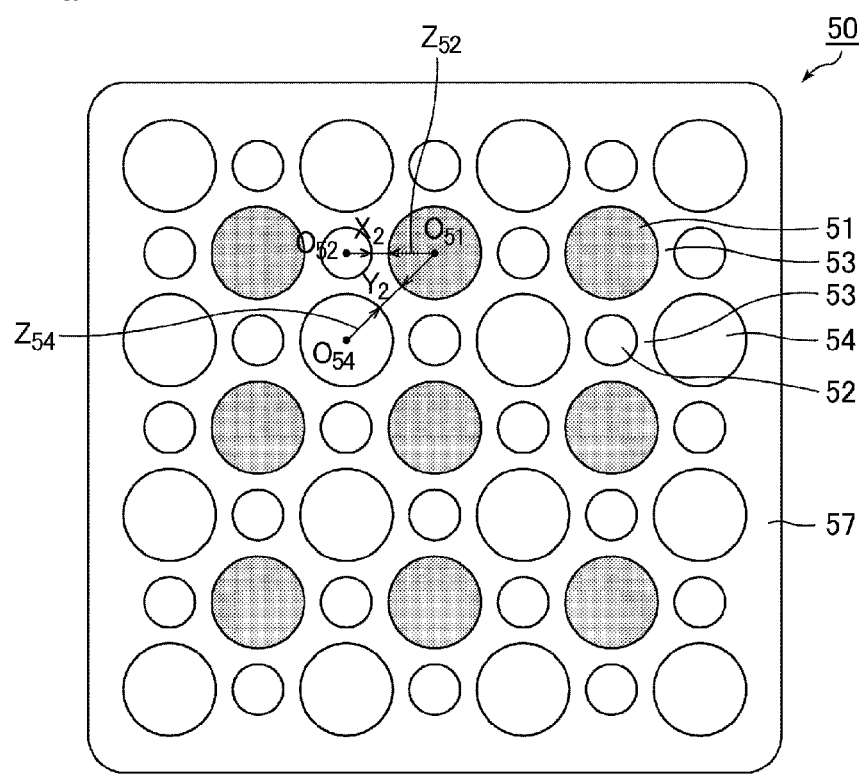
FIG. 14 is an end face view schematically illustrating one example of the cell arrangement at an end face of a honeycomb fired body forming the honeycomb filter according to a fourth embodiment of the present invention.

The case where the exhaust gas introduction cells and the exhaust gas emission cells each have a polygonal cross section, and the exhaust gas introduction cells are arranged to face the exhaust gas emission cells across the porous cell walls is specifically as shown in FIG. 1B. In FIG. 1B, an exhaust gas introduction cell 14 faces exhaust gas emission cells 11 across a porous cell wall 13. In addition, in the case where the exhaust gas introduction cells and the exhaust gas emission cells each have a circular or ellipsoidal cross section and one porous cell wall is defined by the arc of the cross section of the exhaust gas introduction cell and arc of the cross section of the exhaust gas emission cell (i.e., in a three-dimensional perspective, the curved surface of the inner cell wall of the exhaust gas emission cell and the curved surface of the inner cell wall of the exhaust gas introduction cell form the outside surface and inside surface of one porous cell wall, respectively), it is understood that each exhaust gas introduction cell is arranged so as face the exhaust gas emission cell across the porous cell wall, as in the case where the exhaust gas introduction cells and the exhaust gas emission cells each have a polygonal cross section. Specifically, this is the case shown in FIG. 14. In FIG. 14, an exhaust gas introduction cell 54 is considered to face an exhaust gas emission cell 51 across a porous cell wall 53.

In addition, the case where the exhaust gas introduction cells and the exhaust gas emission cells each have a polygonal cross section, and the exhaust gas introduction cell and the exhaust gas emission cell do not face each other but each exhaust gas introduction cell is arranged diagonally to the exhaust gas emission cells across the porous cell walls is specifically shown in FIGS. 12A to 12C. In FIGS. 12A to 12C, an exhaust gas introduction cell 44 and an exhaust gas emission cell 41 do not face each other, but the exhaust gas introduction cell 44 is arranged diagonally to the exhaust gas emission cells 41 across porous cell walls 43.

In the case where the exhaust gas introduction cells and the exhaust gas emission cells each have a cross section whose shape is defined by curved lines (excluding circular and ellipsoidal shapes), the intersection between one curved line and another curved line is considered as a vertex, and a curved line between these vertices is considered as a side; and when a hypothetical perpendicular line that bisects a side (curved line) forming the cross-sectional shape of the exhaust gas emission cell or the exhaust gas introduction cell and that is perpendicular to a straight line connecting both vertices of the side is drawn toward the outside of the exhaust gas emission cell or the exhaust gas introduction cell, if the perpendicular line intersects a shape region defined by the inner cell walls of the exhaust gas introduction cell or the exhaust gas emission cell, the side (curved line) of the exhaust gas emission cell or the exhaust gas introduction cell is considered to face the exhaust gas introduction cell or the exhaust gas emission cell. Further, the exhaust gas emission cell or the exhaust gas introduction cell is considered to face the exhaust gas introduction cell or the exhaust gas emission cell. In addition, in the case where the portions corresponding to the vertices are chamfered, the curved lines are extended and the hypothetical intersections of the extended curved lines are considered as vertices for convenience.

Figure 15:
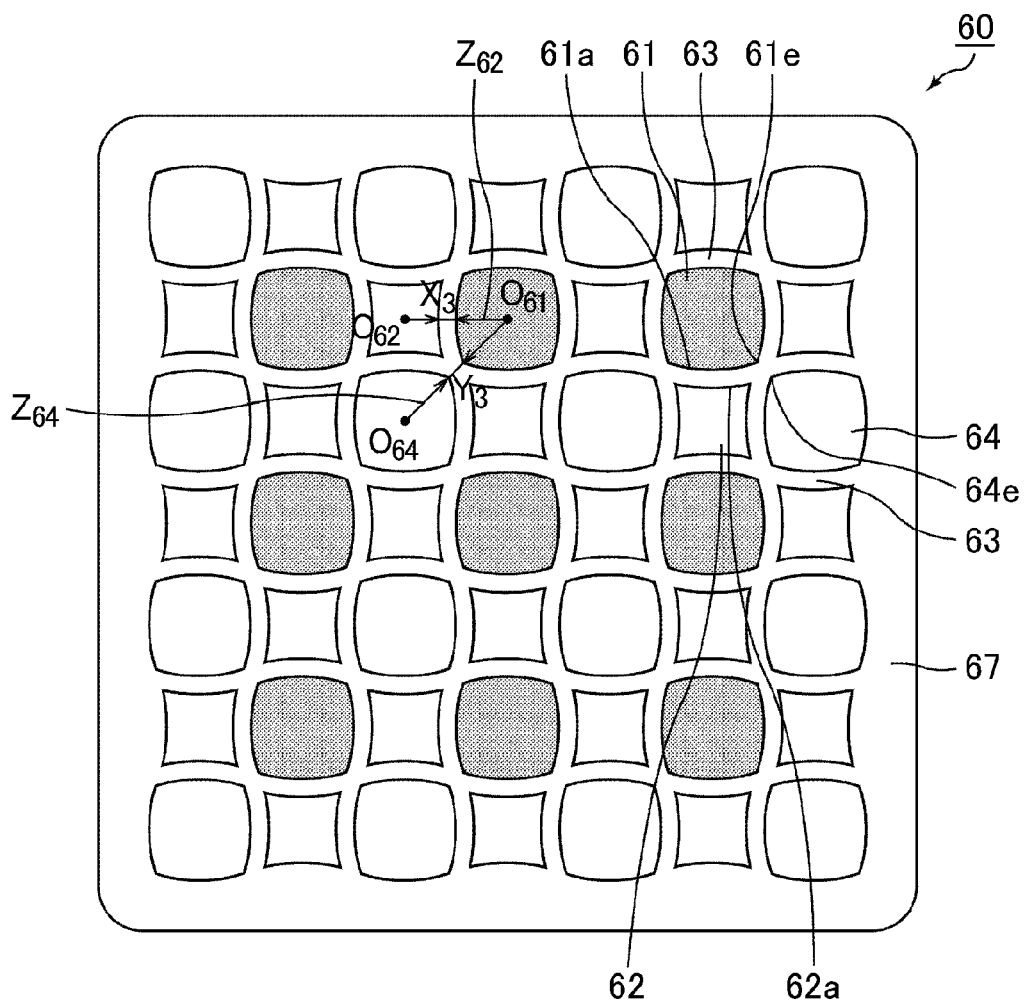
FIG. 15 is an end face view schematically illustrating one example of the cell arrangement at an end face of a honeycomb fired body forming the honeycomb filter according to a fifth embodiment of the present invention.

In the case where the exhaust gas introduction cells and the exhaust gas emission cells each have a cross section whose shape is formed by curved lines (excluding circular and ellipsoidal shapes), the case where the exhaust gas introduction cell and the exhaust gas emission cell do not face each other but each exhaust gas introduction cell is arranged diagonally to the exhaust gas emission cells across the porous cell walls is specifically shown in FIG. 15. In FIG. 15, an exhaust gas introduction cell 64 and an exhaust gas emission cell 61 do not face each other, but the exhaust gas introduction cell 64 is arranged diagonally to the exhaust gas emission cells 61 across porous cell walls 63.

A literal translation from Japanese to English of the phrase "each of the exhaust gas emission cells is adjacently surrounded fully by the exhaust gas introduction cells across the porous cell walls" can encompass "each of the exhaust gas emission cells is enclosed all around by the adjacent exhaust gas introduction cells across the porous cell walls" in the present application.

The phrase "arranged diagonally" means that the exhaust gas introduction cells and the exhaust gas emission cells are arranged in such a manner that each exhaust gas emission cell and each exhaust gas introduction cell do not face each other, and two hypothetical lines described below are parallel to each other or overlapping each other: one hypothetical line drawn in the cross section perpendicular to the longitudinal direction of an exhaust gas emission cell, which connects the centroid of the cross-sectional figure defined by the inner cell walls of the exhaust gas emission cell and one of the vertices of the same cross-sectional figure (in the case where the vertex portions of the cross-sectional shape are chamfered, the sides (straight lines or curved lines) forming the cross-sectional shape are hypothetically extended, and the intersections of the extended lines are considered as vertices); and one hypothetical line drawn in the cross section perpendicular to the longitudinal direction of an exhaust gas introduction cell, which connects the centroid of the cross-sectional figure defined by the inner cell walls of the exhaust gas introduction cell and one of the vertices of the same cross-sectional figure (in the case where the vertex portions of the cross-sectional shape are chamfered, the sides (straight lines or curved lines) forming the cross-sectional shape are hypothetically extended, and the intersections of the extended lines are considered as vertices). As long as at least two hypothetical lines among the plural hypothetical lines are parallel to each other or overlapping each other, the other hypothetical lines may intersect each other at a predetermined angle (for example, 90°).

In addition, in the explanation of the terms "adjacent" and "adjacently", the "exhaust gas introduction cell" is a collective term of the first exhaust gas introduction cells and the second exhaust gas introduction cells.

Next, a side facing a cell and the thickness of the cell wall separating two cells are explained with reference to the figures.

FIG. 1B is an enlarged end face view illustrating an enlarged image of a part of an end face of the honeycomb filter according to one embodiment of the present invention. FIGS. 1A and 1B illustrate an exhaust gas emission cell 11 as well as first exhaust gas introduction cells 12 and second exhaust gas introduction cells 14 surrounding the exhaust gas emission cell 11.

Among the sides forming the cross-sectional shape of the first exhaust gas introduction cell 12 or the second exhaust gas introduction cell 14, a side is considered to face the exhaust gas emission cell 11 when the following condition is satisfied. Provided that, in the cross section perpendicular to the longitudinal direction of the cells shown in FIG. 1B, a hypothetical perpendicular line (hereinafter referred to as a perpendicular bisector) that bisects a side 12a of a polygon defined by the inner cell walls of the first exhaust gas introduction cell 12 or a side 14a of a polygon defined by the inner cell walls of the second exhaust gas introduction cell 14 is drawn toward the outside of the first exhaust gas introduction cell 12 or the second exhaust gas introduction cell 14, then the perpendicular bisector A or the perpendicular bisector B intersects a shape region (or a side 11a or a side 11b) defined by the inner cell walls of the exhaust gas emission cell 11 adjacent to the side 12a of the first exhaust gas introduction cell 12 or the side 14a of the second exhaust gas introduction cell 14 across the cell wall as shown in FIG. 1B. In this case, the side 12a or the side 14a is considered to face the exhaust emission cell 11.

In the embodiments of the present invention, the reason why the cell is regarded as facing another cell based on the intersection of the perpendicular bisector is because the passage resistance generated upon passage of exhaust gas through at or around the center of the side in the length direction, i.e. at or around the center of the cell wall separating each exhaust gas introduction cell and each exhaust gas emission cell, represents a pressure loss generated upon passage of exhaust gas through the entire wall.

In the embodiments of the present invention, in the cross section perpendicular to the longitudinal direction of the cells, in the case where the cross-sectional shape defined by the inner cell walls of each exhaust gas emission cell, first exhaust gas introduction cell, or second exhaust gas introduction cell is a polygon, and the vertex portions of the polygon are chamfered, i.e. formed by curved lines, the perpendicular bisector of each side is a segment excluding the curved lines.

Moreover, in the case where the vertex portions are formed by curved lines (i.e., chamfered), the curved lines are not regarded as the sides. In the case where the vertex portions are chamfered in the cross-sectional shape, the sides forming the cross-sectional shape are hypothetically extended, and intersections of the extended lines are considered as hypothetical vertices. Thus, the cross-sectional shape is treated as a polygon.

In the case of manufacturing a honeycomb filter including cells each having a polygonal cross-sectional shape in the cross section perpendicular to the longitudinal direction of the cells by extrusion molding, the vertex portions of the polygonal cross-sectional shapes may be formed by curved lines to prevent concentration of stress at the vertex portions. Such cross sections in which the vertex portions are formed by curved lines are still considered as polygons.

The thickness of the cell wall separating two cells is defined as follows.

Specifically, in the cross section perpendicular to the longitudinal direction of the cells shown in FIG. 1B, the centroid of the cross-sectional figure defined by the inner cell walls is determined for two cells (the centroid of the exhaust gas emission cell 11 is $O_{11}$, and the centroid of the second exhaust gas introduction cell 14 is $O_{14}$ in FIG. 1B); a hypothetical line $Z_{14}$ is drawn which connects these centroids; and the length D of the segment where the line $Z_{14}$ overlaps the cell wall region is defined as the cell wall thickness. Although the cells are voids, the centroid herein refers to the geometric center of gravity of the cross-sectional figure defined by the inner cell walls. Thus, the centroid can be defined even for the cross-sectional figure of voids such as cells.

The cell wall thickness is defined as above for the following reasons. The passage resistance generated upon passage of gas through the cell wall is the highest at a portion of the cell wall where the gas passes through at the highest flow rate, and the passage resistance at the portion may represent the passage resistance of the cell wall. The flow rate of gas in the longitudinal direction of the honeycomb filter is the highest at a position corresponding to the centroid of the cross-sectional shape defined by the inner cell walls. The flow rate concentrically decreases from the centroid toward the circumference of the cross-sectional shape of the cell. Thus, the flow rate of gas passing through a cell wall is the highest at the intersection of the cell wall and a line connecting the centroid of an exhaust gas introduction cell and the centroid of an exhaust gas emission cell. In view of the pressure loss as described above, the length D of the segment of a portion where a straight line connecting the centroids overlaps the cell wall region may be reasonably defined as the cell wall thickness.

In the embodiments of the present invention, electron microscope pictures are used to measure the length of the sides and the cell wall thickness and to identify the cross-sectional shape of the cells. The electron microscope pictures are taken with an electron microscope (FE-SEM: High resolution field emission scanning electron microscope S-4800, manufactured by Hitachi High-Technologies Corporation).

The electron microscope pictures must be taken at a magnification at which irregularities due to particles or pores on the surface (inner wall) of the cell wall defining the cells do not interfere with identification of the cross-sectional shape of the cells or measurement of the length of the sides, cell wall thickness, and cross-sectional area of the cells and at which the cross-sectional shape of the cells can be identified and the length of the sides, cell wall thickness, and cross-sectional area of the cells can be measured. It is most suitable to perform measurement using an electron microscope at a magnification of 30×.

In other words, the length of each side of the cells is measured using the scale of the electron microscope photographs, based on the above definitions of the length of the cells and the cell wall thickness, and then the cross-sectional area is arithmetically determined based on the obtained values including the length of the cells. If arithmetic calculation of the cross-sectional area is complicated, the cross-sectional area can also be determined by cutting a square piece (a square with a side having a scale length) corresponding to a unit area out of the electron microscope photograph, and weighing the cut-out piece, while separately cutting out the cross section of the cell along the cross-sectional shape of the cell (along curved lines in the case of a polygonal cross section with the vertex portions formed by curved lines) and weighing the cut-out piece. Then, the cross-sectional area of the cell can be calculated based on the weight ratio.

Figure 2A:
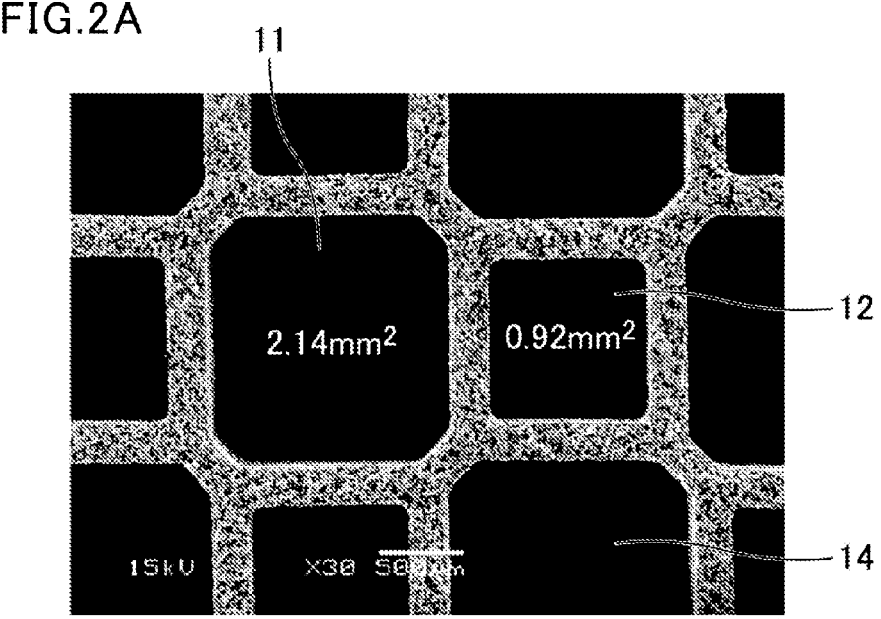
FIGS. 2A and 2B are scanning electron microscope photographs (SEM photographs) each showing one example of the cross section of cells.

For example, in FIG. 2A, the cross-sectional shapes defined by the inner walls of the exhaust gas emission cell and the second exhaust gas introduction cell are octagons having the same cross-sectional area, and the cross-sectional shapes defined by the inner walls of the first exhaust gas introduction cell is square (the vertex portions have so-called chamfered shape (i.e. formed by curved lines), yet, in the embodiments of the present invention, the cross-sectional shape of the first exhaust gas introduction cell is treated as a square because the straight lines extending from the four sides forming the cross-sectional shape form four intersections, which serve as vertices of the square). In the photograph, a 500 μm scale is shown. A square (corresponding to a unit area) having each side of a length corresponding to 500 μm in the photograph is cut out of the photograph, and the cut-out piece is weighed. Next, the octagon and the square are cut out of the photograph (the four vertex portions of the square are formed by the curved lines, so that the square is cut out along the curved lines), and the cut-out pieces are weighed. The cross-sectional area is calculated based on the weight ratio of the cut-out piece and the 500 μm scale square. In the case of measuring only the cross-sectional area ratio of the cells, the area ratio can be obtained directly from the weight ratio of the octagon and the square.

In the embodiments of the present invention, the measurement of the length of the cells, cell wall thickness, and cross-sectional area can be converted from the above manual measurement to an electronic measurement by scanning the electron microscope photograph as image data, or using the image data directly retrieved from the electron microscope and entering the scale of the photograph. The manual measurement and the electronic measurement are both based on the scale of the electron microscope image, and are in accordance with the same principle. Thus, no discrepancies will be found in the results between these measurements.

For example, the electronic measurement may be performed by using an image analysis and grain size distribution measurement software (Mac-View (Version 3.5), produced by Mountech Co. Ltd.). This software measures a cross-sectional area by scanning an electron microscope photograph as image data, or using the image data directly retrieved from the electron microscope, entering the scale of the photograph, and specifying the area along the inner walls of a cell. Moreover, the distance between any two points in the image can be measured based on the scale of the electron microscope photograph. To take a photograph of the cross section of a cell with the electron microscope, a filter is cut in a direction perpendicular to the longitudinal direction of the cell to prepare a 1 cm×1 cm×1 cm sample including the cut face, the sample is cleaned by ultrasonic cleaning or is embedded in resin, and an electron microscope photograph is taken. Embedding in resin does not affect measurement of the length of the sides of the cell and the cell wall thickness.

Figure 2B:
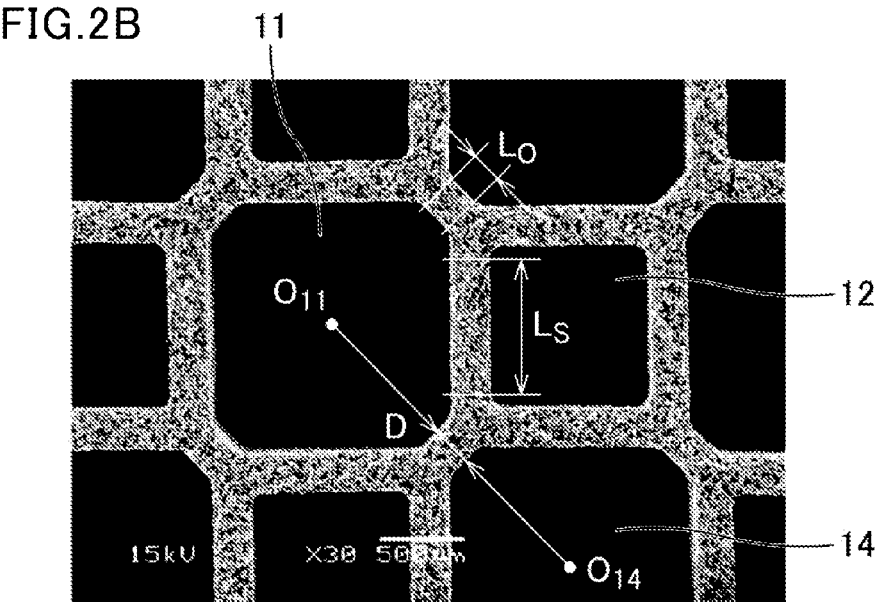

FIGS. 2A and 2B are photographs each showing one example of the shape of the cross section of cells taken with an electron microscope.

FIG. 2A shows that the cross-sectional shapes of the exhaust gas emission cell 11 and the second exhaust gas introduction cell 14 are octagonal. The cross-sectional shape of the first exhaust gas introduction cell 12 is square. The vertex portions of the first exhaust gas introduction cell 12 are formed by slightly curved lines; however, if the four sides, which are straight lines, of the first exhaust gas introduction cell 12 are extended, four intersections will be created, forming a square with these intersections as vertices. Thus, the cross section of the cell is treated as a square according to the definition of the embodiments of the present invention.

Moreover, with the use of MAC-View (Version 3.5), the area of the cross-sectional shape (cross-sectional area) of each of the exhaust gas emission cell 11 and the second exhaust gas introduction cell 14 can be calculated to be 2.14 mm2, and the area of the cross-sectional shape (cross-sectional area) of the first exhaust gas introduction cell 12 can be calculated to be 0.92 mm2.

Furthermore, as shown in FIG. 2B, the four vertex portions of the first exhaust gas introduction cell 12 are formed by curved lines. Thus, the length Ls of a side, among the sides forming the cross-sectional shape of each first exhaust gas introduction cell 12, that faces the exhaust gas emission cell 11 is the length excluding the curved portions. Additionally, the length Lo of a side, among the sides forming the cross-sectional shape of each second exhaust gas introduction cell 14, that faces the exhaust gas emission cell 11 is the distance between the vertices of the octagon.

As described above, the lengths Ls and Lo of the sides and the cross-sectional area can be measured using the electron microscope photograph.

Figure 3A:
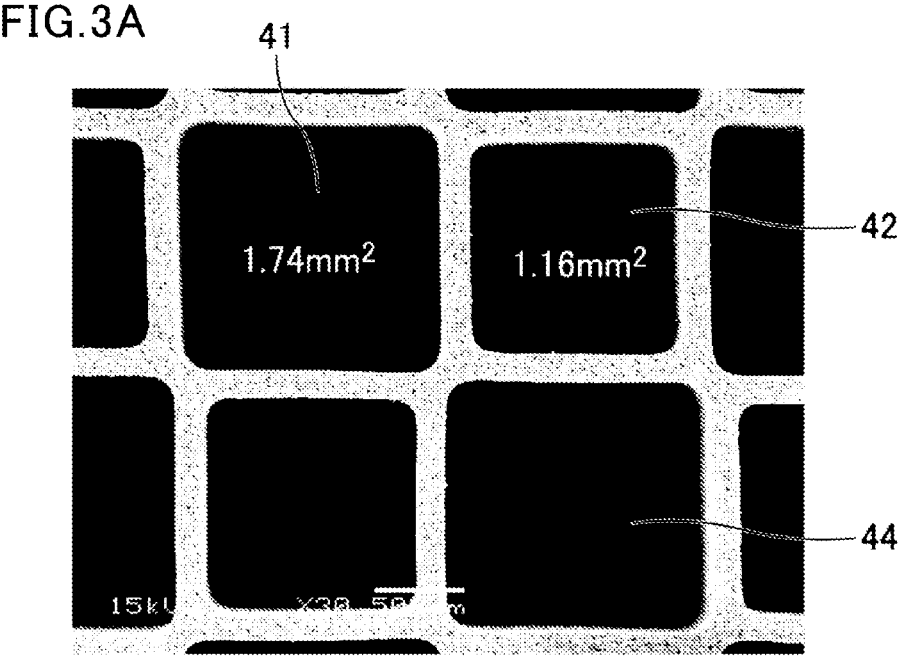
FIGS. 3A and 3B are scanning electron microscope photographs (SEM photographs) each showing one example of the cross-sectional shapes of cells that are different from the cells shown in FIGS. 2A and 2B.
Figure 3B:
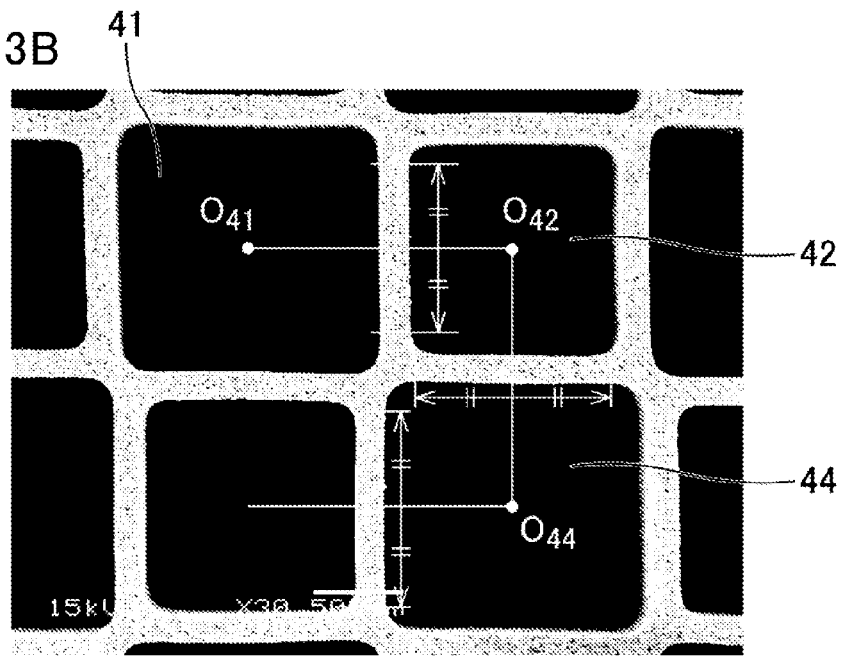

FIGS. 3A and 3B are scanning electron microscope photographs (SEM photographs) each showing one example of the cross-sectional shapes of cells that are different from the cells shown in FIGS. 2A and 2B.

FIG. 3A shows that the cross-sectional shape of the exhaust gas emission cell 41, the second exhaust gas introduction cell 44, and the first exhaust gas introduction cell 42 is formed in such a manner that straight lines of the four sides having the same length are hypothetically extended to perpendicularly intersect each other and the intersections (vertices) are formed by curved lines. Although the vertex portions of the cross-sectional shape of each cell are formed by curved lines, four intersections will be created by extended lines of the four straight lines forming the cell.

Provided that the intersections are hypothetical vertices, then the four distances between the vertices are the same, forming a square. Thus, the cross-sectional shape of these cells is treated as a square, according to the definition of the embodiments of the present invention.

Moreover, as is understood from FIG. 3B, a perpendicular bisector of a side forming the first exhaust gas introduction cell 42 intersects the exhaust gas emission cell 41. Thus, the side forming the first exhaust gas introduction cell 42 is considered to face the exhaust gas emission cell 41. In contrast, a perpendicular bisector of a side forming the second exhaust gas introduction cell 44 does not intersect the exhaust gas emission cell 41. Thus, the side forming the second exhaust gas introduction cell 44 does not face the exhaust gas emission cell 41. Whether a side forming the second exhaust gas introduction cell 44 or the first exhaust gas introduction cell 42 faces the exhaust gas emission cell 41 can be determined from the electron microscope photograph.

In the embodiments of the present invention, in the cross section perpendicular to the longitudinal direction of the cells forming the honeycomb filter, the first exhaust gas introduction cells, the second exhaust gas introduction cells, and the exhaust gas emission cells each have a uniform cross-sectional shape throughout from the exhaust gas inlet end to the exhaust gas outlet end excluding the plugged portion. Specifically, taking one first exhaust gas introduction cell as an example, in a cross-sectional view perpendicular to the longitudinal direction of the cell, the cross-sectional figure defined by the inner walls thereof is the same at any cross section from the exhaust gas inlet end to the exhaust gas outlet end excluding the plugged portion. The same shape means that the shapes are congruent, not similar. Specifically, a similar shape means a different shape. The explanation for the first exhaust gas introduction cell also applies to each second exhaust gas introduction cell and each exhaust gas emission cell. The plugged portions are excluded because the cross-sectional figure defined by the inner cell walls does not physically exists at the plugged portions due to the presence of the plugs.

The honeycomb filter according to the embodiments of the present invention can reduce the pressure loss as a whole throughout the use from the initial stage to accumulation of PM in an amount close to the limit, compared to conventional honeycomb filters.

In view of the above-described pressure loss broken down to resistance components, the flow resistance and the outflow resistance need to be reduced for reducing the initial pressure loss. Thus, the cross-sectional area of each exhaust gas emission cell needs to be equal to or larger than that of each exhaust gas introduction cell for suppressing the rapid expansion. In contrast, it is necessary to allow PM to widely and thinly accumulate for reducing the transitional pressure loss. Thus, the cross-sectional area of each exhaust gas introduction cell needs to be larger than that of each exhaust gas emission cell.

In other words, it has been considered impossible to reduce both the transitional pressure loss and the initial pressure loss. The present inventors further studied and accomplished the embodiments of the present invention described below.

That is, first, exhaust gas is preferentially introduced into the first exhaust gas introduction cells by the following configuration: two kinds of exhaust gas introduction cells including an exhaust gas introduction cell having a large cross-sectional area (second exhaust gas introduction cell) and an exhaust gas introduction cell having a small cross-sectional area (first exhaust gas introduction cells) are employed as the exhaust gas introduction cells; an exhaust gas emission cell having a cross-sectional area equal to or larger than that of the second exhaust gas introduction cell is employed; the exhaust gas emission cell is fully surrounded by the two kinds of the exhaust gas introduction cells; and the length of the inner wall separating the first exhaust gas introduction cell and the exhaust gas emission cell is longer than the length of the inner wall separating the second exhaust gas introduction cell and the exhaust gas emission cell, or the wall separating the first exhaust gas introduction cell and the exhaust gas emission cell is thinner than the wall separating the second exhaust gas introduction cell and the exhaust gas emission cell.

The wall separating the first exhaust gas introduction cell and the exhaust gas emission cell has a large passage area (in the case of the cross-sectional shape of a polygonal cell, the sides are long) or the wall is thin. Exhaust gas can thus pass through such a suitable wall so that the passage resistance of the factor (c) can be reduced. Also, the flow resistance of the factor (e) can be reduced because the cross-sectional area of each exhaust gas emission cell is larger than that of each first exhaust gas introduction cell.

Specifically, both the passage resistance of the factor (c) and the flow resistance of the factor (e) can be reduced, and thereby the initial pressure loss can be reduced. After accumulation of a certain amount of PM, since the cross-sectional area of each first exhaust gas introduction cell is smaller than that of each second exhaust gas introduction cell, an increase in the passage resistance occurs at an early time in a layer of PM accumulated in the first exhaust gas introduction cells. This leads to "switching" of the main flow passage of exhaust gas in a manner that a larger amount of the exhaust gas is naturally (i.e. autonomously) introduced into the second exhaust gas introduction cells. Consequently, PM widely and thinly accumulates in the second exhaust gas introduction cells each having a large cross-sectional area. Hence, even after accumulation of PM, both the flow resistance of the factor (b) and the passage resistance of the factor (d) can be reduced, and the transitional pressure loss can be reduced.

As described above, the embodiments of the present invention has achieved a surprising effect, which has been considered impossible, of reducing both the transitional pressure loss and the initial pressure loss by the autonomous switching of the main flow passage.

The above effect of reducing both the initial pressure loss and the transitional pressure loss by "switching" of the main flow passage into which a larger amount of exhaust gas is introduced is achieved only when the effects of all the above features are integrally exerted. Such structures or effects are nowhere disclosed in any known document.

Figure 17A:
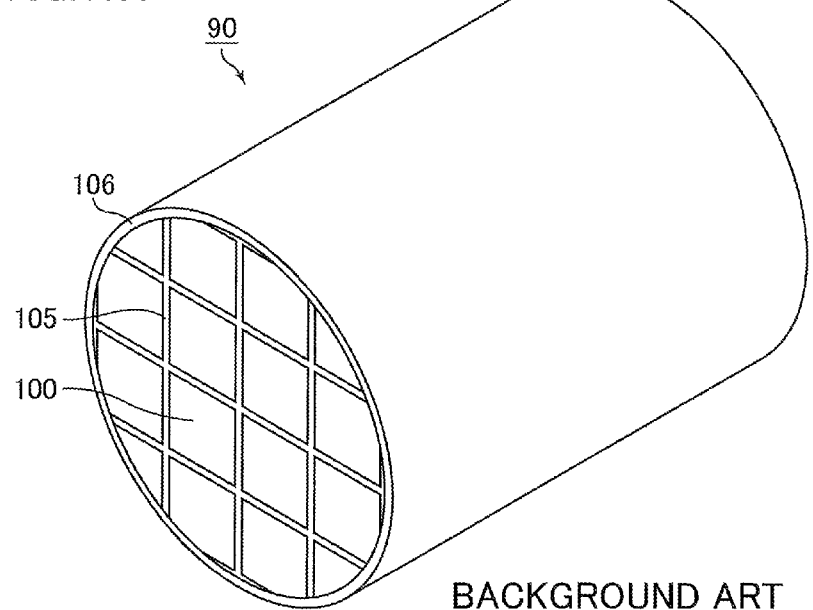
FIG. 17A is a perspective view schematically illustrating a honeycomb filter disclosed in WO 2004/024294.
Figure 17B:
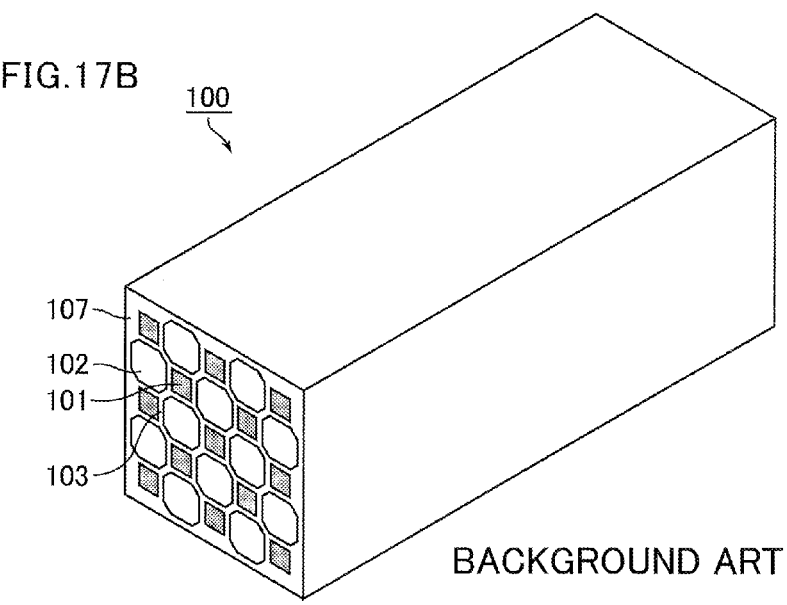
FIG. 17B is a perspective view schematically illustrating a honeycomb fired body forming the honeycomb filter.

The above international application: WO 2004/024294 discloses, as shown in FIGS. 17A and 17B, a honeycomb filter including exhaust gas introduction cells 102 each having an octagonal cross-sectional shape and exhaust gas emission cells 101 each having a rectangular cross-sectional shape, wherein an increase in the cross-sectional area of the exhaust gas introduction cells 102 allows wide and thin accumulation of PM, thus reducing the transitional pressure loss. However, for achieving the present invention in view of WO 2004/024294, some of the exhaust gas emission cells 101 each having a smaller cross-sectional area must be changed to the exhaust gas introduction cells 102, and some of the exhaust gas introduction cells 102 each having a larger cross-sectional area must be changed to the exhaust gas emission cells 101. Such changes contradict the inventive concept of the invention of WO 2004/024294 to increase the cross-sectional area of the exhaust gas introduction cells 102. Thus, the present invention cannot be achieved in view of WO 2004/024294 as the closest background art document.

Figure 18A:
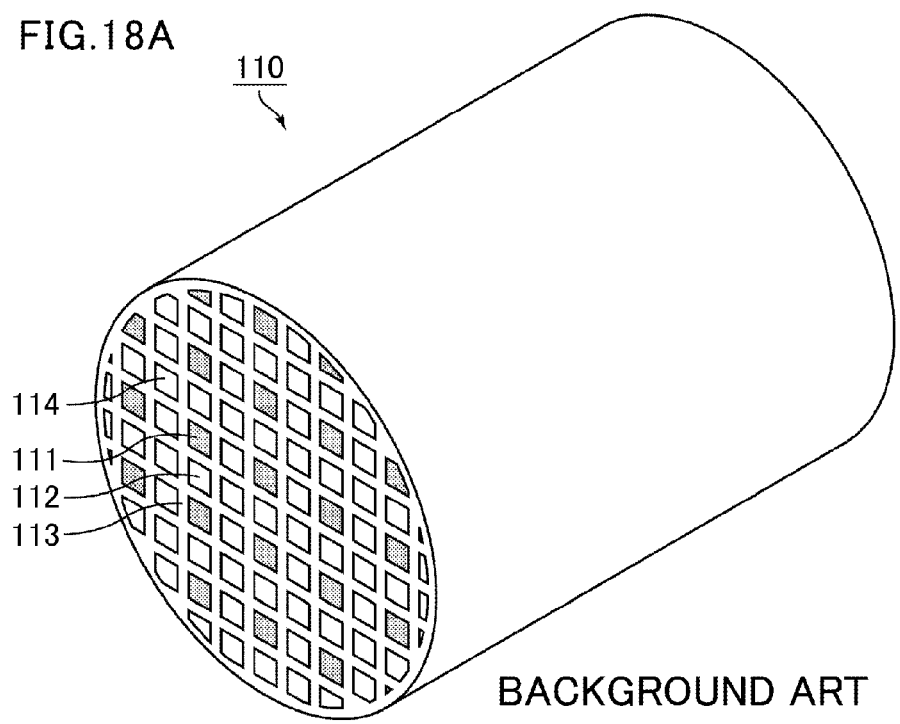
FIG. 18A is a perspective view schematically illustrating a honeycomb filter disclosed in U.S. Pat. No. 4,417,908.
Figure 18B:
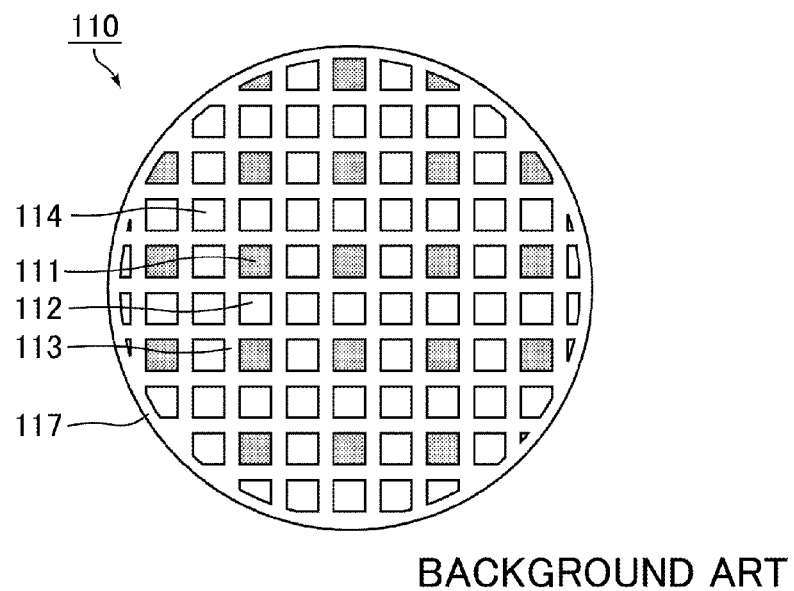
FIG. 18B is an end face view schematically illustrating an end face of the honeycomb filter.

Also, as explained above based on FIGS. 18A and 18B, U.S. Pat. No. 4,417,908 discloses a honeycomb filter which can reduce the transitional pressure loss by increasing the number of exhaust gas introduction cells each having the same cross-sectional area to increase the total area of the exhaust gas introduction cells, so that PM is allowed to widely and thinly accumulate.

However, for achieving the present invention in view of U.S. Pat. No. 4,417,908, some of the exhaust gas introduction cells must be changed to cells each having a small cross-sectional area. Such a change reduces the cross-sectional area of the exhaust gas introduction cells, and thus contradicts the inventive concept of U.S. Pat. No. 4,417,908. Hence, the present invention is not achieved in view of U.S. Pat. No. 4,417,908 as the closest background art document.

The background art contradicts the present invention, and thus the present invention cannot be achieved in view of the background art documents.

The effects of the embodiments of the present invention will be explained in details with reference to embodiments as examples.

Figure 4A:
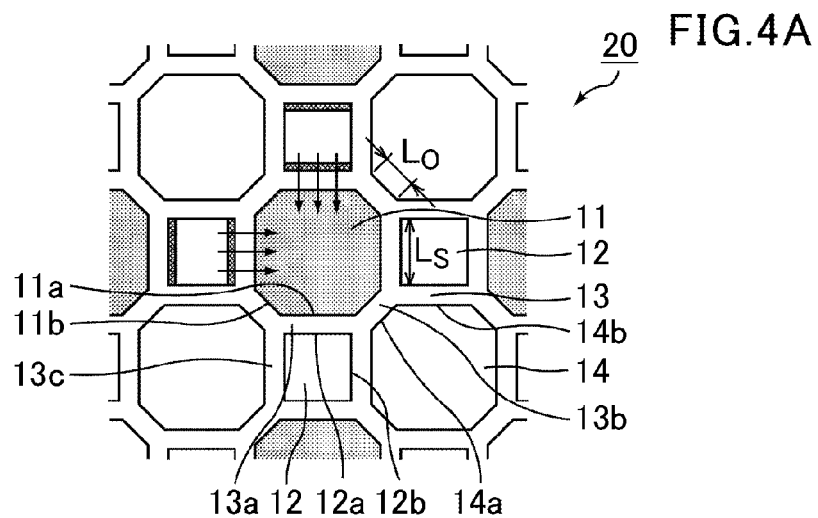
FIGS. 4A to 4C are enlarged end face views each illustrating an enlarged image of a part of an end face of a honeycomb filter according to one embodiment of the present invention.
Figure 4B:
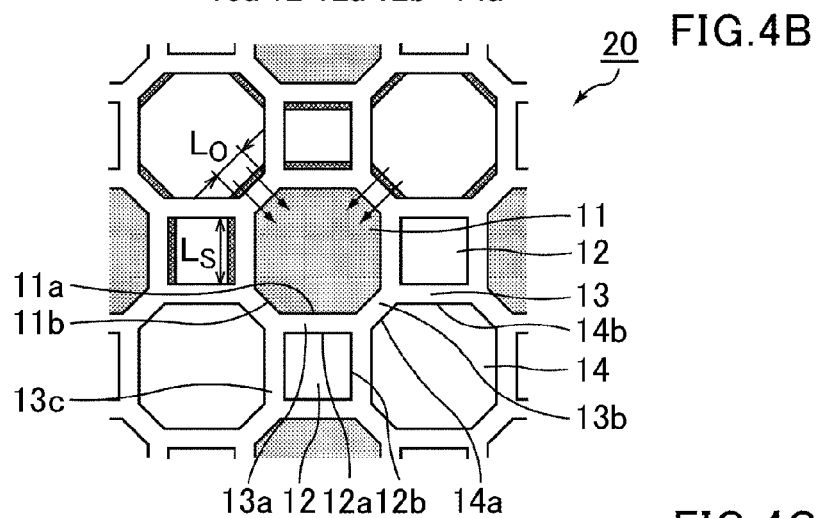
Figure 4C:
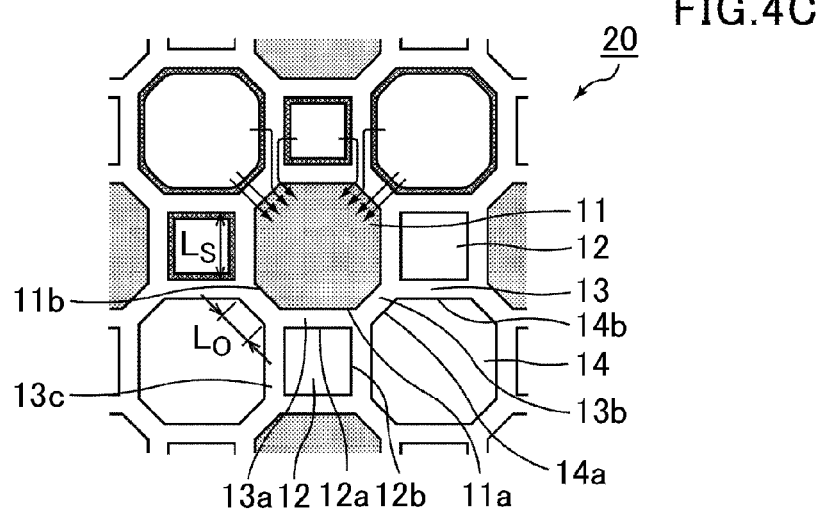

FIGS. 4A to 4C are enlarged end face views each illustrating an enlarged image of a part of an end face of the honeycomb filter according to one embodiment of the present invention.

As shown in FIG. 4A, in a honeycomb filter 20, each exhaust gas emission cell 11 having an open end at an exhaust gas outlet side and a plugged end at an exhaust gas inlet side is adjacently surrounded fully by first exhaust gas introduction cells 12 and second exhaust gas introduction cells 14 each having an open end at the exhaust gas inlet side and a plugged end at the exhaust gas outlet side across porous cell walls 13.

In the cross section perpendicular to the longitudinal direction of the cells, each exhaust gas emission cell 11 has an octagonal cross section that is the same as or similar to that of each exhaust gas introduction cell 102 shown in FIGS. 17A and 17B, each first exhaust gas introduction cell 12 has a square cross section, and each second exhaust gas introduction cell 14 has an octagonal square section that is the same as that of the exhaust gas emission cell 11. The cross-sectional area of each second exhaust gas introduction cell 14 is larger than that of each first exhaust gas introduction cell 12 and is equal to that of each exhaust gas emission cell 11. That is, the cross-sectional area of each second exhaust gas introduction cell 14 is equal to that of each exhaust gas emission cell 11, and the cross-sectional area of each exhaust gas emission cell 11 is larger than that of each first exhaust gas introduction cell 12. Thus, the resistance generated upon flowing of exhaust gas through the exhaust gas emission cells 11 and the resistance generated upon flowing out of exhaust gas to the outside of the filter are reduced to low levels, and thereby the pressure loss can be reduced.

Moreover, the side 12a that faces the exhaust gas emission cell 11 among the sides forming the cross-sectional shape of each first exhaust gas introduction cell 12 is longer than the side 14a that faces the exhaust gas emission cell 11 among the sides forming the cross-sectional shape of each second exhaust gas introduction cell 14.

Exhaust gas flowing toward the honeycomb filter 20 flows into the first exhaust gas introduction cells 12 each having an open end at the inlet side and the second exhaust gas introduction cells 14 each having an open end at the inlet side. The exhaust gas flows in the filter from a part where the exhaust gas can easily flow and then evenly flows in the entire filter. In the honeycomb filter according to the embodiments of the present invention, the length (Ls) of the side 12a of first exhaust gas introduction cell 12 is longer than the length (Lo) of the side 14a of the second exhaust gas introduction cell 14, so that the surface area of a cell wall 13a separating the exhaust gas emission cell 11 and the first exhaust gas introduction cell 12 is larger than the surface area of a cell wall 13b separating the exhaust gas emission cell 11 and the second exhaust gas introduction cell 14. Thus, the exhaust gas can more easily pass through each cell wall 13a. As a result, PM accumulates on each cell wall 13a at an initial stage.

As described above, both the flow resistance of the exhaust gas emission cells and the outflow resistance generated upon flowing of exhaust gas out of the honeycomb filter can be reduced. Thus, the initial pressure loss before accumulation of PM can be reduced.

The relationship between the length of a side forming a cell and the surface area is determined based on the following reasons.

Provided that the surface area of the cell wall 13a separating the exhaust gas emission cell 11 and the first exhaust gas introduction cell 12 corresponds to the surface area of the inner wall of the first exhaust gas introduction cell 12, and the effective length of the filter from the exhaust gas inlet end to the exhaust gas outlet end excluding the length of the plugged portions at the inlet side and the outlet side is expressed as Le (see FIG. 6B), then the surface area of the inner wall of the first exhaust gas introduction cell 12 can be expressed as Ls×Le. Similarly, provided that the surface area of the cell wall 13b separating the exhaust gas emission cell 11 and the second exhaust gas introduction cell 14 corresponds to the surface area of the inner wall of the second exhaust gas introduction cell 14, and the effective length of the filter from the exhaust gas inlet end to the exhaust gas outlet end excluding the length of the plugged portions at the inlet side and the outlet side is expressed as Le, then the surface area of the inner wall of the second exhaust gas introduction cell 14 can be expressed as Lo×Le. It should be noted that the effective length of the filter is defined as a length measured from the tip of a plug 11 in FIG. 6B.

Thus, if the length (Ls) of the side 12a is longer than the length (Lo) of the side 14a, the surface area Ls×Le is greater than the surface area Lo×Le. In other words, the length of the side corresponds to the surface area. Thus, if the length (Ls) of the side 12a of the first exhaust gas introduction cell 12 is longer than the length (Lo) of the side 14a of the second exhaust gas introduction cell 14, the surface area of the cell wall 13a separating the exhaust gas emission cell 11 and the first exhaust gas introduction cell 12 is larger than the surface area of the cell wall 13b separating the exhaust gas emission cell 11 and the second exhaust gas introduction cell 14.

In FIGS. 4A to 4C, information relating to the effects is shown for some parts only.

Next, as shown in FIG. 4B, after a certain amount of PM accumulates on the cell walls 13a corresponding to the inner walls of the first exhaust gas introduction cells 12, a layer of accumulated PM becomes thick due to the small cross-sectional area of the first exhaust gas introduction cells 12. Consequently, the resistance due to the accumulation of PM increases, making it difficult for the exhaust gas to pass through the cell walls 13a. Under such conditions, the exhaust gas starts to pass through the cell walls 13b each separating the exhaust gas emission cell 11 and the second exhaust gas introduction cell 14 (switching of the main flow passage). Then, PM will also accumulate on the surfaces of the cell walls 13b corresponding to the surfaces of the inner walls of the second exhaust gas introduction cells 14.

Subsequently, since exhaust gas can considerably freely pass through the cell walls, exhaust gas will also pass through inside cell walls 13c each separating the first exhaust gas introduction cell 12 and the second exhaust gas introduction cell 14 to flow into the exhaust gas emission cells 11 as shown in FIG. 4C. In this case, the exhaust gas enters the cell walls 13c from both the second exhaust gas introduction cells 14 and the first exhaust gas introduction cells 12.

As described above, PM accumulates not only on the entire surface of the inner walls of the first exhaust gas introduction cells 12 (the inner walls corresponding to the cell walls 13a and 13c around the first exhaust gas introduction cells 12) but also gradually accumulate in a larger amount but more widely and thinly on the entire surface of the inner walls of the second exhaust gas introduction cells 14 (the inner walls corresponding to the cell walls 13b and 13c around the second exhaust gas introduction cells 14). The first exhaust gas introduction cells 12 each have a smaller cross-sectional area than each second exhaust gas introduction cell 14, and thus PM accumulates in a thick layer, resulting in high passage resistance of the PM layer. Consequently, after exhaust gas is introduced, the introduced exhaust gas will start flowing more easily into the second exhaust gas introduction cells 14 than into the first exhaust gas introduction cells 12 at an early stage (i.e., the above-described switching of the main flow passage of exhaust gas), causing the above-described shift of the PM accumulation. Consequently, PM accumulates more on the entire surface of the inner walls of the second exhaust gas introduction cells 14 (the inner walls corresponding to the cell walls 13b and 13c around the second exhaust gas introduction cells 14) rather than on the surface of the inner walls of the first exhaust gas introduction cells 12 (the inner walls corresponding to the cell walls 13a and 13c around the first exhaust gas introduction cells 12). Thus, the entire surface of the inner walls of the second exhaust gas introduction cells 14 (the inner walls corresponding to the cell walls 13b and 13c around the second exhaust gas introduction cells 14) can be utilized for accumulation of PM at an early stage. In addition, the surface area of the inner walls of the second exhaust gas introduction cells 14 (the inner walls corresponding to the cell walls 13b and 13c around the second exhaust gas introduction cells 14) is larger than the surface area of the inner walls of the first exhaust gas introduction cells 12 (the inner walls corresponding to the cell walls 13a and 13c around the first exhaust gas introduction cells 12), so that even when PM accumulates on the entire peripheries of the cell walls 13b and 13c around the second exhaust gas introduction cells 14, the layer of accumulation can be rendered thin. Thus, the pressure loss due to exhaust gas increases at a low rate even after accumulation of PM. Hence, a surprisingly excellent effect of maintaining the pressure loss at a low level can be achieved even after an increase in the amount of accumulated PM.

As a result, in vehicles carrying the honeycomb filter according to the embodiments of the present invention, a phenomenon that is disadvantageous to driving due to an increase in the pressure loss is less likely to occur throughout the period of use, and good fuel economy is achieved.

In the honeycomb filter according to the embodiments of the present invention, in the case where the cross-sectional shape of each exhaust gas emission cell and each first exhaust gas introduction cell adjacent to each other across the cell wall is polygonal in the direction perpendicular to the longitudinal direction of the cells, the following sides are preferably parallel to each other: a side, among the sides forming the cross-sectional shape of each exhaust gas emission cell, that is adjacent to and faces the first exhaust gas introduction cell across a cell wall; and a side, among the sides forming the cross-sectional shape of the first exhaust gas introduction cell, that is adjacent to and faces the exhaust gas emission cell across the cell wall.

This indicates that the thickness of the cell walls each separating the exhaust gas emission cell and the first exhaust gas introduction cell is uniform throughout the cell walls, which achieves high fracture strength of the filter, easy passage of exhaust gas, and uniform accumulation of PM. Thus, the pressure loss can be reduced.

In the case where the vertex portions of the polygonal cross section are formed by curved lines, the curve portions are not considered as sides because naturally such portions do not form parallel lines.

Provided that, in the cross section perpendicular to the longitudinal direction of the cells, straight portions considered as sides are hypothetically extended and intersections of the hypothetical straight lines are considered as hypothetical vertices, then the length of each side of the cross-sectional shape excluding the curve portions is preferably not less than 80% of the length of a hypothetical side of a polygon that is formed by connecting the hypothetical vertices. In other words, the length of the portion not considered as a side is preferably less than 20% of the length of the hypothetical side.

In the case of the cell having a polygonal cross-sectional shape, as long as the length of each side is not less than 80% of the length of the hypothetical side, the main-passage-switching effect, which is an effect of the embodiments of the present invention, can be achieved by controlling the length of the sides.

In the honeycomb filter according to the embodiments of the present invention, in the case where the cross-sectional shape of each exhaust gas emission cell and each second exhaust gas introduction cell adjacent to each other across the cell wall is polygonal in the direction perpendicular to the longitudinal direction of the cells, the following sides are preferably parallel to each other: a side, among the sides forming the cross-sectional shape of each exhaust gas emission cell, that is adjacent to and faces the second exhaust gas introduction cell across a cell wall; and a side, among the sides forming the cross-sectional shape of the second exhaust gas introduction cell, that is adjacent to and faces the exhaust gas emission cell across the cell wall.

This indicates that the thickness of the cell walls separating the exhaust gas emission cells and the second exhaust gas introduction cells is uniform throughout the cell walls, which achieves high fracture strength of the filter, easy passage of exhaust gas, and uniform accumulation of PM. Thus, the pressure loss can be reduced.

In the case where the vertex portions of the polygonal cross-sectional shape are formed by curved lines, the curve portions are not considered as sides because naturally such portions do not form parallel lines.

Provided that, in the cross section perpendicular to the longitudinal direction of the cells, straight portions considered as sides are hypothetically extended and intersections of the hypothetical straight lines are considered as hypothetical vertices, then the length of each side of the cross-sectional shape excluding the curve portions is preferably not less than 80% of the length of a hypothetical side of a polygon that is formed by connecting the hypothetical vertices. In other words, the length of the portion not considered as a side is preferably less than 20% of the length of the hypothetical side.

In the case of the cell having a polygonal cross-sectional shape, if the length of the side is not less than 80% of the length of the hypothetical side, the main-passage-switching effect, which is an effect of the embodiments of the present invention, can be achieved by controlling the length of the sides.

In the honeycomb filter according to the embodiments of the present invention, in the case where the cross-sectional shape of each first exhaust gas introduction cell and each second exhaust gas introduction cell adjacent to each other across the cell wall is polygonal in the direction perpendicular to the longitudinal direction of the cells, the following sides are preferably parallel to each other: a side, among the sides forming the cross-sectional shape of each first exhaust gas introduction cell, that is adjacent to and faces the second exhaust gas introduction cell across a cell wall; and a side, among the sides forming the cross-sectional shape of the second exhaust gas introduction cell, that is adjacent to and faces the first exhaust gas introduction cell across the cell wall.

This indicates that the thickness of the walls each separating the first exhaust gas introduction cell and the second exhaust gas introduction cell is uniform throughout the walls, which achieves high fracture strength of the honeycomb filter, easy exhaust gas passage through the walls from the second exhaust gas introduction cells to the exhaust gas emission cells, and wide, thin and uniform accumulation of PM on the inner cell walls of the second exhaust gas introduction cells. Thus, low pressure loss can be achieved after accumulation of PM.

In the case where the vertex portions of the polygonal cross section are formed by curved lines, the curve portions are not considered as sides because naturally such portions do not form parallel lines.

Provided that, in the cross section perpendicular to the longitudinal direction of the cells, if straight portions considered as sides are hypothetically extended and intersections of the hypothetical straight lines are considered as hypothetical vertices, then the length of each side of the cross-sectional shape excluding the curve portions is preferably not less than 80% of the length of a hypothetical side of a polygon that is formed by connecting the hypothetical vertices. In other words, the length of the portion not considered as a side is preferably less than 20% of the length of the hypothetical side.

In the case of the cell having a polygonal cross-sectional shape, as long as the length of each side is not less than 80% of the length of the hypothetical side, the main-passage-switching effect, which is an effect of the embodiments of the present invention, can be achieved by controlling the length of the sides.

According to the honeycomb filter of the embodiments of the present invention, in the case where the cross-sectional shape of each exhaust gas emission cell, each first exhaust gas introduction cell, and each second exhaust gas introduction cell, which are adjacent to one another across the cell walls, is polygonal in the direction perpendicular to the longitudinal direction of the cells, the following sides of each pair are preferably parallel to each other:

(a) a side, among the sides forming the cross-sectional shape of each exhaust gas emission cell, that is adjacent to and faces the first exhaust gas introduction cell across a cell wall; and a side, among the sides forming the cross-sectional shape of the first exhaust gas introduction cell, that is adjacent to and faces the exhaust gas emission cell across the cell wall, (b) a side, among the sides forming the cross-sectional shape of each exhaust gas emission cell, that is adjacent to and faces the second exhaust gas introduction cell across a cell wall; and a side, among the sides forming the cross-sectional shape of the second exhaust gas introduction cell, that is adjacent to and faces the exhaust gas emission cell across the cell wall, and (c) a side, among the sides forming the cross-sectional shape of each first exhaust gas introduction cell, that is adjacent to and faces the second exhaust gas introduction cell across a cell wall; and a side, among the sides forming the cross-sectional shape of the second exhaust gas introduction cell, that is adjacent to and faces the first exhaust gas introduction cell across the cell wall.

Moreover, according to the honeycomb filter of the embodiments of the present invention, in the case where the cross-sectional shape of each first exhaust gas introduction cell, each second exhaust gas introduction cell, and each exhaust gas emission cell is polygonal in the direction perpendicular to the longitudinal direction of the cells, the honeycomb filter is preferably configured such that the above conditions (a), (b), and (c) are satisfied and also such that the distance between the parallel sides (a), the distance between the parallel sides (b), and the distance between the parallel sides (c) above are the same. Here, the distance between the sides is defined as follows: a hypothetical perpendicular line is drawn from an arbitrary point P in one side to a point Q in the other side, and the distance between the point P and the point Q is defined as the distance between the parallel sides.

The honeycomb filter having the above structure has the highest fracture strength, can best reduce the pressure loss regardless of before or after accumulation of PM, and can suppress damage to the filter due to thermal shock that occurs during regeneration of PM.

Meanwhile, in the case where the vertex portions of the polygonal cross section are formed by curved lines, the curve portions are not considered as sides because naturally such portions do not form parallel lines.

Provided that, in the cross section perpendicular to the longitudinal direction of the cells, straight portions considered as sides are hypothetically extended and intersections of the hypothetical straight lines are considered as hypothetical vertices, then the length of each side of the cross-sectional shape excluding the curve portions is preferably not less than 80% of the length of a hypothetical side of a polygon that is formed by connecting the hypothetical vertices. In other words, the length of the portion not considered as a side is preferably less than 20% of the length of the hypothetical side.

In the case of the cell having a polygonal cross-sectional shape, if the length of each side is not less than 80% of the length of the hypothetical side, the main-passage-switching effect, which is an effect of the embodiments of the present invention, can be achieved by controlling the length of the sides.

The honeycomb filter according to the embodiments of the present invention is preferably used to purify PM in exhaust gas discharged from an internal combustion engine of an automobile. The honeycomb filter can reduce both the initial pressure loss that occurs before accumulation of PM and the transitional pressure loss caused by accumulation of PM in the filter, and thus the fuel economy of the engine can be enhanced.

The honeycomb filter according to the embodiments of the present invention is most suitably used in an automobile whose internal combustion engine is a diesel engine. The amount of PM discharged from a diesel engine is larger than that from a gasoline engine. Thus, a demand to reduce the transitional pressure loss caused by accumulation of PM in the filter is higher for diesel engines than for gasoline engines.

In the case of using the honeycomb filter according to the embodiments of the present invention to purify PM in exhaust gas discharged from an internal combustion engine of an automobile, the honeycomb filter according to the embodiments of the present invention is fixed inside an exhaust tube via a holding material.

In the honeycomb filter according to the embodiments of the present invention in the cross section perpendicular to the longitudinal direction of the cells, preferably, the exhaust gas emission cells and the exhaust gas introduction cells are all polygonal, and a side facing the exhaust gas emission cell among the sides forming the cross-sectional shape of each second exhaust gas introduction cell has a length that is not more than 0.8 times the length of a side facing the exhaust gas emission cell among the sides forming the cross-sectional shape of each first exhaust gas introduction cell.

The honeycomb filter having the above structure enables easier passage of exhaust gas through the cell walls separating the exhaust gas emission cells and the first exhaust gas introduction cells. Thus, the initial pressure loss can be effectively suppressed and an increase in the rate of increase of the pressure loss after accumulation of PM can also be suppressed.

If the ratio of the length of the side of the second exhaust gas introduction cell to the length of the side of the first exhaust gas introduction cell exceeds 0.8, the initial pressure loss will be difficult to suppress because the difference in the length between these sides is insignificant.

In the honeycomb filter according to the embodiments of the present invention, in the direction perpendicular to the longitudinal direction of the cells, preferably, the exhaust gas emission cells are octagonal, the first exhaust gas introduction cells are square, and the second exhaust gas introduction cells are octagonal.

The honeycomb filter having the above structure has the same shape as the honeycomb filter in FIGS. 4A to 4C whose effects are described above. Thus, the honeycomb filter can effectively suppress the initial pressure loss, have a large surface area on which PM accumulates, and thus can maintain the pressure loss at a low level.

In the honeycomb filter according to the embodiments of the present invention, in the cross section perpendicular to the longitudinal direction of the cells, preferably, the cross-sectional area of each second exhaust gas introduction cell is equal to that of each exhaust gas emission cell, and the cross-sectional area of the first exhaust gas introduction cell is 20 to 50% of the cross-sectional area of the second exhaust gas introduction cell.

The honeycomb structure having the above structure can provide difference between the resistance generated upon flowing of exhaust gas through the first exhaust gas introduction cells and the resistance generated upon flowing of exhaust gas through the second exhaust gas introduction cells, thus effectively suppressing the pressure loss.

If the cross-sectional area of the first exhaust gas introduction cell is less than 20% of the cross-sectional area of the second exhaust gas introduction cell, the flow resistance generated upon flowing of exhaust gas through the first exhaust gas introduction cell will increase and the pressure loss tends to be high because the cross-sectional area of the first exhaust gas introduction cell is too small. If the cross-sectional area of the first exhaust gas introduction cell is more than 50% of the cross-sectional area of the second exhaust gas introduction cell, the pressure loss will be difficult to reduce because the difference in passage resistance between these cells is small.

In the honeycomb filter according to the embodiments of the present invention, the cell walls separating the cells preferably have a uniform thickness throughout the cell walls.

The honeycomb filter having this structure can exert the above-mentioned effects through its entire body.

The honeycomb filter according to the embodiments of the present invention preferably has a cell wall thickness of 0.10 to 0.46 mm.

The above cell wall thickness is sufficient to capture PM in exhaust gas, and an increase in the pressure loss can be effectively suppressed. Hence, the honeycomb filter according to the embodiments of the present invention can sufficiently achieve the above effects as the honeycomb filter according to the embodiments of the present invention.

If the cell wall thickness is less than 0.10 mm, the mechanical strength of the honeycomb filter will be low because the cell wall is too thin. If the cell wall thickness exceeds 0.46 mm, the pressure loss generated upon passage of exhaust gas through the cell wall will increase because the cell wall is too thick.

In the honeycomb filter according to the embodiments of the present invention, in the direction perpendicular to the longitudinal direction of the cells, preferably, the exhaust gas emission cells each have an octagonal cross section, the first exhaust gas introduction cells each have a square cross section, and the second exhaust gas introduction cells each have an octagonal cross section, the cross-sectional shape of each second exhaust gas introduction cell is congruent with the cross-sectional shape of each exhaust gas emission cell, and the exhaust gas emission cells, the first exhaust gas introduction cells, and the second exhaust gas introduction cells are arranged in the following manner:

the exhaust gas emission cells are each surrounded by four first exhaust gas introduction cells and four second exhaust gas introduction cells, which are alternately arranged, across the porous cell walls;

provided that hypothetical segments connecting the centroids of the octagonal cross sections of the four second exhaust gas introduction cells surrounding an exhaust gas emission cell are drawn, then the intersection of two hypothetical segments intersecting a shape region corresponding to the cross-sectional shape of the exhaust gas emission cell coincides with the centroid of the octagonal cross section of the exhaust gas emission cell; and four hypothetical segments that do not intersect the shape region corresponding to the cross-sectional shape of the exhaust gas emission cell form a square, and the midpoint of each side of the square coincides with the centroid of each square cross section of the four first exhaust gas introduction cells surrounding the exhaust gas emission cell, a side facing the first exhaust gas introduction cell across a cell wall among the sides forming the cross-sectional shape of each exhaust gas emission cell is parallel to a side facing the exhaust gas emission cell across the cell wall among the sides forming the cross-sectional shape of the first exhaust gas introduction cell, a side facing the second exhaust gas introduction cell across a cell wall among the sides forming the cross-sectional shape of each exhaust gas emission cell is parallel to a side facing the exhaust gas emission cell across the cell wall among the sides forming the cross-sectional shape of the second exhaust gas introduction cell, a side facing the second exhaust gas introduction cell across a cell wall among the sides forming the cross-sectional shape of each first exhaust gas introduction cell is parallel to a side facing the first exhaust gas introduction cell across the cell wall among the sides forming the cross-sectional shape of the second exhaust gas introduction cell, and the distance between the parallel sides is the same in any pair.

In the honeycomb filter according to the embodiments of the present invention, preferably the outer wall has corner portions, and a side, which contacts the outer wall, of each exhaust gas introduction cell adjacent to the outer wall is straight and parallel to a side defining an outer surface of the outer wall so that the thickness of the outer wall is uniform excluding the corner portions in the cross section perpendicular to the longitudinal direction of the cells.

The pattern (2) in the above description of three patterns concerning the outer wall and the exhaust gas introduction cell adjacent to the outer wall applies to the honeycomb filter of such an embodiment.

The above-mentioned structure enables not only enhancement of the strength of the honeycomb fired body by the outer wall but also further reduction of the partial variation in the volume ratio between the exhaust gas emission cells and the exhaust gas introduction cells in the honeycomb fired body. Consequently, the uniform flow of exhaust gas is achieved so that the pressure loss can be reduced.

In the honeycomb filter according to the embodiments of the present invention, in the direction perpendicular to the longitudinal direction of the cells, preferably, the exhaust gas emission cells, the first exhaust gas introduction cells, and the second exhaust gas introduction cells are all square.

Even when the first exhaust gas introduction cells and the second exhaust gas introduction cells all have a square cross section, the exhaust gas emission cells, the first exhaust gas introduction cells, and the second exhaust gas introduction cells are different in terms of size, position, or the like (for example, the cross-sectional area of each first exhaust gas introduction cell is smaller than that of each exhaust gas emission cell), so that the honeycomb filter according to the embodiments of the present invention can achieve the above effects, unlike the honeycomb filter 110 of the background art described above.

In the honeycomb filter according to the embodiments of the present invention, in the direction perpendicular to the longitudinal direction of the cells, preferably, the cross-sectional area of each second exhaust gas introduction cell is equal to that of each exhaust gas emission cell, and the cross-sectional area of each first exhaust gas introduction cell is 20 to 50% of the cross-sectional area of each second exhaust gas introduction cell.

The honeycomb filter having the above structure can create a difference between the resistance generated upon flowing of exhaust gas through the first exhaust gas introduction cells and the resistance generated upon flowing of exhaust gas through the second exhaust gas introduction cells, thus effectively suppressing the pressure loss.

If the cross-sectional area of the first exhaust gas introduction cell is less than 20% of the cross-sectional area of the second exhaust gas introduction cell, the flow resistance generated upon flowing of exhaust gas through the first exhaust gas introduction cell will increase and the pressure loss tends to be high because the cross-sectional area of the first exhaust gas introduction cell is too small. If the cross-sectional area of the first exhaust gas introduction cell is more than 50% of the cross-sectional area of the second exhaust gas introduction cell, the pressure loss will be difficult to reduce because the difference in flow resistance between these cells is small.

In the honeycomb filter according to the embodiments of the present invention, in the direction perpendicular to the longitudinal direction of the cells, preferably, the exhaust gas emission cells have a square cross section, the first exhaust gas introduction cells have a square cross section, and the second exhaust gas introduction cells have a square cross section, the cross-sectional shape of each second exhaust gas introduction cell is congruent with the cross-sectional shape of each exhaust gas emission cell, the exhaust gas emission cells, the first exhaust gas introduction cells, and the second exhaust gas introduction cells are arranged in the following manner:

the exhaust gas emission cells are each surrounded by four first exhaust gas introduction cells and four second exhaust gas introduction cells, which are alternately arranged, across the porous cell walls;

provided that hypothetical segments connecting the centroids of the square cross sections of the four second exhaust gas introduction cells surrounding an exhaust gas emission cell are drawn, then an intersection of two hypothetical segments intersecting a shape region corresponding to the cross-sectional shape of the exhaust gas emission cell coincides with the centroid of the square cross section of the exhaust gas emission cell; and four hypothetical segments that do not intersect the shape region corresponding to the cross-sectional shape of the exhaust gas emission cell form a square, and the midpoint of each side of the square coincides with the centroid of each square cross section of the four first exhaust gas introduction cells surrounding the exhaust gas emission cell, and a side facing the first exhaust gas introduction cell across a cell wall among the sides forming the cross-sectional shape of each exhaust gas emission cell is parallel to a side facing the exhaust gas emission cell across the cell wall among the sides forming the cross-sectional shape of the first exhaust gas introduction cell, a side facing the second exhaust gas introduction cell across a cell wall among the sides forming the cross-sectional shape of each first exhaust gas introduction cell is parallel to a side facing the first exhaust gas introduction cell across the cell wall among the sides forming the cross-sectional shape of the second exhaust gas introduction cell, and the distance between the parallel sides is the same in any pair.

In the honeycomb filter according to the embodiments of the present invention, preferably the outer wall has corner portions, and a side, which contacts the outer wall, of each exhaust gas introduction cell adjacent to the outer wall is straight and parallel to a side defining an outer surface of the outer wall so that the thickness of the outer wall is uniform excluding the corner portions in the cross section perpendicular to the longitudinal direction of the cells.

The pattern (2) in the above description of three patterns concerning the outer wall and the exhaust gas introduction cell adjacent to the outer wall applies to the honeycomb filter of such an embodiment.

The above-mentioned structure enables not only enhancement of the strength of the honeycomb fired body by the outer wall but also further reduction of the partial variation in the volume ratio between the exhaust gas emission cells and the exhaust gas introduction cells in the honeycomb fired body. Consequently, the uniform flow of exhaust gas is achieved so that the pressure loss can be reduced.

In the honeycomb filter according to the embodiments of the present invention, in the cross section perpendicular to the longitudinal direction of the above cells, preferably, the vertex portions of the polygonal cells are formed by curved lines.

The honeycomb filter having cells with vertex portions formed by curved lines according to the above structure are not susceptible to concentration of stress derived from heat or the like in the corner portions of the cells. Thus, cracks are not easily formed.

In the honeycomb filter according to the embodiments of the present invention, in the direction perpendicular to the longitudinal direction of the cells, preferably the exhaust gas emission cells, the first exhaust gas introduction cells, and the second exhaust gas introduction cells are point-symmetrical polygons each having not more than eight sides.

The cells each having a point-symmetrical polygonal shape with not more than eight sides can reduce the resistance generated upon flowing of exhaust gas through the cells, and thus can further reduce the pressure loss.

In the honeycomb filter according to the embodiments of the present invention, preferably, the exhaust gas introduction cells include two kinds of cells including first exhaust gas introduction cells and second exhaust gas introduction cells having a larger cross-sectional area than the first exhaust gas introduction cells in a direction perpendicular to the longitudinal direction of the cells, the cross-sectional area of each exhaust gas emission cell in a direction perpendicular to the longitudinal direction of the cell is equal to or larger than that of each second exhaust gas introduction cell in a direction perpendicular to the longitudinal, and in the cross section perpendicular to the longitudinal direction of the cells, the exhaust gas introduction cells and the exhaust gas emission cells are formed by curved lines, and the cell wall separating the first exhaust gas introduction cell and the exhaust gas emission cell is thinner than the cell wall separating the second exhaust gas introduction cell and the exhaust gas emission cell.

In the honeycomb filter according to the embodiments of the present invention, if the cell wall separating the first exhaust gas introduction cell and the exhaust gas emission cell is thinner than the cell wall separating the second exhaust gas introduction cell and the exhaust gas emission cell, exhaust gas easily passes through the cell walls each separating the first exhaust gas introduction cell and the exhaust gas emission cell at an initial stage. Then, after accumulation of a certain amount of PM, exhaust gas starts passing through the cell walls each separating the second exhaust gas introduction cell and the exhaust gas emission cell. In addition, the second exhaust gas introduction cells have a larger cross-sectional area than the first exhaust gas introduction cells, and the cross-sectional area of each exhaust gas emission cell is equal to or larger than that of each second exhaust gas introduction cell. Thus, the above effects of the embodiments of the present invention can be achieved.

In the honeycomb filter according to the embodiments of the present invention, in the cross section perpendicular to the longitudinal direction of the cells, preferably, the exhaust gas introduction cells and the exhaust gas emission cells are formed by curved lines, and the thickness of the cell walls each separating the first exhaust gas introduction cell and the exhaust gas emission cell is 40 to 75% of the thickness of the cell walls each separating the second exhaust gas introduction cell and the exhaust gas emission cell.

In the case where the thickness of the cell walls each separating the first exhaust gas introduction cell and the exhaust gas emission cell is 40 to 75% of the thickness of the cell walls each separating the second exhaust gas introduction cell and the exhaust gas emission cell in the honeycomb filter according to the embodiments of the present invention, the main-channel-switching effect is enhanced. Thus, the above-mentioned effects of the embodiments of the present invention are more effectively achieved.

If the thickness of the cell wall separating the first exhaust gas introduction cell and the exhaust gas emission cell is less than 40% of the thickness of the cell wall separating the second exhaust gas introduction cell and the exhaust gas emission cell, the honeycomb filter will have poor mechanical characteristics because the cell walls each separating the first exhaust gas introduction cell and the exhaust gas emission cell have to be extremely thin. If the thickness of the cell wall separating the first exhaust gas introduction cell and the exhaust gas emission cell is more than 75% of the thickness of the cell wall separating the second exhaust gas introduction cell and the exhaust gas emission cell, the above pressure loss reduction effect may not be obtained because the difference in the thickness between these cell walls is insignificant.

In the honeycomb filter according to the embodiments of the present invention, in the direction perpendicular to the longitudinal direction of the cells, preferably, the exhaust gas emission cells, the first exhaust gas introduction cells, and the second exhaust gas introduction cells are all circular.

In the honeycomb filter having the above structure, even if the cross-sectional shapes of the exhaust gas emission cells, first exhaust gas introduction cells, and the second exhaust gas introduction cells are all round, the effects of the embodiments of the present invention can be exerted.

In the honeycomb filter according to the embodiments of the present invention, in the direction perpendicular to the longitudinal direction of the cells, the exhaust gas emission cells and the second exhaust gas introduction cells each preferably have a convex square cross section formed by four outwardly curved lines, whereas the first exhaust gas introduction cells each preferably have a concave square cross section formed by four inwardly curved lines.

The term "convex square" as used herein refers to a shape formed by four outwardly curved lines of the same length. The square looks as if its sides bulge from the centroid to the outside. The term "concave square" refers to a shape formed by four inwardly curved lines of the same length. The square looks as if its sides concave toward the centroid.

In this honeycomb filter, the exhaust gas emission cells, the first exhaust gas introduction cells, and the second exhaust gas introduction cells are configured as described above. The exhaust gas emission cells have a larger cross-sectional area than the first exhaust gas introduction cells, resulting in a honeycomb filter in which the relationship among the exhaust gas emission cells, first exhaust gas introduction cells, and second exhaust gas introduction cells in terms of the size is the same as that in the present invention. Consequently, the effects of the embodiments of the present invention can be achieved.

In the honeycomb filter according to the embodiments of the present invention, in the direction perpendicular to the longitudinal direction of the cells, preferably, the cross-sectional area of each second exhaust gas introduction cell is equal to that of each exhaust gas emission cell, and the cross-sectional area of each first exhaust gas introduction cell is 20 to 50% of the cross-sectional area of each second exhaust gas introduction cell.

The honeycomb filter having the above structure can create a difference between the resistance generated upon flowing of exhaust gas through the first exhaust gas introduction cells and the resistance generated upon flowing of exhaust gas through the second exhaust gas introduction cells, thus effectively suppressing the pressure loss.

If the cross-sectional area of the first exhaust gas introduction cell is less than 20% of the cross-sectional area of the second exhaust gas introduction cell, the flow resistance generated upon flowing of exhaust gas through the first exhaust gas introduction cell will increase and the pressure loss tends to be high because the cross-sectional area of the first exhaust gas introduction cell is too small. If the cross-sectional area of the first exhaust gas introduction cell is more than 50% of the cross-sectional area of the second exhaust gas introduction cell, the pressure loss will be difficult to reduce because the difference in flow resistance between these cells is small.

In the honeycomb filter according to the embodiments of the present invention, the exhaust gas introduction cells preferably include two kinds of cells including the first exhaust gas introduction cells and the second exhaust gas introduction cells having a larger cross-sectional area than the first exhaust gas introduction cells in a direction perpendicular to the longitudinal direction of the cells.

A smaller number of exhaust gas introduction cells each having a smaller cross-sectional area than each second exhaust gas introduction cell provides a larger effective introduction cell area, thereby allowing PM to be thinly and widely accumulate.

According to the honeycomb filter of the embodiments of the present invention, the above honeycomb filter includes honeycomb fired bodies, and the honeycomb fired body preferably includes silicon carbide or silicon-containing silicon carbide.

The silicon carbide and silicon-containing silicon carbide are materials excellent in heat resistance. Thus, the honeycomb filter will have better heat resistance.

In the honeycomb filter according to the embodiments of the present invention, the cell walls preferably have a porosity of 40 to 65%.

If the cell walls have a porosity of 40 to 65%, the cell walls can favorably capture PM in exhaust gas. Also, an increase in the pressure loss due to the cell walls can be suppressed. Thus, a honeycomb filter is provided which has low initial pressure loss and in which the pressure loss does not easily increase even after accumulation of PM.

If the cell walls have a porosity of less than 40%, exhaust gas will not easily pass through the cell walls due to the small proportion of the pores in the cell walls, resulting in high pressure loss generated upon passage of exhaust gas through the cell walls. If the cell walls have a porosity of more than 65%, the cell walls will have poor mechanical characteristics, and thus cracks will be easily formed during regeneration or the like.

In the honeycomb filter according to the embodiments of the present invention, the cell walls preferably have pores having an average pore diameter of 8 to 25 µm. The pore diameter and porosity are measured by a mercury injection method under conditions of the contact angle of 130° and the surface tension of 485 mN/m.

The honeycomb filter having the above structure can capture PM at a high capturing efficiency while suppressing an increase in the pressure loss. If the average pore diameter of the pores in the cell walls is less than 8 µm, the pressure loss generated upon passage of exhaust gas through the cell wall will be high because the pores are too small. In contrast, if the average pore diameter of the pores in the cell walls is more than 25 µm, PM capturing efficiency will decrease because the pore diameter is too large.

The honeycomb filter according to the embodiments of the present invention preferably has a peripheral coat layer formed on the periphery thereof.

The peripheral coat layer functions to mechanically protect the cells inside. Thus, a honeycomb filter having excellent mechanical characteristics such as compression strength is obtained.

In the honeycomb filter according to the embodiments of the present invention, in the cross section perpendicular to the longitudinal direction of the cells forming the honeycomb filter, preferably, the first exhaust gas introduction cells, the second exhaust gas introduction cells, and the exhaust gas emission cells each have a uniform cross-sectional shape throughout from the end at the exhaust gas inlet side to the end at the exhaust gas outlet side excluding the plugged portion, the cross-sectional shape is different between the first exhaust gas introduction cell and the second exhaust gas introduction cell, and the cross-sectional shape is also different between the exhaust gas emission cell and the first exhaust gas introduction cell. Here, the term "different" means "not congruent" but encompasses "similar". In other words, if the cross-sectional shapes are similar to each other, the cross-sectional shapes are considered different from each other.

Each first exhaust gas introduction cell itself has a uniform cross-sectional shape at any cross section thereof, each second exhaust gas introduction cell itself has a uniform cross-sectional shape at any cross section thereof, and each exhaust gas emission cell has a uniform cross-sectional shape at any cross section thereof. Yet, each first exhaust gas introduction cell has a different cross-sectional shape from each second exhaust gas introduction cell, and each exhaust gas emission cell also has a different cross-sectional shape from each first exhaust gas introduction cell.

The honeycomb filter according to the embodiments of the present invention preferably has the following structure. In the cross section perpendicular to the longitudinal direction of the cells, a cell unit having a cell structure described below is two-dimensionally repeated, where the first exhaust gas introduction cells and the second exhaust gas introduction cells surrounding each exhaust gas emission cell in the unit are shared between the adjacent cell units.

Cell structure: each exhaust gas emission cell is adjacently surrounded fully by the exhaust gas introduction cells across the porous cell walls, the exhaust gas introduction cells including two kinds of cells including first exhaust gas introduction cells and second exhaust gas introduction cells having a larger cross-sectional area than the first exhaust gas introduction cells in a direction perpendicular to the longitudinal direction of the cells, and the cross-sectional area of each exhaust gas emission cell in a direction perpendicular to the longitudinal direction of the cell is equal to or larger than that of each second exhaust gas introduction cell in a direction perpendicular to the longitudinal direction of the cell, and the exhaust gas introduction cells and the exhaust gas emission cells have the following feature A or B in the cross section perpendicular to the longitudinal direction of the cells:

A: the exhaust gas introduction cells and the exhaust gas emission cells are all polygonal, and a side facing the exhaust gas emission cell among the sides forming the cross-sectional shape of each first exhaust gas introduction cell is longer than a side facing the exhaust gas emission cell among the sides forming the cross-sectional shape of each second exhaust gas introduction cell; or one of the sides forming the cross-sectional shape of each first exhaust gas introduction cell faces the exhaust gas emission cell, and none of the sides forming the cross-sectional shape of each second exhaust gas introduction cell faces the exhaust gas emission cell;

B: the exhaust gas introduction cells and the exhaust gas emission cells are formed by curved lines, and the cell wall separating the first exhaust gas introduction cell and the exhaust gas emission cell is thinner than the cell wall separating the second exhaust gas introduction cell and the exhaust gas emission cell.

Such a honeycomb filter is preferred because the two-dimensional repetition of the cell unit forms a filter having a large capacity. The filter has an outer wall, and the cell units naturally do not extend outwardly of the outer wall. The cell units are cut out properly to fit the shape of the outer wall.

The embodiments will now be described with reference to the accompanying drawings, wherein like reference numerals designate corresponding or identical elements throughout the various drawings. The present invention is not limited to those embodiments, and may be appropriately modified within a scope not changing the gist of the present invention.

First Embodiment

A honeycomb filter according to a first embodiment of the present invention is described below.

The honeycomb filter according to the first embodiment of the present invention includes a plurality of honeycomb fired bodies combined with one another by adhesive layers residing therebetween. Each honeycomb fired body includes exhaust gas emission cells each having an open end at an exhaust gas outlet side and a plugged end at an exhaust gas inlet side, and exhaust gas introduction cells each having an open end at the exhaust gas inlet side and a plugged end at the exhaust gas outlet side, the exhaust gas introduction cells including first exhaust gas introduction cells and second exhaust gas introduction cells. Each honeycomb fired body has an outer wall on the periphery thereof.

The exhaust gas emission cells are each adjacently surrounded fully by the first exhaust gas introduction cells and the second exhaust gas introduction cells across the porous cell walls.

In the cross section perpendicular to the longitudinal direction of the cells, each second exhaust gas introduction cell has a larger cross-sectional area than each first exhaust gas introduction cell, and the cross-sectional area of each exhaust gas emission cell is equal to that of each second exhaust gas introduction cell.

In the cross section perpendicular to the longitudinal direction of the cells, the exhaust gas emission cells and the exhaust gas introduction cells are all polygonal, and a side facing the exhaust gas emission cell among the sides forming the cross-sectional shape of each first exhaust gas introduction cell is longer than a side facing the exhaust gas emission cell among the sides forming the cross-sectional shape of each second exhaust gas introduction cell, the cells adjacent to the outer wall including the exhaust gas introduction cells. The outer wall has corner portions, and a side, which contacts the outer wall, of each exhaust gas introduction cell adjacent to the outer wall is straight and parallel to a side defining an outer surface of the outer wall so that the thickness of the outer wall is uniform excluding the corner portions in the cross section perpendicular to the longitudinal direction of the cells.

In a direction perpendicular to the longitudinal direction of the cells, the exhaust gas introduction cells and the exhaust gas emission cells each have a uniform cross-sectional shape throughout from the end at the exhaust gas inlet side to the end at the exhaust gas outlet side excluding the plugged portion.

Figure 5:
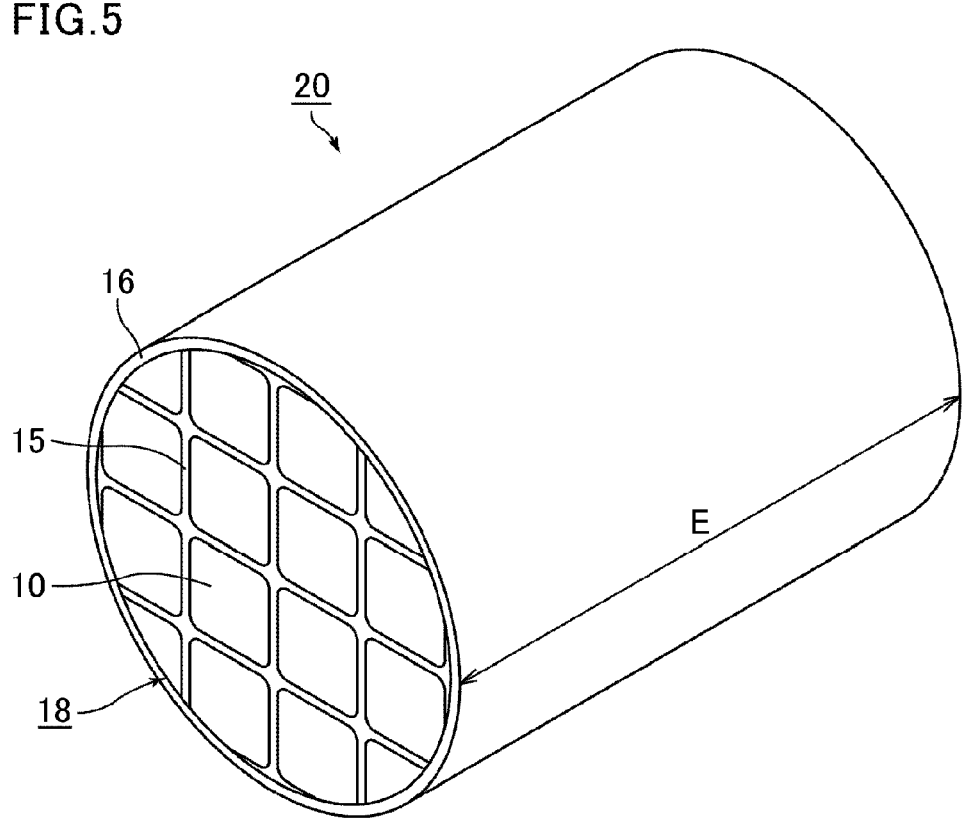
FIG. 5 is a perspective view schematically illustrating one example of the honeycomb filter according to a first embodiment of the present invention.

FIG. 5 is a perspective view schematically illustrating one example of the honeycomb filter according to the first embodiment of the present invention.

Figure 6B:
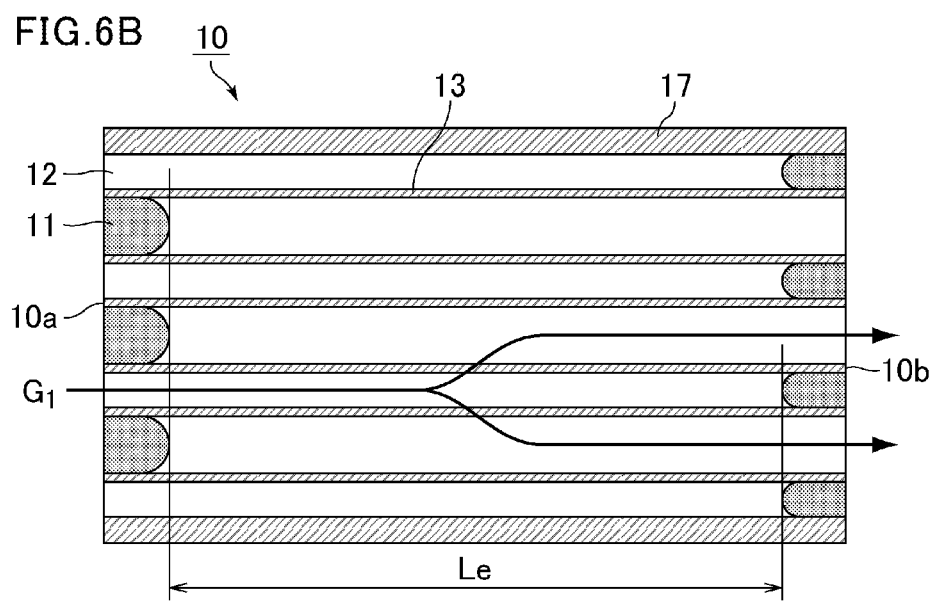
FIG. 6B is an A-A line cross-sectional view of the honeycomb fired body shown in FIG. 6A.

FIG. 6A is a perspective view schematically illustrating one example of the honeycomb fired body forming the honeycomb filter shown in FIG. 5. FIG. 6B is an A-A line cross-sectional view of the honeycomb fired body shown in FIG. 6A.

The honeycomb filter 20 shown in FIG. 5 includes a ceramic block 18 formed by combining a plurality of honeycomb fired bodies 10 via an adhesive layer 15 therebetween, and has a peripheral coat layer 16 on the periphery of the ceramic block 18 for preventing leakage of emission gas. The peripheral coat layer 16 may be formed as needed.

The honeycomb fired body 10 has a rectangular pillar shape, and the corner portions on its end faces are chamfered to be formed by curved lines as shown in FIG. 6A. This prevents thermal stress concentration at the corner portions to thereby prevent occurrence of damage such as cracks. The corner portions may be angularly chamfered.

In the honeycomb filter 20 according to the first embodiment, the exhaust gas emission cells each have an open end at the exhaust gas outlet side and a plugged end at the exhaust gas inlet side, and the exhaust gas introduction cells each have an open end at the exhaust gas inlet side and a plugged end at the exhaust gas outlet side. The plug 11 is preferably made of the same material used for the honeycomb fired body.

In the honeycomb fired body 10 shown in FIGS. 6A and 6B, the exhaust gas emission cells 11 having an octagonal cross section are each adjacently surrounded fully by the first exhaust gas introduction cells 12 each having a square cross section and the second exhaust gas introduction cells 14 each having an octagonal cross section across the porous cell walls. The first exhaust gas introduction cells 12 and the second exhaust gas introduction cells 14 are alternately arranged around each exhaust gas emission cell 11. Each second exhaust gas introduction cell 14 has a larger cross-sectional area than each first exhaust gas introduction cell 12, and the cross-sectional area of each exhaust gas emission cell 11 is equal to that of each second exhaust gas introduction cell 14. An outer wall 17 is formed on the periphery of the honeycomb fired body 10. Cells adjacent to the outer wall 17 include the exhaust gas introduction cells (the first exhaust gas introduction cells 12 and the second exhaust gas introduction cells 14).

The second exhaust gas introduction cells 14 and exhaust gas emission cells 11 have octagonal cross sections, and the cross sections are congruent with each other.

In the honeycomb filter 20 according to the present embodiment, a side, which contacts the outer wall 17, of the exhaust gas introduction cells adjacent to the outer wall 17 is straight and parallel to a side defining an outer surface of the outer wall 17 so that the thickness of the outer wall 17 is uniform excluding the corner portions in the cross section perpendicular to the longitudinal direction of the cells.

The cross section of each second exhaust gas introduction cell 14A adjacent to the outer wall 17 is partially cut so that the cross-sectional shape is changed from octagon to hexagon. The cross-sectional shape of each first exhaust gas introduction cell 12A may be in a partially cut shape but is preferably congruent with the cross-sectional shape of each first exhaust gas introduction cell 12.

The cross section of second exhaust gas introduction cells 14B at each corner of the honeycomb fired body 10 is changed from octagon to generally pentagon including chamfered portions 140 formed by curved lines. The chamfered portions 140 of the second exhaust gas introduction cells 14B illustrated in FIG. 6A are chamfered to be curved but may be angularly chamfered.

The above structure can increase the strength of the honeycomb fired body by the outer wall and can also further reduce the partial variation in the volume ratio of the exhaust gas emission cells and the exhaust gas introduction cells in the honeycomb fired body. Consequently, the flow of exhaust gas becomes more uniform so that the pressure loss can be reduced.

In the honeycomb fired body 10, the first exhaust gas introduction cells 12 and the second exhaust gas introduction cells 14 are alternately arranged along the outer wall 17. Inside those cells, the exhaust gas emission cells 11 are orderly arranged with the first exhaust gas introduction cells 12 and the second exhaust gas introduction cells residing therebetween. As above, the exhaust gas emission cells 11, the first exhaust gas introduction cells 12, and the second exhaust gas introduction cells 14 are arranged in a significantly ordered manner.

The exhaust gas emission cells 11 and the second exhaust gas introduction cells 14 have the same octagonal shape. The octagon is point-symmetry with respect to the centroid. In the octagon, all hypotenuse sides (denoted by 14a in FIGS. 4A to 4C) have the same length, and all vertical or horizontal sides (denoted by 14b in FIGS. 4A to 4C) have the same length. Moreover, four first sides (the hypotenuse sides) and four second sides (the vertical or horizontal sides) are alternately arranged. Each first side and teach second side form an angle of 135°.

The term "hypotenuse side" usually refers to the longest side that is opposite to the right angle in a right-angled triangle. However, for convenience of explanation, the term "hypotenuse side" herein refers to a side, such as the side 14a and the side 11b, that has a certain angle, except for 90° and 0°, relative to four hypothetical segments described below. For differentiation from this term, the term "vertical or horizontal side" herein refers to sides, such as the side 14b and the side 11a, that are parallel or perpendicular to the four hypothetical segments described below.

The term "hypothetical segments" mentioned in the explanation of the "hypotenuse side" and "vertical or horizontal sides" refer to the four hypothetical segments that do not intersect the cross-sectional figure of the exhaust gas emission cell 11 (these four segments form a square) among the hypothetical segments connecting the centroids of the cross-sectional figures of the four second exhaust gas introduction cells 14 arranged around the exhaust gas emission cell 11.

Each first exhaust gas introduction cell 12 has a square cross section.

In the cross section of the three kinds of cells which are adjacent to one another, i.e., the exhaust gas emission cell 11, the second exhaust gas introduction cell 14, and the first exhaust gas introduction cell 12, the side 11a facing the first exhaust gas introduction cell 12 across the cell wall 13 among the sides of the octagonal exhaust gas emission cell 11 is parallel to the side 12a facing the exhaust gas emission cell 11 across the cell wall 13 among the sides of the square first exhaust gas introduction cell 12.

Also, the side 11b facing the octagonal second exhaust gas introduction cell 14 across the cell wall 13 among the sides of the octagonal exhaust gas emission cells 11 is parallel to the side 14a facing the exhaust gas emission cell 11 across the cell wall 13 among the sides of the octagonal second exhaust gas introduction cell 14. Moreover, the side 12b facing the second exhaust gas introduction cell 14 across the cell wall 13 among the sides of the first exhaust gas introduction cell 12 is parallel to the side 14b facing the first exhaust gas introduction cell 12 across the cell wall 13 among the sides of the second exhaust gas introduction cell 14. Furthermore, the distance between the parallel sides is the same in any pair. That is, the distance between the parallel sides 11a and 12a, the distance between the parallel sides 11b and 14a, and the distance between the parallel sides 12b and 14b are the same.

Additionally, the exhaust gas emission cells 11, the first exhaust gas introduction cells 12, and the second exhaust gas introduction cells 14 are arranged so as to satisfy the following conditions.

Specifically, provided that hypothetical segments are drawn which connect the centroids of the octagonal shapes of the four second exhaust gas introduction cells 14 surrounding the exhaust gas emission cell 11, then the intersection of the two segments intersecting the octagonal region of the exhaust gas emission cell 11 coincides with the centroid of the octagonal cross section of the exhaust gas emission cell 11.

Moreover, among the hypothetical segments connecting the centroids of the octagonal shapes of the four second exhaust gas introduction cells 14, four hypothetical segments that do not intersect the octagonal region of the exhaust gas emission cell 11 forms a square, and the midpoints of these sides of the square coincide with the centroids of the square shapes of the four first exhaust gas introduction cells 12 surrounding the exhaust gas emission cell 11.

As described above, the octagonal exhaust gas emission cell 11 is adjacently surrounded by four first square exhaust gas introduction cells 12 and four second octagonal exhaust gas introduction cells 14, which are alternately arranged, across the cell walls 13 to form one unit. This unit is two-dimensionally repeated, where the first exhaust gas introduction cells 12 and the second exhaust gas introduction cells 14 in the unit are shared between the adjacent cell units, to form a honeycomb filter. Since the units share the first exhaust gas introduction cells 12 and the second exhaust gas introduction cells 14, the first exhaust gas introduction cell 12 and the second exhaust gas introduction cell 14, which adjoin the exhaust gas emission cell 11 across the cell wall 13, also adjoin the exhaust gas emission cell 11 in the adjacent unit across the cell wall 13.

Figure 7:
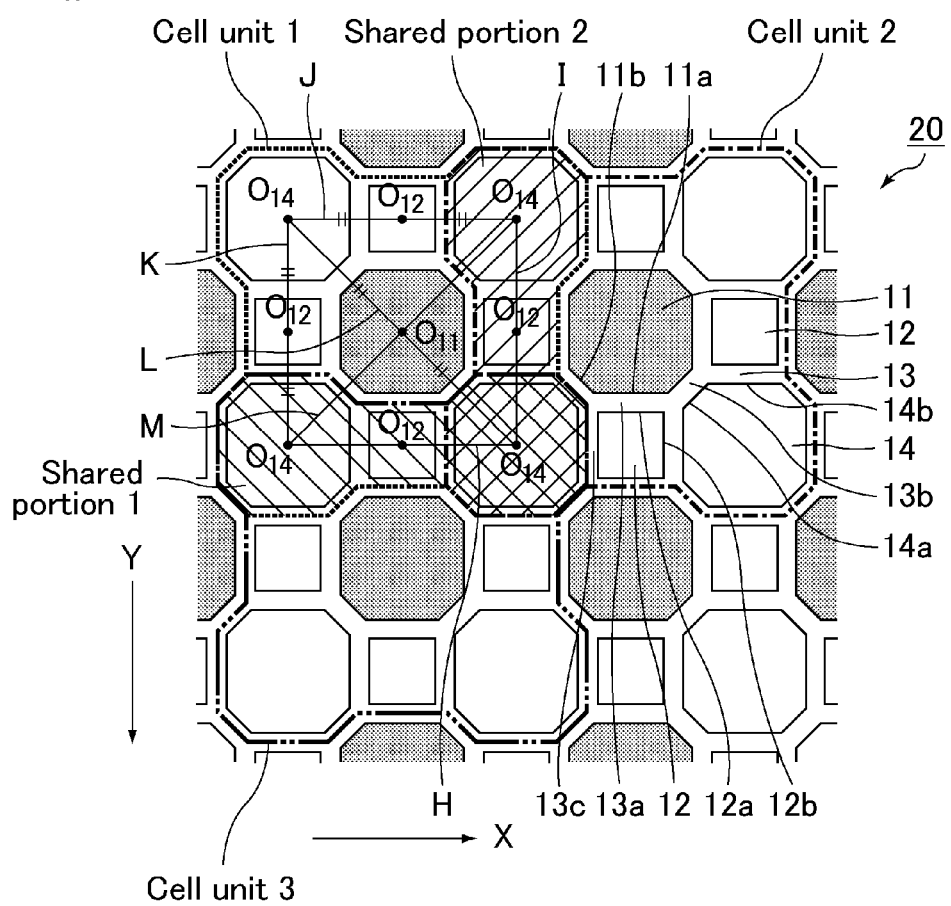
FIG. 7 is an enlarged cross-sectional view perpendicular to the longitudinal direction of the honeycomb filter, which illustrates how each cell unit (cell structure) is two-dimensionally (i.e. in X and Y directions) repeated in the case where the second exhaust gas introduction cells and the exhaust gas emission cells are octagonal and the first exhaust gas introduction cells are square in the cross section of the cells, and which also illustrates how the first exhaust gas introduction cells and the second exhaust gas introduction cells are shared between the cell units (cell structures).

FIG. 7 is an enlarged cross-sectional view perpendicular to the longitudinal direction of the cells of the honeycomb filter. FIG. 7 illustrates how each cell unit (cell structure) is two-dimensionally (i.e. in X and Y directions shown in FIG. 7) repeated in the case where the second exhaust gas introduction cells 14 and the exhaust gas emission cells 11 are octagonal, the first exhaust gas introduction cells 12 are square in the cross section of the cells, and the above conditions are satisfied; and also illustrates how the first exhaust gas introduction cells 12 and the second exhaust gas introduction cells 14 are shared between the cell units (cell structures).

A cell unit 1, a cell unit 2, and a cell unit 3 each have a structure in which the exhaust gas emission cell 11 is fully surrounded by four first exhaust gas introduction cells 12 and four second exhaust gas introduction cells 14, which are alternately arranged, across the cell walls 13 so as to satisfy the above conditions. The cell unit 2 has the same structure as the cell unit 1 and is adjacent to the cell unit 1 in the X direction while sharing one first exhaust gas introduction cell 12 and two second exhaust gas introduction cells 14 with the cell unit 1. The cells shared between the cell unit 1 and the cell unit 2 are depicted as "shared portion 2" in FIG. 7. The cell unit 3 has the same structure as the cell unit 1 and is adjacent to the cell unit 1 in the Y direction while sharing one first exhaust gas introduction cell 12 and two second exhaust gas introduction cells 14 with the cell unit 1. The cells shared between the cell unit 1 and the cell unit 3 are depicted as "shared portion 1" in FIG. 7.

FIG. 7 shows hypothetical segments connecting the centroids of the octagonal shapes of four second exhaust gas introduction cells 14, wherein, among these hypothetical segments, four segments H, I, J, and K do not intersect the octagonal region of the exhaust gas emission cell 11, and two segments L and M intersect the octagonal region of the exhaust gas emission cell 11. The "shared portion 2" is depicted by hatched lines oriented in the same direction as the segment M, and the "shared portion 1" is depicted by hatched lines oriented in the same direction as the segment L.

As shown in FIG. 7, the intersection of the two segments L and M coincides with the centroid of the exhaust gas emission cell 11.

In regard to the cell shapes in the honeycomb filter 20 shown in FIGS. 4A to 6B, the exhaust gas emission cells 11 and the second exhaust gas introduction cells 14, excluding the second exhaust gas introduction cells 14A and 14B adjacent to the outer wall 17, each have an octagonal cross section, and the first exhaust gas introduction cells 12 and 12A each have a square cross section. However, the cross-sectional shapes of the exhaust gas emission cells and the exhaust gas introduction cells forming the honeycomb filter of the present invention are not limited to the above shapes, and may be all square as described below, or may be combinations of other polygons.

Moreover, the exhaust gas emission cells 11, the first exhaust gas introduction cells 12, and the second exhaust gas introduction cells 14, which are polygons in the cross section thereof, may be roundly chamfered so that the vertex portions are formed by curved lines in the cross section.

Examples of the curved lines include curved lines obtained by dividing a circle into quarters, and curved lines obtained by dividing an ellipse into quarters along the long axis and a straight line perpendicular to the long axis. In particular, the vertex portions of the cells each having a rectangular cross section are preferably chamfered (formed by curved lines) in the cross section. This prevents stress concentration at the vertex portions, thereby preventing cracking in the cell wall.

Furthermore, the honeycomb filter 20 may partially include cells formed by curved lines such as a cell having a circular cross section, as needed.

The following description is not applicable to the second exhaust gas emission cells 14A and 14B adjacent to the outer wall 17.

The cross-sectional area of each first exhaust gas introduction cell 12 is preferably 20 to 50%, more preferably 22 to 45% of the cross-sectional area of each second exhaust gas introduction cell 14.

In the honeycomb filter 20 shown in FIGS. 4A to 6B, the cross-sectional area of each exhaust gas emission cell 11 is equal to that of each second exhaust gas introduction cell 14; however, the cross-sectional area of each exhaust gas emission cell 11 may be larger than that of each second exhaust gas introduction cell 14.

In this case, the cross-sectional area of each exhaust gas emission cell 11 is preferably 1.05 to 1.5 times the cross-sectional area of each second exhaust gas introduction cell 14.

Moreover, the side 12a that faces the exhaust gas emission cell 11 among the sides forming the cross-sectional shape of each first exhaust gas introduction cell 12 is longer than the side 14a that faces the exhaust gas emission cell 11 among the sides forming the cross-sectional shape of each second exhaust gas introduction cell 14. According to the above definition of the embodiments of the present invention, the sides 12a and 14a are sides facing the exhaust gas emission cell 11.

The ratio of the length of the side 14a of the second exhaust gas introduction cell 14 to the length of the side 12a of the first exhaust gas introduction cell 12 (length of the side 14a/length of the side 12a) is not particularly limited, and is preferably not more than 0.8, more preferably not more than 0.7, still more preferably not more than 0.5.

As shown in FIG. 6B, exhaust gas G1 (exhaust gas is represented by an arrow G1 which shows the flow of exhaust gas in FIG. 6B) that flowed into the first exhaust gas introduction cells 12 or the second exhaust gas introduction cells 14 inevitably passes through the cell walls 13 each separating the exhaust gas emission cell 11 and the first exhaust gas introduction cell 12 or the second exhaust gas introduction cell 14, and then flows out of the exhaust gas emission cells 11. Upon passage of the exhaust gas G1 through the cell walls 13, PM and the like in the exhaust gas are captured so that the cell walls 13 function as filters.

The exhaust gas emission cells 11, the first exhaust gas introduction cells 12, and the second exhaust gas introduction cells 14 allow flow of gas such as exhaust gas as described above. For flow of exhaust gas in the direction shown in FIG. 6B, an end at a first end face 10a of the honeycomb fired body 10 (the end of the side at which the exhaust gas emission cells 11 are plugged) is referred to as an exhaust gas inlet side end, an end at a second end face 10b of the honeycomb fired body 10 (the end of the side at which the first exhaust gas introduction cells 12 and the second exhaust gas introduction cells 14 are plugged) is referred to as an exhaust gas outlet side end.

As explained in the effects of the honeycomb filter according to the embodiments of the present invention, the honeycomb filter 20 having the above structure can reduce the initial pressure loss, compared to conventional honeycomb filters; reduce the rate of increase in the pressure loss even after accumulation of a considerable amount of PM on the cell walls; and significantly reduce the pressure loss throughout the use from the initial stage to accumulation of PM in an amount close to the limit.

In the honeycomb filter 30 having the structure illustrated in FIGS. 6A and 6B, since the thickness of the outer wall 17a is entirely uniform, the strength of the honeycomb fired body is enhanced by the outer wall 17a, and the partial variation in the volume ratio is further reduced between the exhaust gas emission cells and the exhaust gas introduction cells in the honeycomb fired body. Consequently, the flow of exhaust gas becomes more uniform so that the pressure loss can be reduced. Moreover, since the outer wall 17a is chamfered, stress is prevented from concentrating on the corner portions of the honeycomb fired body 10a, so that cracks are not easily formed in the corner portions of the honeycomb fired body 10a. When the cross-sectional shape of each second exhaust gas introduction cell 14B positioned at the corner portion is a pentagon formed by straight lines without having the chamfered portion 140A formed by curved lines, the second exhaust gas introduction cell 14B positioned close to the corner portion of the honeycomb fired body 10a is likely to have a stress concentrated thereon to easily have cracks. In contrast, in the honeycomb filter 30, since each second exhaust gas introduction cell 14B has the chamfered portion 140, cracks are not easily formed in the second exhaust gas introduction cell 14B.

The honeycomb filter 20 according to the first embodiment includes a plurality of honeycomb fired bodies 10. Examples of materials of the honeycomb fired bodies 10 include carbide ceramics such as silicon carbide, titanium carbide, tantalum carbide, and tungsten carbide; nitride ceramics such as aluminum nitride, silicon nitride, boron nitride, and titanium nitride; and oxide ceramics such as alumina, zirconia, cordierite, mullite, aluminum titanate, and silicon-containing silicon carbide, and the like. Silicon carbide or silicon-containing silicon carbide is preferred among the examples as they are excellent in heat resistance, mechanical strength, thermal conductivity and the like.

Meanwhile, the silicon-containing silicon carbide is a mixture of silicon carbide and silicon metal, and is preferably silicon-containing silicon carbide including 60 wt % or more of silicon carbide.

The thickness of the cell walls separating the cells is preferably uniform throughout the cell walls in the honeycomb fired body 10 forming the honeycomb filter 20 according to the first embodiment. The cell wall thickness is preferably 0.10 to 0.46 mm, more preferably 0.15 to 0.31 mm. The thickness of the outer wall 17 is preferably 0.10 to 0.50 mm. The cell wall thickness is a value measured as the thickness D shown in FIG. 1B based on the above definition.

The porosity of the cell wall and the outer wall 17 is preferably 40 to 65% in the honeycomb fired body 10 forming the honeycomb filter 20 according to the first embodiment.

The average pore diameter of pores in the cell wall is preferably 8 to 25 μm in the honeycomb fired body 10 forming the honeycomb filter 20 according to the first embodiment.

The number of the cells per unit area is preferably 31 to 62 pcs/cm$^2$ (200 to 400 pcs/inch$^2$) in the cross section of the honeycomb fired body 10.

The honeycomb filter 20 according to the embodiment of the present invention is formed by combining, via an adhesive layer therebetween, a plurality of honeycomb fired bodies each having an outer wall on the periphery thereof. An adhesive layer that combines the honeycomb fired bodies is prepared by applying an adhesive paste that contains an inorganic binder and inorganic particles, and drying the adhesive paste. The adhesive layer may further contain at least one of inorganic fibers and whiskers.

The adhesive layer preferably has a thickness of 0.5 to 2.0 mm.

The honeycomb filter according to the first embodiment of the present invention may have a peripheral coat layer on the periphery thereof. The materials of the peripheral coat layer are preferably the same as those of the adhesive layer.

The peripheral coat layer preferably has a thickness of 0.1 to 3.0 mm.

A method for manufacturing the honeycomb filter according to the first embodiment of the present invention is described below.

In the description below, silicon carbide is used as ceramic powder.

(1) A molding step for manufacturing a honeycomb molded body is performed by extrusion-molding a wet mixture containing ceramic powder and a binder.

Specifically, ceramic powder (silicon carbide powders having different average particle sizes), an organic binder, a liquid plasticizer, a lubricant, and water are mixed to prepare a wet mixture for manufacturing a honeycomb molded body.

The wet mixture may contain, as needed, a pore-forming agent such as balloons that are fine hollow spheres including oxide-based ceramics, spherical acrylic particles, or graphite.

The balloons are not particularly limited, and examples thereof include alumina balloons, glass microballoons, shirasu balloons, fly ash balloon (FA balloons), and mullite balloons. Alumina balloons are preferred among these examples.

Subsequently, the wet mixture is charged into an extrusion molding machine and extrusion-molded to manufacture a honeycomb molded body having a predetermined shape.

At this point, a honeycomb molded body is manufactured with a die that can make cross-sectional shapes having the cell structures (i.e., shapes and arrangement of the cells) shown in FIGS. 4A to 4C, 6A and 6B.

(2) The honeycomb molded bodies are cut at a predetermined length and dried by a dryer such as a microwave dryer, a hot-air dryer, a dielectric dryer, a reduced-pressure dryer, a vacuum dryer, or a freeze dryer. Then, predetermined cells are plugged by placing a plug material paste as a plug material (plugging step).

Here, the wet mixture may be used as the plug material paste.

(3) The honeycomb molded body is heated at 300° C. to 650° C. in a degreasing furnace to remove organic matters in the honeycomb molded body (degreasing step). The degreased honeycomb molded body is then transferred to a firing furnace and fired at 2000° C. to 2200° C. (firing step). In this manner, the honeycomb fired body as shown in FIGS. 4A to 6B is manufactured.

The plug material paste placed at the end of the cells is heated to be fired to be a plug material.

The cutting, drying, plugging, degreasing, and firing may be performed under conditions that have been conventionally employed for manufacturing honeycomb fired bodies.

(4) A plurality of honeycomb fired bodies are stacked in series via the adhesive paste therebetween on a support table to combine the honeycomb fired bodies (combining step) so that a honeycomb aggregate body including the plurality of stacked honeycomb fired bodies is manufactured.

The adhesive paste contains, for example, an inorganic binder, an organic binder, and inorganic particles. The adhesive paste may further contain inorganic fibers and/or whiskers.

Examples of the inorganic particles in the adhesive paste include carbide particles, nitride particles, and the like. Specific examples thereof include inorganic particles of silicon carbide, silicon nitride, boron nitride, and the like. There may be used alone or in combination of two or more thereof. Among the inorganic particles, silicon carbide particles are preferred because of their excellent thermal conductivity.

Examples of the inorganic fibers and/or whiskers in the adhesive paste include inorganic fibers and/or whiskers of silica-alumina, mullite, alumina, and silica. These may be used alone or in combination of two or more thereof. Alumina fibers are preferred among the inorganic fibers. The inorganic fibers may be biosoluble fibers.

Furthermore, the adhesive paste may contain, as needed, balloons that are fine hollow spheres including oxide-based ceramics, spherical acrylic particles, graphite, or the like. The balloons are not particularly limited, and examples thereof include alumina balloons, glass microballoons, shirasu balloons, fly ash balloons (FA balloon), mullite balloons, and the like.

(5) Next, the honeycomb aggregate body is heated so that the adhesive paste is solidified to form an adhesive layer, whereby a rectangular pillar-shaped ceramic block is manufactured.

The heating and solidifying of the adhesive paste may be performed under conditions that have been conventionally employed for manufacturing honeycomb filters.

(6) The ceramic block is subjected to cutting (cutting step).

Specifically, the periphery of the ceramic block is cut with a diamond cutter, whereby a ceramic block whose periphery is cut into a substantially round pillar shape is manufactured.

(7) A peripheral coating material paste is applied to the peripheral face of the substantially round pillar-shaped ceramic block, and is dried and solidified to form a peripheral coat layer (peripheral coat layer forming step).

The adhesive paste may be used as the peripheral coating material paste. Alternatively, the peripheral coating material paste may be a paste having a composition different from that of the adhesive paste.

The peripheral coat layer is not necessarily formed; it may be formed as needed.

The peripheral shape of the ceramic block is adjusted by providing the peripheral coat layer, and thereby a round pillar-shaped honeycomb filter is obtained.

The honeycomb filter including the honeycomb fired bodies can be manufactured through the above steps.

Although the honeycomb filter having a predetermined shape is manufactured by cutting, the honeycomb filter may also be formed to have a predetermined shape such as round pillar shape in the following manner: honeycomb fired bodies of various shapes, each having an outer wall on the periphery thereof, are manufactured in the honeycomb fired body manufacturing step, and then the honeycomb fired bodies of various shapes are combined with one another via the adhesive layer therebetween. In this case, the cutting step can be omitted.

Hereinafter, the effects of the honeycomb filter according to the first embodiment of the present invention are listed.

(1) The honeycomb filter according to the embodiment has a structure in which the entire cell walls around the exhaust gas emission cells can be utilized, and the exhaust gas emission cells are orderly arranged, enabling uniform and smooth flow of exhaust gas. This structure not only reduces the initial pressure loss as compared with conventional honeycomb filters but also reduces the rate of increase in the pressure loss even after accumulation of a considerable amount of PM on the cell walls. The honeycomb filter can greatly reduce the pressure loss throughout the use from the initial stage to after accumulation of PM in an amount close to the limit.

(2) In the honeycomb filter of the present embodiment, the cross-sectional area of each first exhaust gas introduction cell may be 20 to 50% of the cross-sectional area of each second exhaust gas introduction cell.

The above cross-sectional area ratio of the first exhaust gas introduction cell and the second exhaust gas introduction cell can create a difference between the resistance generated upon flowing of exhaust gas through the first exhaust gas introduction cells and the resistance generated upon flowing of exhaust gas through the second exhaust gas introduction cells, thus effectively suppressing the pressure loss.

(3) In the honeycomb filter of the present embodiment, the ratio of the length of the side of the second exhaust gas introduction cell to the length of the side of the first exhaust gas introduction cell may be not more than 0.8.

The above ratio of the length of the side of the first exhaust gas introduction cell to the length of the side of the second exhaust gas introduction cell allows easier passage of exhaust gas through the cell walls each separating the exhaust gas emission cell and the first exhaust gas introduction cell, thus effectively suppressing the initial pressure loss and suppressing an increase in the rate of increase of the pressure loss even after accumulation of PM.

(4) In the honeycomb filter of the present embodiment, the materials of the honeycomb fired bodies may include silicon carbide or silicon-containing silicon carbide. These materials can provide a honeycomb filter having excellent heat resistance.

(5) In the honeycomb filter of the present embodiment, the thickness of the cell walls separating the cells may be uniform throughout the cell walls.

The same effects can be achieved throughout the honeycomb filter by setting the entire cell wall thickness as described above.

(6) In the honeycomb filter of the present embodiment, the cell wall thickness may be 0.10 to 0.46 mm.

The cell wall having the above thickness is sufficient for capturing PM in exhaust gas, and an increase in the pressure loss can be effectively suppressed.

(7) In the honeycomb filter of the present embodiment, the porosity of the cell wall and the outer wall forming the honeycomb filter 20 may be 40 to 65%.

The cell wall having the above porosity can favorably capture PM in exhaust gas. Also, an increase in the pressure loss due to the cell wall can be suppressed.

(8) In the honeycomb filter of the present embodiment, the average pore diameter of pores in the cell wall may be 8 to 25 μm in the honeycomb fired body forming the honeycomb filter.

The above average pore diameter of pores in the cell wall allows PM to be captured at a high capturing efficiency while suppressing an increase in the pressure loss.

(9) In the honeycomb filter of the present embodiment, in a direction perpendicular to the longitudinal direction of the cells, the exhaust gas introduction cells and the exhaust gas emission cells each have a uniform cross-sectional shape throughout from the end at the exhaust gas inlet side to the end at the exhaust gas outlet side excluding the plugged portion.

Thus, the same or similar effects can be achieved throughout the honeycomb filter, preventing drawbacks due to non-uniformity of the shape across the honeycomb filter.

(10) In the honeycomb filter of the present embodiment, cracks are not easily formed by thermal shock that occurs during burn-removal (regeneration) of accumulated PM in the honeycomb filter.

In the honeycomb filter of the present embodiment, the plugged portions provided at the end at the exhaust gas outlet side (i.e., the plugged portions in the first exhaust gas introduction cells and the second exhaust gas introduction cells) are present in a vertically and horizontally aligned manner, via the cell walls therebetween. The width of each plugged portion is equal to or greater than the length of one side of the first exhaust gas introduction cell. In general regeneration of honeycomb filters, PM accumulated at the exhaust gas inlet side of the honeycomb filter is burned first. Then, heat is propagated along the flow of exhaust gas to the outlet side of the honeycomb filter, so that all the PM is burned. For this reason, areas closer to the outlet side of the honeycomb filter are exposed to higher temperatures, and the temperature difference is easily created in the radial direction of the honeycomb filter, resulting in formation of cracks due to thermal stress. Such cracks are prominent in the case where the cross-sectional areas are different among the cells and some of the exhaust gas introduction cells where PM accumulates have square cross sections. In contrast, in the honeycomb filter according to the embodiments of the present invention, the plugged portions aligned vertically and horizontally at the exhaust gas outlet side function as thermally conductive layers and also as layers for dissipating heat to the outside. Thus, the temperature difference can be reduced in the radial direction at the end of the exhaust gas outlet side of the honeycomb filter. This reduces the thermal stress that is generated, thus suppressing cracks. Moreover, in the honeycomb filter of the present embodiment, the amount of the plug in the second exhaust gas introduction cells where a large amount of PM accumulates compared to the first exhaust gas introduction cells is large in accordance with the size of the cross-sectional area, and thus the thermal capacity of the plugged portions is also large. Such plugged portions can suppress an increase in the temperature of the second exhaust gas introduction cells where the heat of burning PM is greater, even in view of each cell unit. This reduces the temperature difference in the radial direction of the honeycomb filter, thereby presumably reducing the thermal stress that occurs.

Thus, the honeycomb filter of the present embodiment can suppress cracks during the regeneration even if some of the exhaust gas introduction cells have square cross sections.

(11) In the honeycomb filter according to the embodiment, the above-mentioned structure can increase the strength of the honeycomb fired body by the outer wall and can also further reduce the partial variation in the volume ratio of the exhaust gas emission cells and the exhaust gas introduction cells in the honeycomb fired body. Consequently, the flow of exhaust gas becomes more uniform so that the pressure loss can be reduced.

The following examples are provided for more specifically describing the first embodiment of the present invention. However, the present invention is not limited to these examples.

Example 1

A mixture was obtained by mixing 52.8% by weight of silicon carbide coarse powder having an average particle size of 22 µm and 22.6% by weight of silicon carbide fine powder having an average particle size of 0.5 µm. To the resulting mixture were added 4.6% by weight of an organic binder (methylcellulose), 0.8% by weight of a lubricant (UNILUB, manufactured by NOF Corporation), 1.3% by weight of glycerin, 1.9% by weight of a pore-forming agent (acrylic resin), 2.8% by weight of oleic acid, and 13.2% by weight of water, followed by kneading to prepare a wet mixture. Subsequently, the wet mixture was extrusion-molded (molding step).

In this step, a raw honeycomb molded body having the same shape as the honeycomb fired body 10 shown in FIG. 6A but without plugs in the cells was manufactured.

Next, the raw honeycomb molded body was dried by a microwave dryer to manufacture a dried honeycomb molded body. Then, predetermined cells of the dried honeycomb molded body were plugged by filling the cells with a plug material paste.

Specifically, the cells were plugged in such a manner that the end at the exhaust gas inlet side and the end at the exhaust gas outlet side were plugged at the positions shown in FIG. 6B.

The wet mixture was used as the plug material paste. After plugging the cells, the dried honeycomb molded body including the plug material paste was dried again by a dryer.

Subsequently, the dried honeycomb molded body with the plugged cells was degreased at 400° C. (degrease treatment) and then fired at 2200° C. (firing treatment) under argon atmosphere at normal pressure for 3 hours.

In this manner, a rectangular pillar-shaped honeycomb fired body was manufactured.

The length of the sides and the cross-sectional area described below can be measured by the above image analysis of an electron microscope photograph and by use of the above grain size distribution measurement software (Mac-View (Version 3.5), produced by Mountech Co. Ltd.).

The manufactured honeycomb fired bodies each were the honeycomb fired body 10 shown in FIG. 6A and FIG. 6B formed of a silicon carbide sintered body and having a porosity of 45%, an average pore diameter of 15 µm, a size of 34.3 mm×34.3 mm×150 mm, the number of cells (cell density) of 290 pcs/inch$^2$, and a thickness of cell walls of 0.25 mm.

In the cross section perpendicular to the longitudinal direction of the manufactured honeycomb fired body 10, each exhaust gas emission cell 11 was adjacently surrounded fully by the first exhaust gas introduction cells 12 and 12A and the second exhaust gas introduction cells 14, 14A, and 14B. The first exhaust gas introduction cells 12 and 12A each had a square cross section, and the length of the sides forming the cross section of the first exhaust gas introduction cells 12 and 12A was 0.96 mm.

In regard to each second exhaust gas introduction cell 14 except for the second exhaust gas introduction cells 14A and 14B adjacent to the outer wall 17, the cross section was octagonal, the length of the hypotenuse sides facing the exhaust gas emission cell 11 was 0.27 mm, and the vertical or horizontal sides not facing the exhaust gas emission cell 11 were 1.11 mm.

In other words, the length of the sides facing the exhaust gas emission cell 11 among the sides forming the cross-sectional shape of each second exhaust gas introduction cell 14 was 0.28 times as long as the length of the sides facing the exhaust gas emission cell 11 among the sides forming the first exhaust gas introduction cell 12.

In regard to each second exhaust gas introduction cell 14B at the four corners, the length of the side adjacent to the outer wall 17 was 1.23 mm, the length of the vertical or horizontal sides was 1.04 mm, the length of the hypotenuse side was 0.27 mm, and the cross-sectional area was 1.48 mm$^2$.

In regard to each second exhaust gas introduction cell 14A, the length of the side adjacent to the outer wall 17 was 1.49 mm, the length of the vertical side parallel to the side adjacent to the outer wall 17 was 1.11 mm, the length of the horizontal side connected at a right angle to the side adjacent to the outer wall 17 was 1.04 mm, the length of the hypotenuse side was 0.27 mm, and the cross-sectional area was 1.79 mm$^2$.

The exhaust gas emission cells 11 had an octagonal cross section, and the shape was the same as the cross section of the second exhaust gas introduction cell 14. The length of the hypotenuse side facing the second exhaust gas introduction cell 14 was 0.27 mm, and the vertical or horizontal sides facing the first exhaust gas introduction cells 12 was 1.11 mm.

The thickness of the outer wall 17 was 0.35 mm.

The cross-sectional area of each first exhaust gas introduction cell 12 was 0.93 mm$^2$, and both the cross-sectional area of the second exhaust gas introduction cell 14 and the cross-sectional area of exhaust gas emission cell 11 were 2.17 mm$^2$. In other words, the cross-sectional area of the first exhaust gas introduction cell 12 was 43% of the cross-sectional area of the second exhaust gas introduction cell 14.

Moreover, the cross-sectional area of each exhaust gas emission cell 11 was equal to that of each second exhaust gas introduction cell 14, and was larger than that of the first exhaust gas introduction cell 12.

The honeycomb fired body had a rectangular pillar shape in which the corner portions of its end faces were chamfered to be formed by curved lines.

Subsequently, a plurality of honeycomb fired bodies were combined using an adhesive paste containing 30% by weight of alumina fibers having an average fiber length of 20 μm, 21% by weight of silicon carbide particles having an average particle size of 0.6 μm, 15% by weight of silica sol, 5.6% by weight of carboxymethyl cellulose, and 28.4% by weight of water. Further, the adhesive layer was dried and solidified at 120° C. to form an adhesive layer, whereby a rectangular pillar-shaped ceramic block was manufactured.

Then, the periphery of the rectangular pillar-shaped ceramic block was cut out using a diamond cutter to manufacture a substantially round pillar-shaped ceramic block.

Subsequently, a sealing material paste having the same composition as the adhesive paste was applied to the peripheral face of the ceramic block. The sealing material paste was then dried and solidified at 120° C. to form a peripheral coat layer. In this manner a round pillar-shaped honeycomb filter was manufactured.

The diameter of the honeycomb filter was 143.8 mm, and the length in the longitudinal direction was 150 mm.

Comparative Example 1

A raw honeycomb molded body was obtained in the same molding step as in Example 1. Subsequently the raw honeycomb molded body was dried by a microwave dryer to manufacture a dried honeycomb molded body. Then, predetermined cells of the dried honeycomb molded body were plugged by filling the cells with a plug material paste.

The position of plugging of the cells was changed from that in Example 1 as follows. All the octagonal cells were plugged at the end face corresponding to the end at the exhaust gas outlet side, and all the square cells were plugged at the end face corresponding to the end at the exhaust gas inlet side, so that the cells were alternately plugged at both end faces.

Figure 19A:
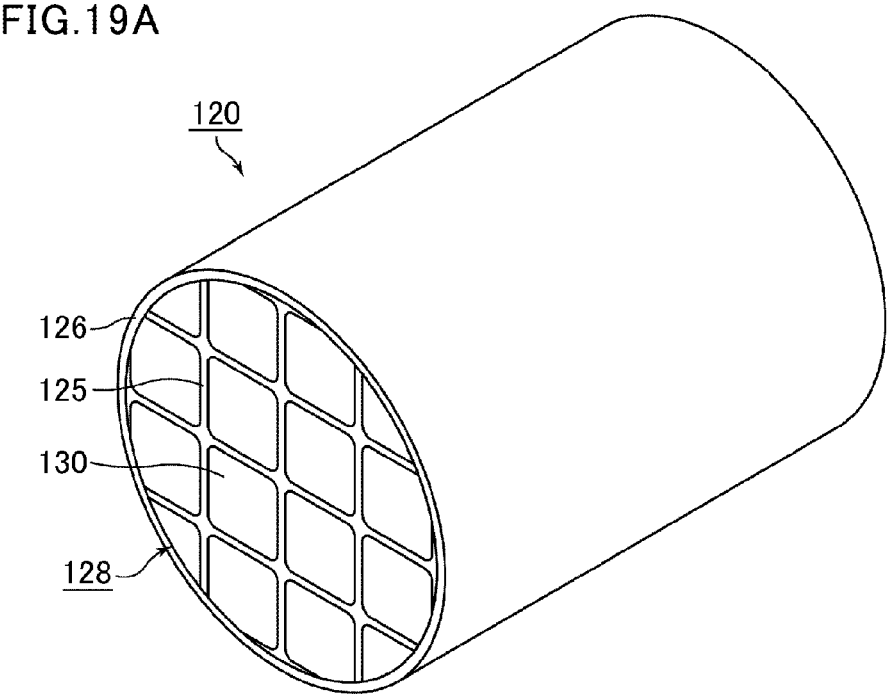
FIG. 19A is a perspective view schematically illustrating a honeycomb filter of the comparative example.
Figure 19B:
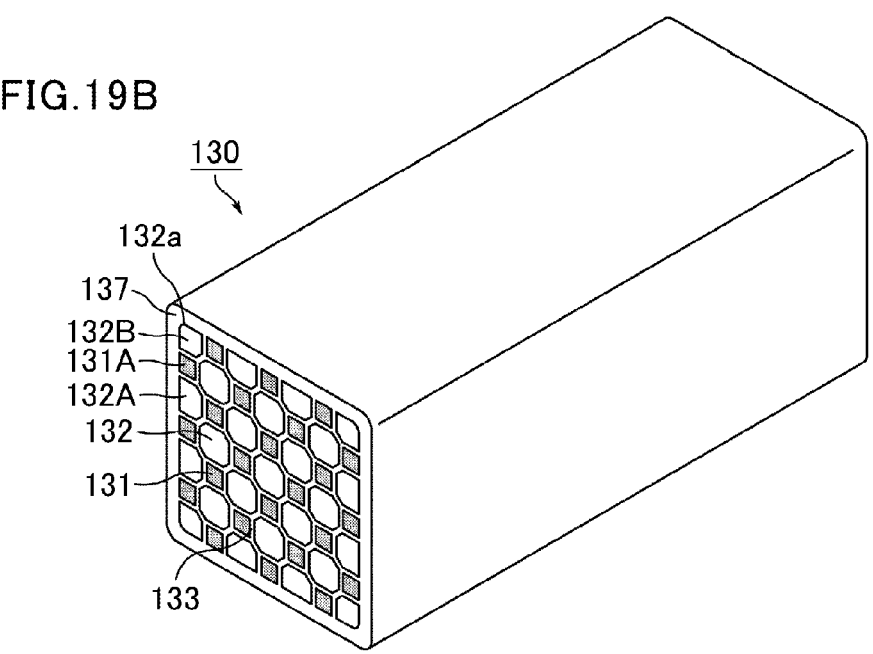
FIG. 19B is a perspective view schematically illustrating a honeycomb fired body forming the honeycomb filter shown in FIG. 19A.

As a result, a honeycomb molded body was obtained in which the end at the exhaust gas inlet side and the end at the exhaust gas outlet side were plugged at the positions shown in FIG. 19B.

Subsequently, the same step as in Example 1 was performed to manufacture a honeycomb fired body 130 shown in FIGS. 19A and 19B, and then a honeycomb filter 120 was manufactured.

In the cross section of the manufactured honeycomb fired body 130 in the direction perpendicular to the longitudinal direction of the cells, all the exhaust gas introduction cells 132 had an octagonal cross section, except for the exhaust gas introduction cells 132A and 132B adjacent to the outer wall 137.

The sides facing the exhaust gas emission cell 131 were vertical or horizontal sides having a length of 1.11 mm.

The sides facing other exhaust gas introduction cells 132, 132A, and 132B were hypotenuse sides having a length of 0.27 mm.

All the exhaust gas emission cells 131 and 131A had a square cross section. The length of the sides forming the cross sections of the exhaust gas emission cells 131 and 131A was 0.96 mm.

In regard to each exhaust gas introduction cell 132B at the four corners, the length of the side adjacent to the outer wall 137 was 1.23 mm, the length of the vertical or horizontal sides was 1.04 mm, the length of the hypotenuse side was 0.27 mm, and the cross-sectional area was 1.48 mm$^2$.

In regard to the exhaust gas introduction cells 132A, the length of the side adjacent to the outer wall 137 was 1.49 mm, the length of the vertical side parallel to the side adjacent to the outer wall 17 was 1.11 mm, the length of the horizontal line connected at a right angle to the side adjacent to the outer wall 17 was 1.04 mm, the length of the hypotenuse sides was 0.27 mm, and the cross-sectional area was 1.79 mm$^2$.

The thickness of a cell wall 133 was 0.25 mm, and the thickness of the outer wall was 0.35 mm.

The cross-sectional area of the exhaust gas introduction cell 132 was 2.17 mm$^2$, and the cross-sectional area of the exhaust gas emission cell 131 was 0.93 mm$^2$. In other words, the cross-sectional area of each exhaust gas introduction cell 132 was larger than that of each exhaust gas emission cell 131.

Figure 9:
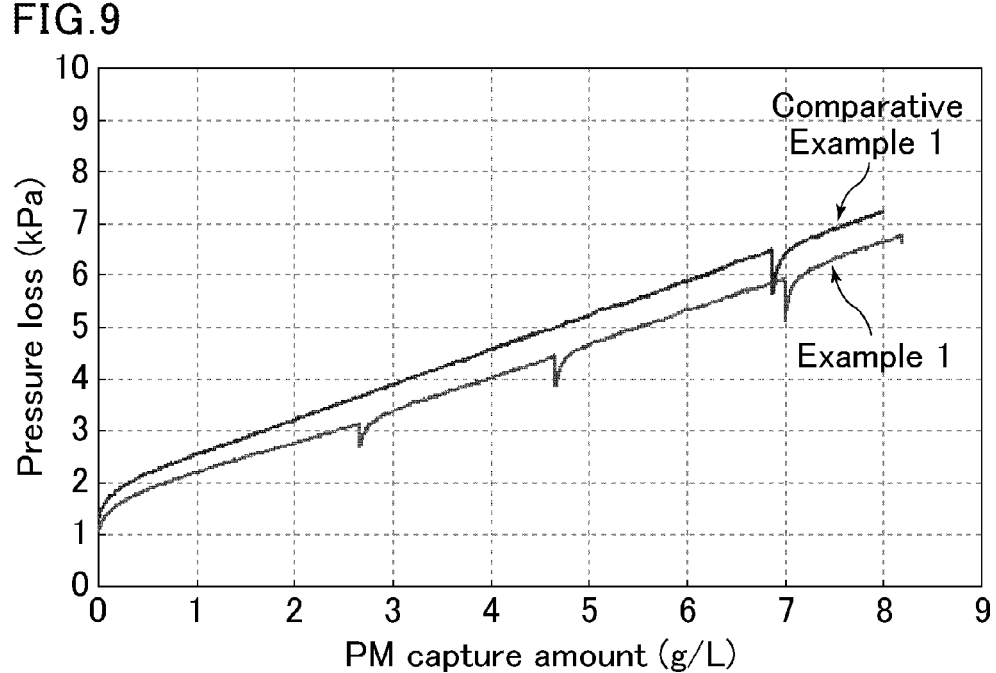
FIG. 9 is a graph showing a relationship between the amount of captured PM and the pressure loss as measured in Example 1 and Comparative Example 1.

In regard to the honeycomb filters manufactured in Example 1 and Comparative Example 1, the relationship between the amount of captured PM and the pressure loss was measured using a pressure loss measuring apparatus as shown in FIG. 9.

Figure 8:
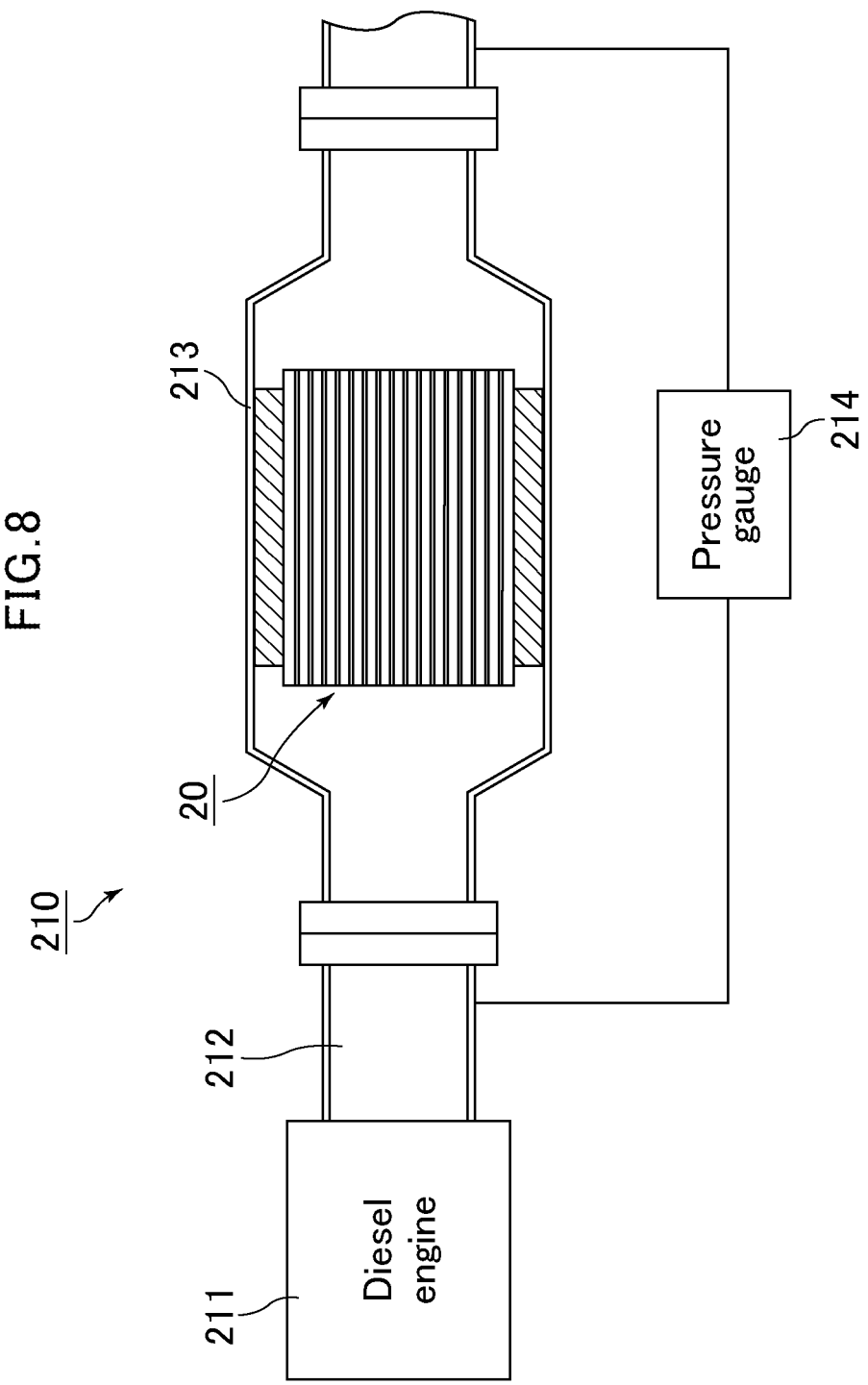
FIG. 8 is a cross-sectional view schematically illustrating a method for measuring the pressure loss.

FIG. 8 is a cross-sectional view schematically illustrating a method for measuring the pressure loss.

A pressure loss measuring apparatus 210 has the following structure: a honeycomb filter 20 fixed inside a metal casing 213 is disposed in an exhaust gas tube 212 of a 1.6-liter diesel engine 211, and a pressure gauge 214 is attached in a manner that it can detect the pressure in front and back of the honeycomb filter 20.

The honeycomb filter 20 is disposed such that the end at the exhaust gas inlet side is closer to the exhaust gas tube 212 of the diesel engine 211. Specifically, the honeycomb filter 20 is disposed to allow exhaust gas to flow into the cells whose the exhaust gas inlet side ends are open.

The diesel engine 211 was operated at a rotation speed of 3100 rpm and a torque of 50 Nm to allow exhaust gas from the diesel engine 211 to flow into the honeycomb filter 20 so that PM was captured by the honeycomb filter.

Then, the relationship between the amount (g/L) of captured PM per liter of an apparent volume of the honeycomb filter and the pressure loss (kPa) was determined.

FIG. 9 is a graph showing the relationship between the amount of captured PM and the pressure loss as measured in Example 1 and Comparative Example 1.

The result shows that, in the honeycomb filter of Example 1, the initial pressure loss, i.e. the pressure loss when the amount of captured PM was 0 g/L, was as low as 1.1 kPa, and the pressure loss was as low as 6.6 kPa even when the amount of captured PM was 8 g/L. Thus, the honeycomb filter of Example 1 exhibited a significant effect of achieving low pressure loss, compared to the honeycomb filter of Comparative Example 1, throughout the range from 0 g/L to 8 g/L of the amount of captured PM. In the honeycomb filter of Comparative Example 1, the initial pressure loss, i.e. the pressure loss at 0 g/L of the amount of captured PM, was 1.3 kPa, and the pressure loss was 7.2 kPa when the amount of captured PM was 8 g/L.

Second Embodiment

A honeycomb filter according to the second embodiment of the present invention is described below.

The honeycomb filter according to the second embodiment of the present invention includes a plurality of honeycomb fired bodies combined with one another by adhesive layers residing therebetween. The honeycomb fired bodies each include exhaust gas emission cells each having an open end at an exhaust gas outlet side and a plugged end at an exhaust gas inlet side, and exhaust gas introduction cells each having an open end at the exhaust gas inlet side and a plugged end at the exhaust gas outlet side. The exhaust gas introduction cells include first exhaust gas introduction cells and second exhaust gas introduction cells. The honeycomb fired bodies each have an outer wall on the outer periphery thereof.

The exhaust gas emission cells are each adjacently surrounded fully by the first exhaust gas introduction cells and the second exhaust gas introduction cells across the porous cell walls.

In the cross section perpendicular to the longitudinal direction of the cells, each second exhaust gas introduction cell has a larger cross-sectional area than each first exhaust gas introduction cell, and the cross-sectional area of each exhaust gas emission cell is equal to that of each second exhaust gas introduction cell.

In the cross section perpendicular to the longitudinal direction of the cells, the exhaust gas emission cells and the exhaust gas introduction cells are all polygonal, a side facing the exhaust gas emission cell among the sides forming the cross-sectional shape of each first exhaust gas introduction cell is longer than a side facing the exhaust gas emission cell among the sides forming the cross-sectional shape of each second exhaust gas introduction cell.

In a direction perpendicular to the longitudinal direction of the cells, the cells adjacent to the outer wall include the exhaust gas introduction cells.

In a direction perpendicular to the longitudinal direction of the cells, the exhaust gas introduction cells and the exhaust gas emission cells each have a uniform cross-sectional shape throughout from the end at the exhaust gas inlet side to the end at the exhaust gas outlet side excluding the plugged portion.

Namely, the honeycomb filter according to the second embodiment has the same structure as that of the honeycomb filter according to the first embodiment. They are the same in terms of the basic shape and arrangement of the cells but different in that, in the honeycomb filter according to the second embodiment, the cross-sectional shape of the cells adjacent to the outer wall is the same as the cross-sectional shape of the cells other than the cells adjacent to the outer wall.

FIG. 10A is a perspective view schematically illustrating one example of a honeycomb filter according to the second embodiment of the present invention. FIG. 10B is a perspective view illustrating a honeycomb fired body forming the honeycomb filter.

The cross-sectional shape and arrangement of the cell walls in a honeycomb fired body included in a honeycomb filter 30 shown in FIG. 10A and FIG. 10B are basically the same as those of the cell walls in the honeycomb fired body 10 included in the honeycomb filer 20 shown in FIG. 6A. Each exhaust gas emission cell 11 having an octagonal cross section is adjacently surrounded fully by the first exhaust gas introduction cells 12 each having a square cross section and the second exhaust gas introduction cells 14 each having an octagonal cross section across porous cell walls therebetween. The first exhaust gas introduction cells 12 and the second exhaust gas introduction cells 14 are alternately arranged around each exhaust gas emission cell 11. Each second exhaust gas introduction cell 14 has a larger cross-sectional area than each first exhaust gas introduction cell 12, and the cross-sectional area of each exhaust gas emission cell 11 is equal to that of each second exhaust gas introduction cell 14. An outer wall 17a is formed on the periphery of the honeycomb fired bodies 10a. The cells adjacent to the outer wall 17a are all exhaust gas introduction cells (the first exhaust gas introduction cells 12 and the second exhaust gas introduction cells 14).

The length of a side 12a that faces the exhaust gas emission cell 11 among the sides forming the cross-sectional shape of each first exhaust gas introduction cell 12 is longer than a side 14a that faces the exhaust gas emission cell 11 among the sides forming the cross-sectional shape of each second exhaust gas introduction cell 14.

The honeycomb fired body 10a is different from the honeycomb fired body 10 included in the honeycomb filter 20 shown in FIG. 6A in that, as shown in FIG. 10B, the exhaust gas emission cells, the first exhaust gas introduction cells, and the second exhaust gas introduction cells adjacent to the outer wall respectively have the same cross-sectional shapes as the exhaust gas emission cells 11, the first exhaust gas introduction cells 12, and the second exhaust gas introduction cells 14 other than the cells adjacent to the outer wall.

The following will describe a modified example of the honeycomb filter according to the second embodiment of the present invention.

FIG. 11A is a perspective view schematically illustrating one modified example of a honeycomb filter according to the second embodiment of the present invention. FIG. 11B is an end face view of the honeycomb filter in FIG. 11A.

In a honeycomb filter 10b shown in FIGS. 11A and 11B, all the first exhaust gas introduction cells 12 have the same shape and all the second exhaust gas introduction cells 14 have the same shape. A side 170b corresponding to an outer surface of an outer wall 17b changes in accordance with the shapes of the first exhaust gas introduction cells 12 adjacent to the outer wall 17b and the second exhaust gas introduction cells 14 adjacent to the outer wall 17b. The thickness of the outer wall 17b is uniform.

In other words, in order to make the thickness of the outer wall 17b uniform, the side 170b corresponding to the outer surface of the outer wall 17b becomes rugged along with the shapes of the first exhaust gas introduction cells 12 and the second exhaust gas introduction cells 14 adjacent to the outer wall 17b.

The features of the embodiment other than those mentioned above are the same as the features described in relation to the first embodiment, and thus the description thereof is omitted.

The honeycomb filter according to the present embodiment can be manufactured by the same method as described in the first embodiment of the present invention, except that the shape of the mold used in the extrusion molding is changed.

The honeycomb filter 30 according to the present embodiment is substantially the same as the honeycomb filter 20 according to the first embodiment in terms of the basic arrangement of the cells, shapes, mode of plugging, and the like, and thus can similarly achieve the effects (1) to (10) described in relation to the first embodiment.

Third Embodiment

A honeycomb filter according to the third embodiment of the present invention is described below. The features not described below are substantially the same as those of the honeycomb filter according to the first embodiment.

The honeycomb filter according to the third embodiment of the present invention includes a plurality of honeycomb fired bodies each having an outer wall on the periphery thereof. Each honeycomb fired body includes exhaust gas emission cells each having an open end at an exhaust gas outlet side and a plugged end at an exhaust gas inlet side, and exhaust gas introduction cells each having an open end at the exhaust gas inlet side and a plugged end at the exhaust gas outlet side, the exhaust gas introduction cells including first exhaust gas introduction cells and second exhaust gas introduction cells. The honeycomb fired bodies are combined with one another via adhesive layers therebetween.

The exhaust gas emission cells are each adjacently surrounded fully by the first exhaust gas introduction cells and the second exhaust gas introduction cells across the porous cell wall.

In the cross section perpendicular to the longitudinal direction of the cells, each second exhaust gas introduction cell has a larger cross-sectional area than each first exhaust gas introduction cell, and the cross-sectional area of each exhaust gas emission cell is equal to that of each second exhaust gas introduction cell.

In the cross section perpendicular to the longitudinal direction of the cells, the exhaust gas emission cells and the exhaust gas introduction cells are square, and one of the sides forming the cross-sectional shape of each first exhaust gas introduction cell faces the exhaust gas emission cell, and none of the sides forming the cross-sectional shape of each second exhaust gas introduction cell faces the sides forming the exhaust gas emission cell.

In the cross section perpendicular to the longitudinal direction of the cells, the cells adjacent to the outer wall include the exhaust gas introduction cells.

In a direction perpendicular to the longitudinal direction of the cells, the exhaust gas introduction cells and the exhaust gas emission cells each have a uniform cross-sectional shape throughout from the end at the exhaust gas inlet side to the end at the exhaust gas outlet side excluding the plugged portion.

In other words, the honeycomb filter according to the third embodiment has substantially the same structure as the honeycomb filter according to the first embodiment, except that the exhaust gas emission cells, the first exhaust gas introduction cells, and the second exhaust gas introduction cells each have a square cross section, and also except for the features described below.

FIG. 12A is an end face view schematically illustrating one example of the cell arrangement at an end face of the honeycomb fired body forming the honeycomb filter according to the third embodiment of the present invention.

In a honeycomb fired body 40 included in the honeycomb filter shown in FIG. 12A, exhaust gas emission cells 41 each having a square cross section are each adjacently surrounded fully by first exhaust gas introduction cells 42 each having a square cross section and second exhaust gas introduction cells 44 each having a square cross section across porous the cell walls. The first exhaust gas introduction cells 42 and the second exhaust gas introduction cells 44 are alternately arranged around each exhaust gas emission cell 41. Each second exhaust gas introduction cell 44 has a larger cross-sectional area than each first exhaust gas introduction cell 42, and the cross-sectional area of each exhaust gas emission cell 41 is equal to that of each second exhaust gas introduction cell 44.

In the cross section of the three kinds of adjacent cells (i.e., the exhaust gas emission cell 41, the second exhaust gas introduction cell 44, and the first exhaust gas introduction cells 42), a side 41a that faces the first exhaust gas introduction cell 42 across a cell wall 43 among the sides of the square exhaust gas emission cell 41 is parallel to a side 42a that faces the exhaust gas emission cell 41 across the cell wall 43 among the sides of the square first exhaust gas introduction cell 42.

Moreover, a side 42b that faces the second exhaust gas introduction cell 44 across the cell wall 43 among the sides of the first exhaust gas introduction cell 42 is parallel to a side 44b that faces the first exhaust gas introduction cell 42 across the cell wall 43 among the sides of the second exhaust gas introduction cell 44. Furthermore, the distance between the parallel sides is the same in any pair. That is, the distance between the parallel sides 41a and 42a and the distance between the parallel sides 42b and 44b are the same.

The square exhaust gas emission cell 41 is adjacently surrounded by four first square exhaust gas introduction cells 42 and four second square exhaust gas introduction cells 44, which are alternately arranged, across the cell walls 43. The cross-sectional area of each second exhaust gas introduction cell 44 is larger than that of each first exhaust gas introduction cell 42.

Additionally, the exhaust gas emission cells 41, the first exhaust gas introduction cells 42, and the second exhaust gas introduction cells 44 are arranged so as to satisfy the following conditions.

Specifically, provided that hypothetical segments are drawn which connect the centroids of the square shapes of the four second exhaust gas introduction cells 44 surrounding the exhaust gas emission cell 41, then the intersection of two hypothetical segments intersecting the square region of the exhaust gas emission cell 41 coincides with the centroid of the square cross section of the exhaust gas emission cell 41.

Moreover, among the hypothetical segments connecting the centroids of the square shapes of the four second exhaust gas introduction cells 44, four hypothetical segments that do not intersect the square region of the exhaust gas emission cell 41 form a square, and the midpoints of these sides of the square coincide with the centroids of the square shapes of the four first exhaust gas introduction cells 42 surrounding the exhaust gas emission cell 41.

As described above, the square exhaust gas emission cell 41 is adjacently surrounded by four first square exhaust gas introduction cells 42 and four second square exhaust gas introduction cells 44, which are alternately arranged, across the cell walls 43 to form one unit. This unit is two-dimensionally repeated, where the first exhaust gas introduction cells 42 and the second exhaust gas introduction cells 44 in the unit are shared between the adjacent cell units, to form a honeycomb filter. The units share the first exhaust gas introduction cells 42 and the second exhaust gas introduction cells 44. Thus, the first exhaust gas introduction cell 42 and the second exhaust gas introduction cell 44, which adjoin the exhaust gas emission cell 41 across the cell wall 43, also adjoin the exhaust gas emission cell 41 in the adjacent unit across the cell wall 43.

FIG. 13 is an enlarged cross-sectional view perpendicular to the longitudinal direction of the honeycomb filter. FIG. 13 illustrates how each cell unit (cell structure) is two-dimensionally (i.e. in X and Y directions shown in FIG. 13) repeated in the case where the first exhaust gas introduction cells 42, the second exhaust gas introduction cells 44, and the exhaust gas emission cells 41 are square and the above conditions are satisfied in the cross-sectional shapes of the cells; and also illustrates how the first exhaust gas introduction cells 42 and the second exhaust gas introduction cells 44 in the unit are shared between the cell units (cell structures). A cell unit 1, a cell unit 2, and a cell unit 3 each have a structure in which the exhaust gas emission cell 41 is fully surrounded by four first exhaust gas introduction cells 42 and four second exhaust gas introduction cells 44, which are alternately arranged, across the cell walls 43 so as to satisfy the above conditions.

The cell unit 2 has the same structure as the cell unit 1. The cell unit 2 is adjacent to the cell unit 1 in the X direction while sharing one first exhaust gas introduction cell 42 and two second exhaust gas introduction cells 44 with the cell unit 1. The cells shared between the cell unit 1 and the cell unit 2 are depicted as "shared portion 2" in FIG. 13. The cell unit 3 has the same structure as the cell unit 1. The cell unit 3 is adjacent to the cell unit 1 in the Y direction while sharing one first exhaust gas introduction cell 42 and two second exhaust gas introduction cells 44 with the cell unit 1. The cells shared between the cell unit 1 and the cell unit 3 are depicted as "shared portion 1" in FIG. 13.

FIG. 13 shows hypothetical segments connecting the centroids of the square shapes of the four second exhaust gas introduction cells 44, wherein, among these hypothetical segments, four segments h, i, j, and k do not intersect the square region of the exhaust gas emission cell 41, and two hypothetical segments l and m intersect the square region of the exhaust gas emission cell 41. The "shared portion 2" is depicted by hatched lines oriented in the same direction as the segment m, and the "shared portion 1" is depicted by hatched lines oriented in the same direction as the segment 1.

As shown in FIG. 13, the intersection of the two segments 1 and m coincides with the centroid of the exhaust gas emission cell 41.

In the cross section of the cells, one of sides forming the cross-sectional shape of the first exhaust gas introduction cell 42 faces the exhaust gas emission cell 41. Also, the second exhaust gas introduction cell 44 and the exhaust gas emission cell 41 are arranged so as to face each other at their corner portions. Thus, none of the sides forming the cross-sectional shape of the second exhaust gas introduction cell 44 faces the exhaust gas emission cell 41. The cells adjacent to an outer wall 47 include the exhaust gas introduction cells (the first exhaust gas introduction cells 42 and the second exhaust gas introduction cells 44).

None of the sides forming the cross-sectional shapes of the second exhaust gas introduction cells faces exhaust gas emission cells in the present embodiment, and thus exhaust gas more easily flows into the first exhaust gas introduction cells at an initial stage, compared to the first embodiment. For this reason, PM accumulates at an early time on the inner cell walls of the first exhaust gas introduction cells corresponding to the cell walls each separating the first exhaust gas introduction cell and the exhaust gas emission cell. Consequently, the above switching of the main flow passage occurs at an earlier time. Therefore, PM tends to uniformly accumulate on the inner cell walls of the first exhaust gas introduction cells and the inner cell walls of the second exhaust gas introduction cells, so that the pressure loss after accumulation of a certain amount of PM can be further reduced.

In the honeycomb filter of the present embodiment, cracks are not easily generated by thermal shock that occurs during burn-removal (regeneration) of PM accumulated on the honeycomb filter.

In the honeycomb filter of the present embodiment, the plugged portions provided at the end at the exhaust gas outlet side (i.e., the plugged portions in the first exhaust gas introduction cells and the second exhaust gas introduction cells) are present in a vertically and horizontally aligned manner, via the cell walls therebetween. The width of each plugged portion is equal to or greater than the length of one side of the first exhaust gas introduction cell. In general regeneration of honeycomb filters, PM accumulated at the exhaust gas inlet side of the honeycomb filter is burned first. Then, heat is propagated along the flow of exhaust gas to the outlet side of the honeycomb filter, so that all the PM is burned. For this reason, areas closer to the outlet side of the honeycomb filter are exposed to higher temperatures, and the temperature difference is easily created in the radial direction of the honeycomb filter, resulting in formation of cracks due to thermal stress. Such cracks are prominent in the case where the cross-sectional areas are different among the cells and some of the exhaust gas introduction cells where PM accumulates have square cross sections. In contrast, in the honeycomb filter according to the embodiments of the present invention, the plugged portions aligned vertically and horizontally at the exhaust gas outlet side function as thermally conductive layers and also as layers for dissipating heat to the outside. Thus, the temperature difference can be reduced in the radial direction at the end of the exhaust gas outlet side of the honeycomb filter. This reduces the thermal stress that is generated, thus suppressing cracks. Moreover, in the honeycomb filter of the present embodiment, the amount of the plug in the second exhaust gas introduction cells where a large amount of PM accumulates compared to the first exhaust gas introduction cells is large in accordance with the size of the cross-sectional area, and thus the thermal capacity of the plugged portions is also large. Such plugged portions can suppress an increase in the temperature of the second exhaust gas introduction cells where the heat of burning PM is greater, even in view of each cell unit. This presumably reduces the temperature difference in the radial direction of the honeycomb filter, thus reducing the thermal stress that occurs.

Thus, the honeycomb filter of the present embodiment can suppress cracks during the regeneration even though some of the exhaust gas introduction cells have square cross sections.

The cross-sectional area of each first exhaust gas introduction cell 42 is preferably 20 to 50%, more preferably 22 to 45% of the cross-sectional area of each second exhaust gas introduction cell 44.

In the honeycomb filter shown in FIG. 12A, the cross-sectional area of each exhaust gas emission cell 41 is equal to that of each second exhaust gas introduction cell 44; however, the cross-sectional area of each exhaust gas emission cell 41 may be larger than that of each second exhaust gas introduction cell 44.

In this case, the cross-sectional area of each exhaust gas emission cell 41 is preferably 1.05 to 1.5 times the cross-sectional area of each second exhaust gas introduction cell 44.

The following describes the cell wall thickness in the cross section of the honeycomb filter 40 according to the third embodiment based on the above definition of the cell wall. Provided that a straight line $Z_{42}$ connecting a centroid $O_{41}$ of the exhaust gas emission cell 41 and a centroid $O_{42}$ of the first exhaust gas introduction cell 42 is drawn, then the thickness of a cell wall portion where the cell wall 43 and the straight line $Z_{42}$ overlap each other (the thickness between the side 42a and the side 41a) is defined as a thickness $X_1$. Provided that a straight line $Z_{44}$ connecting a centroid $O_{44}$ of the second exhaust gas introduction cell 44 and the centroid $O_{41}$ of the exhaust gas emission cell 41 is drawn, then the thickness of the cell wall 43 separating the second exhaust gas introduction cell 44 and the exhaust gas emission cell 41 corresponds to the thickness of a cell wall portion where the cell wall 43 and the straight line $Z_{44}$ overlap each other (the distance between a corner portion 44c of the second exhaust gas introduction cell 44 and a corner portion 41c of the exhaust gas emission cell 41), which is defined as a cell wall thickness $Y_1$.

The cell wall thickness of the honeycomb filter 40 varies depending on the parts as shown in FIG. 12A; however, the thicknesses, including the thickness $X_1$ and the thickness $Y_1$, may be in the range of 0.10 to 0.46 mm.

The following will describe a modified example of the honeycomb filter according to the third embodiment of the present invention.

FIG. 12B is an end face view illustrating one modified example of the honeycomb filter according to the third embodiment of the present invention.

In a honeycomb filter 40a shown in FIG. 12B, the shape of a second exhaust gas introduction cell 44A adjacent to an outer wall 47a is, compared to the shape of the second exhaust gas introduction cell 44 not adjacent to the outer wall 47a, partially deformed to be rectangle in accordance with the straight line along the inner walls, which forms the outer wall 47a, in the first exhaust gas introduction cells 44A adjacent to the outer wall 47a. A second exhaust gas introduction cell 44B at the corner portion has a square cross-sectional shape with a smaller area compared to the second exhaust gas introduction cell 44 not adjacent to the outer wall 47a.

With such shapes of the cells, the boundary between the outer wall 47a and the first exhaust gas introduction cells 42 or the second exhaust gas introduction cells 44 adjacent to the outer wall 47a is formed linearly, and the thickness of the outer wall 47a is uniform.

The following will describe another modified example of the honeycomb filter according to the third embodiment of the present invention.

FIG. 12C is an end face view illustrating another modified example of the honeycomb filter according to the third embodiment of the present invention.

In a honeycomb filter 40b shown in FIG. 12C, all the first exhaust gas introduction cells 42 have the same shape, and all the second exhaust gas introduction cells 44 have the same shape. A side 470b defining an outer surface of an outer wall 47b changes in accordance with the shapes of the first exhaust gas introduction cells 42 adjacent to the outer wall 47b and the second exhaust gas introduction cells 44 adjacent to the outer wall 47b. The thickness of the outer wall 47b is uniform.

In other words, in order to make the thickness of the outer wall 47b uniform, the side 470b defining the outer surface of the outer wall 47b becomes rugged along with the shapes of the first exhaust gas introduction cells 42 and the second exhaust gas introduction cells 44 adjacent to the outer wall 47b.

The features of the embodiment other than those described above are the same as the features described in relation to the first embodiment, and thus the explanation thereof is omitted.

The honeycomb filter of the present embodiment can be manufactured in the same manner as in the first embodiment of the present invention, except that a die having a different shape is used in the extrusion molding step.

In the honeycomb filter 40 according to the present embodiment, unlike the first embodiment, the exhaust gas emission cells 41 and the second exhaust gas introduction cells 44 each have a square cross section, and none of the sides forming the cross-sectional shape of the second exhaust gas introduction cells 44 faces the exhaust gas emission cells 41. Among the sides forming the cross-sectional shape of each first exhaust gas introduction cell 42, a side 42a faces the exhaust gas emission cell 41. Thus, similar to the honeycomb filter according to the first embodiment, it is considered that exhaust gas easily flows into the first exhaust gas introduction cells 42 at an initial stage and then easily flows into the second exhaust gas introduction cells 44 after accumulation of a certain amount of PM.

The honeycomb filter 40 according to the present embodiment is substantially the same as the honeycomb filter 20 according to the first embodiment in terms of the basic arrangement of the cells, mode of plugging, size difference among the cross-sectional areas of the cells, and the like. Thus, the honeycomb filter 40 according to the present embodiment can similarly achieve the effects (1) to (4) and (7) to (11) described in relation to the first embodiment.

Fourth Embodiment

A honeycomb filter according to the fourth embodiment of the present invention is described below. The features not described below are substantially the same as those of the honeycomb filter according to the first embodiment.

The honeycomb filter according to the fourth embodiment of the present invention includes a plurality of honeycomb fired bodies each having an outer wall on the periphery thereof. Each honeycomb fired body includes exhaust gas emission cells each having an open end at an exhaust gas outlet side and a plugged end at an exhaust gas inlet side, and exhaust gas introduction cells each having an open end at the exhaust gas inlet side and a plugged end at the exhaust gas outlet side, the exhaust gas introduction cells including first exhaust gas introduction cells and second exhaust gas introduction cells each having a larger cross-sectional area than each first exhaust gas introduction cell in a direction perpendicular to the longitudinal direction of the cells. The honeycomb fired bodies are combined with one another via adhesive layers therebetween.

In the honeycomb filter according to the fourth embodiment of the present invention, the cross-sectional area of each exhaust gas emission cell in the cross section perpendicular to the longitudinal direction of the cell is equal to that of each second exhaust gas introduction cell in the cross section perpendicular to the longitudinal direction of the cell; the exhaust gas emission cells and the exhaust gas introduction cells are formed by curved lines in the cross section perpendicular to the longitudinal direction of the cells; and the exhaust gas emission cells, the first exhaust gas introduction cells, and the second exhaust gas introduction cells each have a circular cross-sectional shape.

The cells adjacent to the outer wall include exhaust gas introduction cells (first exhaust gas introduction cells and the second exhaust gas introduction cells).

The honeycomb filter according to the fourth embodiment of the present invention has substantially the same features as the features of the honeycomb filter according to the first embodiment of the present invention, except that the cross-sectional shapes of the exhaust gas emission cells, the second exhaust gas introduction cells, and the first exhaust gas introduction cells are different in the direction perpendicular to the longitudinal direction of the cells.

FIG. 14 is an end face view schematically illustrating one example of the cell arrangement at an end face of the honeycomb fired body forming a honeycomb filter according to a fourth embodiment of the present invention.

A honeycomb fired body 50 in a honeycomb filter according to the fourth embodiment of the present invention includes exhaust gas emission cells 51, first exhaust gas introduction cells 52, cell walls 53, and second exhaust gas introduction cells 54.

The exhaust gas emission cells 51 are each adjacently surrounded fully by the first exhaust gas introduction cells 52 and the second exhaust gas introduction cells 54 across porous cell walls 53 residing therebetween. The cells adjacent to the outer wall include exhaust gas introduction cells (first exhaust gas introduction cells 52 and the second exhaust gas introduction cells 54).

In the honeycomb filter shown in FIG. 14, in the cross section perpendicular to the longitudinal direction of the cells, the cross-sectional area of each second exhaust gas introduction cell 54 is equal to that of each exhaust gas emission cell 51, and the cross-sectional area of each first exhaust gas introduction cell 52 is smaller than that of each second exhaust gas introduction cell 54. The cross-sectional area of each first exhaust gas introduction cell 52 is preferably 20 to 50% of the cross-sectional area of each second exhaust gas introduction cell 54.

The exhaust gas emission cells 51, the first exhaust gas introduction cells 52, and the second exhaust gas introduction cells 54 each have a circular cross-sectional shape.

The following describes the cell wall thickness in the cross section of the honeycomb fired body 50 included in the honeycomb filter according to the fourth embodiment shown in FIG. 14 based on the above-mentioned definition of the cell wall. Provided that a straight line $Z_{52}$ connecting a centroid $O_{51}$ of the exhaust gas emission cell 51 and a centroid $O_{52}$ of the first exhaust gas introduction cell 52 is drawn, then the thickness of the cell wall portion where the cell wall 53 and the straight line $Z_{52}$ overlap each other is defined as a thickness $X_2$. Provided that a straight line $Z_{54}$ connecting a centroid $O_{54}$ of the second exhaust gas introduction cell 54 and the centroid $O_{51}$ of the exhaust gas emission cell 51 is drawn, then the thickness of the cell wall 53 separating the second exhaust gas introduction cell 54 and the exhaust gas emission cell 51 corresponds to the thickness of a cell wall portion where the cell wall and the straight line $Z_{54}$ overlap each other, which is defined as a thickness $Y_2$.

In the honeycomb filter 50 of the present embodiment, the thickness $X_2$ of the cell wall 53 separating the first exhaust gas introduction cell 52 and the exhaust gas emission cell 51 is smaller than the thickness $Y_2$ of the cell wall 53 separating second exhaust gas introduction cell 54 and the exhaust gas emission cell 51.

This embodiment provides a shape that can create a larger difference in the thickness between the cell wall separating the first exhaust gas introduction cell and the exhaust gas emission cell and the cell wall separating the second exhaust gas introduction cell and the exhaust gas emission cell. For this reason, the exhaust gas more easily flows into the first exhaust gas introduction cells at an initial stage, compared to the first embodiment. Thus, PM accumulates at an early time on the inner walls of each first exhaust gas introduction cell corresponding to the cell walls each separating the first exhaust gas introduction cell and the exhaust gas emission cell. Consequently, the above switching of the main flow passage occurs at an earlier time. Therefore, PM tends to uniformly accumulate on the inner walls of each first exhaust gas introduction cell and the inner cell walls of each second exhaust gas introduction cell so that the pressure loss after accumulation of a certain amount of PM can be further reduced.

The thickness $X_2$ of the cell wall 53 separating the first exhaust gas introduction cell 52 and the exhaust gas emission cell 51 is preferably 40 to 75% of the thickness $Y_2$ of the thinnest part of the cell wall 53 separating the second exhaust gas introduction cell 54 and the exhaust gas emission cell 51.

In the honeycomb filter 50 of the present embodiment, the thickness of the cell wall 53 separating the first exhaust gas introduction cell 52 and the second exhaust gas introduction cell 54 may be determined in the same manner as the thickness of the cell wall 53 separating the first exhaust gas introduction cell 52 and the exhaust gas emission cell 51.

In the honeycomb filter 50 shown in FIG. 14, the thickness of the cell wall 53 separating the first exhaust gas introduction cell 52 and the second exhaust gas introduction cell 54 is equal to the thickness of the cell wall 53 separating the first exhaust gas introduction cell 52 and the exhaust gas emission cell 51.

The honeycomb filter according to the fourth embodiment of the present invention may be a honeycomb filter in which the thickness of the outer wall is uniform, the shape of each first exhaust gas introduction cell adjacent to the outer wall is the same as that of each first exhaust gas introduction cell not adjacent to the outer wall, and the shape of each second exhaust gas introduction cell adjacent to the outer wall is partially deformed, compared to the shape of each second exhaust gas introduction cell not adjacent to the outer wall, in accordance with the straight line along the inner walls, which forms the outer wall, of the first exhaust gas introduction cell adjacent to the outer wall.

The honeycomb filter according to the fourth embodiment of the present invention may be a honeycomb filter in which the thickness of the outer wall is uniform in accordance with the shapes of the exhaust gas introduction cells adjacent to the outer wall, and each first exhaust gas introduction cell and each second exhaust gas introduction cell adjacent to the outer wall respectively have the same shape as that of each first exhaust gas introduction cell and that of each second exhaust gas introduction cell not adjacent to the outer wall.

The features of the embodiment other than those mentioned above are the same as the features described in relation to the first embodiment, and thus the description thereof is omitted.

The honeycomb filter of the present embodiment can be manufactured in the same manner as in the first embodiment of the present invention, except that a die having a different shape is used in the extrusion molding process.

Hereinafter, the effects of the honeycomb filter according to the fourth embodiment of the present invention are described.

In the honeycomb filter described in the first embodiment of the present invention, the side 12a that faces the exhaust gas emission cell 11 among the sides forming the cross-sectional shape of each first exhaust gas introduction cell 12 is characteristically longer than the side 14a that faces the exhaust gas emission cell 11 among the sides forming the cross-sectional shape of each second exhaust gas introduction cell 14. In contrast, in the honeycomb filter according to the fourth embodiment, the exhaust gas emission cells, the first exhaust gas introduction cells, and the second exhaust gas introduction cells each characteristically have a circular cross-sectional shape, wherein the cell wall separating the first exhaust gas introduction cell and the exhaust gas emission cell is thinner than the cell wall separating the second exhaust gas introduction cell and the exhaust gas emission cell. The fourth embodiment is different in the above points from the first embodiment. Other features are substantially the same.

Even in the case where the exhaust gas emission cells, the first exhaust gas introduction cells, and the second exhaust gas introduction cells each have a circular cross-sectional shape, a thinner cell wall thickness may lead to easier passage of exhaust gas through the cell walls so that the pressure loss is reduced. Thus, the length of the sides forming cross sections of the cells may be considered to correspond to the thickness of the cell walls separating the cells. Hence, the honeycomb filter according to the fourth embodiment of the present invention can achieve the effects (1), (2), (4) and (7) to (10) described in relation to the first embodiment.

Fifth Embodiment

A honeycomb filter according to the fifth embodiment of the present invention is described below. The features not described below are substantially the same as those of the honeycomb filter according to the first embodiment.

The honeycomb filter according to the fifth embodiment of the present invention includes a plurality of honeycomb fired bodies each having an outer wall on the periphery thereof. Each honeycomb fired body includes exhaust gas emission cells each having an open end at an exhaust gas outlet side and a plugged end at an exhaust gas inlet side, and exhaust gas introduction cells each having an open end at the exhaust gas inlet side and a plugged end at the exhaust gas outlet side, the exhaust gas introduction cells including first exhaust gas introduction cells and second exhaust gas introduction cells each having a larger cross-sectional area than each first exhaust gas introduction cell in a direction perpendicular to the longitudinal direction of the cells. The honeycomb fired bodies are combined with one another via adhesive layers therebetween.

In the honeycomb filter according to the fifth embodiment of the present invention, the cross-sectional area of each exhaust gas emission cell in the cross section perpendicular to the longitudinal direction of the cell is equal to that of each second exhaust gas introduction cell in the cross section perpendicular to the longitudinal direction of the cell. In the cross section perpendicular to the longitudinal direction of the cells, the exhaust gas emission cells and the exhaust gas introduction cells are formed by curved lines; and the exhaust gas emission cells and the second exhaust gas introduction cells each have a convex square cross section formed by four outwardly curved lines, whereas the first exhaust gas introduction cells each have a concave square cross section formed by four inwardly curved lines.

The cells adjacent to the outer wall include exhaust gas introduction cells (first exhaust gas introduction cells and the second exhaust gas introduction cells.

The honeycomb filter according to the fifth embodiment of the present invention has substantially the same features as the honeycomb filter according to the first embodiment of the present invention, except that the cross-sectional shapes of the exhaust gas emission cells, the second exhaust gas introduction cells, and the first exhaust gas introduction cells are different in the direction perpendicular to the longitudinal direction of the cells.

FIG. 15 is an end face view schematically illustrating one example of the cell arrangement at an end face of a honeycomb fired body forming the honeycomb filter according to the fifth embodiment of the present invention.

A honeycomb fired body 60 included in a honeycomb filter according to the fifth embodiment of the present invention includes exhaust gas emission cells 61, first exhaust gas introduction cells 62, cell walls 63, and second exhaust gas introduction cells 64. The exhaust gas emission cells 61 are each adjacently surrounded fully by the first exhaust gas introduction cells 62 and the second exhaust gas introduction cells 64 across the porous cell walls 63.

In the honeycomb filter 60 shown in FIG. 15, in the cross section perpendicular to the longitudinal direction of the cells, the cross-sectional area of each second exhaust gas introduction cell 64 is equal to that of each exhaust gas emission cell 61, and the cross-sectional area of each first exhaust gas introduction cell 62 is smaller than that of each second exhaust gas introduction cell 64. The cross-sectional area of each first exhaust gas introduction cell 62 is preferably 20 to 50% of the cross-sectional area of each second exhaust gas introduction cell 64.

The exhaust gas emission cells 61 and the second exhaust gas introduction cells 64 each have a convex square cross section formed by four outwardly curved lines.

Figure 16A:
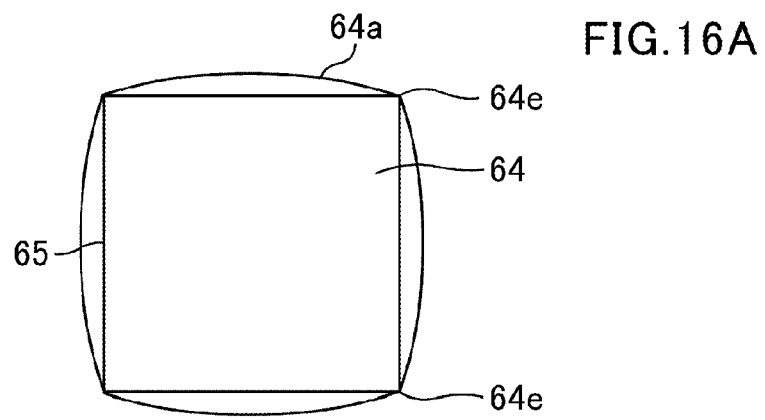
FIG. 16A is an explanatory diagram schematically illustrating one example of a convex square cell shape.
Figure 16B:
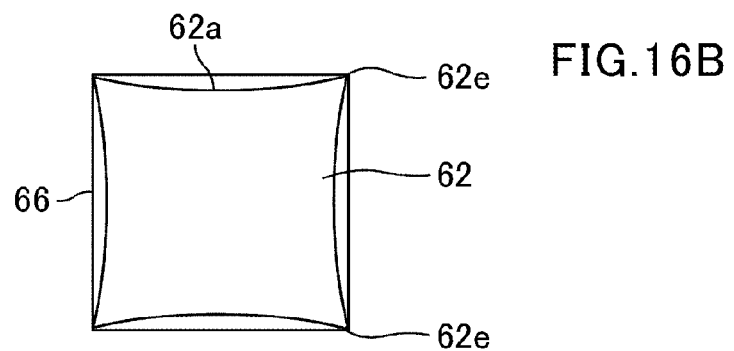
FIG. 16B is an explanatory diagram schematically illustrating one example of a concave square cell shape.
Figure 16C:
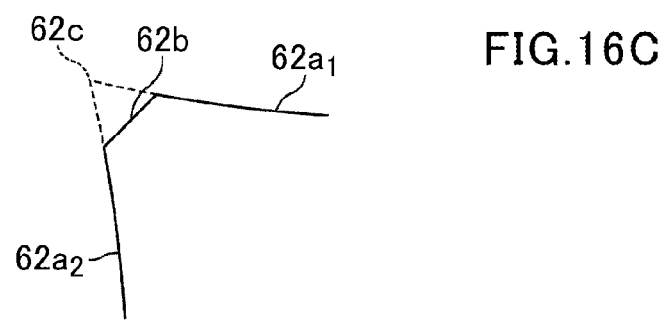
FIG. 16C is an explanatory diagram schematically illustrating one example of the concave square shape in which a vertex portion is chamfered.
Figure 16D:
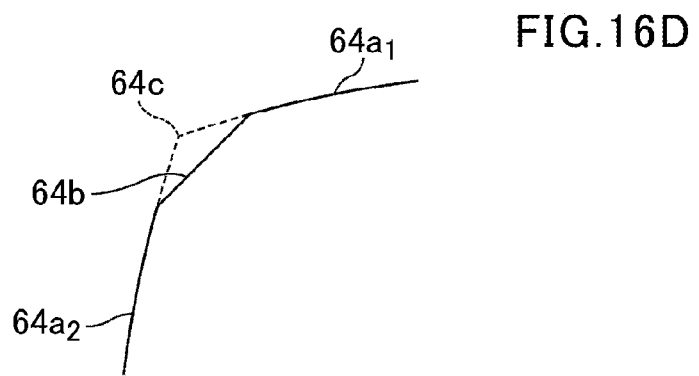
FIG. 16D is an explanatory diagram schematically illustrating one example of the convex square shape in which a vertex portion is chamfered.

FIG. 16A is an explanatory diagram schematically illustrating one example of the convex square cell shape. FIG. 16B is an explanatory diagram schematically illustrating one example of the concave square cell shape. FIG. 16C is an explanatory diagram schematically illustrating one example of the concave square shape in which a vertex portion is chamfered. FIG. 16D is an explanatory diagram schematically illustrating one example of the convex square shape in which a vertex portion is chamfered.

FIG. 16A shows a second exhaust gas introduction cell 64 having a convex square cross section, and a square 65 formed by connecting four vertices 64e of the second exhaust gas introduction cell 64.

In the explanation of the embodiments of the present invention, the convex square refers to a figure that is substantially square having four curved sides. The sides are curved outwardly from the square formed by connecting the four vertices of the substantially square figure.

FIG. 16A shows that the sides 64a forming the cross section of the second exhaust gas introduction cell 64 are curved (convex) outwardly from the centroid of the convex square toward outside the square 65.

Although FIG. 16A illustrates the cross section of the second exhaust gas introduction cell 64 as an example of the convex square cell shape, the cross section of the exhaust gas emission cell 61 is the same as that of the second exhaust gas introduction cell 64.

According to the present embodiment, in the cross section perpendicular to the longitude direction, the first exhaust gas introduction cells each have an acute angle portion that generates resistance that inhibits gas flow, whereas the second exhaust gas introduction cells each have an obtuse angle that allows easy gas flow. Thus, compared to the first embodiment, exhaust gas starts easily flows into the second exhaust gas introduction cells after only a small amount of PM accumulates on the inner cell walls each separating the first exhaust gas introduction cell and the exhaust gas emission cell. Thus, PM tends to uniformly accumulate on the inner walls of the first exhaust gas introduction cells and the inner walls of the second exhaust gas introduction cells so that the pressure loss after accumulation of a certain amount of PM can be further reduced.

The first exhaust gas introduction cells 62 each have a concave square cross section formed by four inwardly curved lines.

FIG. 16B shows a first exhaust gas introduction cell 62 having a concave square cross section, and a square 66 formed by connecting four vertices 62e of the first exhaust gas introduction cell 62.

In the explanation of the embodiments of the present invention, the concave square refers to a figure that is substantially square having four curved sides. The sides are curved inwardly (depressed) from the square formed by connecting the four vertices of the substantially square figure toward the centroid of the concave square.

FIG. 16B shows that the sides 62a forming the cross section of the first exhaust gas introduction cell 62 are curved inwardly (depressed) from the square 66 towards the centroid of the concave square.

In the explanation of the embodiments of the present invention, the convex square and the concave square include shapes that are chamfered at the vertex portions thereof.

FIG. 16C shows a shape in which a side 62a1 and a side 62a2, which are curved lines forming a concave square, are not directly connected, and the side 62a1 is connected to the side 62a2 via a chamfered portion 62b that is angularly chamfered.

In the case where the curved sides forming the concave square are connected via the chamfered portion, hypothetically extended lines of the side 62a1 and the side 62a2 are drawn, and an intersection 62c of the hypothetical curved lines is determined and defined as a vertex, as shown by dotted lines in FIG. 16C.

FIG. 16D shows a shape in which a side 64a1 and a side 64a2, which are curved lines forming a convex square, are not directly connected each other, and the side 62a1 is connected to the side 62a2 via a chamfered portion 64b that is angularly chamfered.

In the case where the curved sides forming the convex square are connected each other via the chamfered portion, hypothetically extended curved lines of the side 64a1 and the side 64a2 are drawn, and an intersection 64c of the hypothetical curved lines is determined and defined as a vertex, as shown by a dotted line in FIG. 16D.

Whether the cross section formed by curved lines is a convex square or a concave square can be determined by hypothetically drawing a square by connecting the vertices (intersections 62c or intersections 64c).

The chamfered portion is not limited to the one that is angularly chamfered, but may be one that is roundly chamfered.

In the honeycomb filter 60 of the present embodiment, the cell wall 63 separating the first exhaust gas introduction cell 62 and the exhaust gas emission cell 61 is thinner than the cell wall 63 separating the second exhaust gas introduction cell 64 and the exhaust gas emission cell 61.

The following describes the cell wall thickness in the cross section of the honeycomb filter 60 according to the fifth embodiment shown in FIG. 15 based on the above definition of the cell wall. Provided that a straight line $Z_{62}$ connecting a centroid $O_{61}$ of the exhaust gas emission cell 61 and a centroid $O_{62}$ of the first exhaust gas introduction cell 62 is drawn, then the thickness of a cell wall portion where the cell wall 63 and the straight line $Z_{62}$ overlap each other (the thickness between the side 62a and the side 61a) is defined as a thickness $X_3$. Provided that a straight line $Z_{64}$ connecting a centroid $O_{64}$ of the second exhaust gas introduction cell 64 and the centroid $O_{61}$ of the exhaust gas emission cell 61 is drawn, then the thickness of the cell wall 63 separating the second exhaust gas introduction cell 64 and the exhaust gas emission cell 61 corresponds to the thickness of a cell wall portion where the cell wall 63 and the straight line $Z_{64}$ overlap each other (the distance between a vertex 64e of the second exhaust gas introduction cell 64 and a vertex 61e of the exhaust gas emission cell 61), which is defined as a cell wall thickness $Y_3$.

In the honeycomb filter 60 of the present embodiment, the thickness $X_3$ of the cell wall 63 separating the first exhaust gas introduction cell 62 and the exhaust gas emission cell 61 is smaller than the thickness $Y_3$ of the cell wall 63 separating the second exhaust gas introduction cell 64 and the exhaust gas emission cell 61.

In the honeycomb filter 60 of the present embodiment, the thickness of the cell wall separating the first exhaust gas introduction cell 62 and the second exhaust gas introduction cell 64 may be determined in the same manner as the thickness of the cell wall separating the first exhaust gas introduction cell 62 and the exhaust gas emission cell 61.

In the honeycomb filter 60 shown in FIG. 15, the thickness of the cell wall 63 separating the first exhaust gas introduction cell 62 and the second exhaust gas introduction cell 64 is uniform and is equal to the thickness of the cell wall 63 separating the first exhaust gas introduction cell 62 and the exhaust gas emission cell 61.

The honeycomb filter according to the fifth embodiment of the present invention may be a honeycomb filter in which the thickness of the outer wall is uniform, the shape of each first exhaust gas introduction cell adjacent to the outer wall is the same as that of each first exhaust gas introduction cell not adjacent to the outer wall, and the shape of each second exhaust gas introduction cell adjacent to the outer wall is partially deformed, compared to the shape of each second exhaust gas introduction cell not adjacent to the outer wall, in accordance with the straight line along the inner walls, which forms the outer wall, of the first exhaust gas introduction cell adjacent to the outer wall.

The honeycomb filter according to the fifth embodiment of the present invention may be a honeycomb filter in which the thickness of the outer wall is uniform in accordance with the shapes of the exhaust gas introduction cells adjacent to the outer wall, and each first exhaust gas introduction cell and each second exhaust gas introduction cell adjacent to the outer wall respectively have the same shape as that of each first exhaust gas introduction cell and that of each second exhaust gas introduction cell not adjacent to the outer wall.

The honeycomb filter according to the present embodiment can be manufactured in the same manner as in the first embodiment of the present invention, except that a die having a different shape is used in the extrusion molding process.

Hereinafter, the effects of the honeycomb filter according to the fifth embodiment of the present invention are described.

In the honeycomb filter described in the first embodiment of the present invention, the side 12*a* that faces the exhaust gas emission cell 11 among the sides forming the cross-sectional shape of each first exhaust gas introduction cell 12 is characteristically longer than the side 14*a* that faces the exhaust gas emission cell 11 among the sides forming the cross-sectional shape of each second exhaust gas introduction cell 14. In contrast, in the honeycomb filter according to the fifth embodiment, the cell wall separating the first exhaust gas introduction cell and the exhaust gas emission cell is characteristically thinner than the cell wall separating the second exhaust gas introduction cell and the exhaust gas emission cell. The fifth embodiment is different in the above points from the first embodiment. Other features are substantially the same.

A thinner cell wall thickness may lead to easier passage of exhaust gas through the cell walls so that the pressure loss may be reduced. Thus, the length of the sides forming the cross sections of the cells may be considered to correspond to the thickness of the cell walls separating the cells. Hence, the honeycomb filter according to the fifth embodiment of the present invention can achieve the effects (1), (2) and (7) to (10) described in relation to the first embodiment.

Obviously, numerous modifications and variations of the present invention are possible in light of the above teachings. It is therefore to be understood that within the scope of the appended claims, the invention may be practiced otherwise than as specifically described herein.

The invention claimed is:

1. A honeycomb filter comprising:
a plurality of honeycomb fired bodies;
adhesive layers provided between the plurality of honeycomb fired bodies to combine the plurality of honeycomb fired bodies with one another, each of the plurality of honeycomb fired bodies comprising:
a plurality of cells defining exhaust gas passages, the plurality of cells including exhaust gas introduction cells and exhaust gas emission cells, the exhaust gas introduction cells each having an open end at an exhaust gas inlet side and a plugged end at an exhaust gas outlet side, the exhaust gas emission cells each having an open end at the exhaust gas outlet side and a plugged end at the exhaust gas inlet side;
porous cell walls defining the plurality of cells; and
an outer wall provided on an outer periphery of each of the plurality of honeycomb fired bodies;
the exhaust gas introduction cells and the exhaust gas emission cells each having a uniform cross-sectional shape throughout from the exhaust gas inlet side to the exhaust gas outlet side excluding a plugged portion in a cross section perpendicular to a longitudinal direction of the plurality of cells;
each of the exhaust gas emission cells being adjacently surrounded fully by the exhaust gas introduction cells across the porous cell walls; and
the plurality of cells including outer cells which are adjacent to the outer wall and which include the exhaust gas introduction cells,
wherein the exhaust gas introduction cells include first exhaust gas introduction cells and second exhaust gas introduction cells, each of the second exhaust gas introduction cells having a cross-sectional area larger than a cross-sectional area of each of the first exhaust gas introduction cells in the cross section perpendicular to the longitudinal direction of the plurality of cells,
wherein a cross-sectional area of each of the exhaust gas emission cells in the cross section perpendicular to the longitudinal direction of the plurality of cells is equal to or larger than the cross-sectional area of each of the second exhaust gas introduction cells in the cross section perpendicular to the longitudinal direction of the plurality of cells,
wherein, in the cross section perpendicular to the longitudinal direction of the plurality of cells,
the exhaust gas emission cells and the exhaust gas introduction cells have a polygonal shape, and a side facing one of the exhaust gas emission cells among sides forming a cross-sectional shape of each of the first exhaust gas introduction cells is longer than a side facing one of the exhaust gas emission cells among sides forming a cross-sectional shape of each of the second exhaust gas introduction cells, or
one of the sides forming the cross-sectional shape of each of the first exhaust gas introduction cells faces one of the exhaust gas emission cells, and none of the sides forming the cross-sectional shape of each of the second exhaust gas introduction cells faces one of the exhaust gas emission cells.

2. The honeycomb filter according to claim 1,
wherein, in the cross section perpendicular to the longitudinal direction of the plurality of cells, the exhaust gas emission cells and the exhaust gas introduction cells have the polygonal shape, and
wherein, in the cross section perpendicular to the longitudinal direction of the plurality of cells, a side facing one of the exhaust gas emission cells among the sides forming the cross-sectional shape of each of the second exhaust gas introduction cells has a length that is not more than about 0.8 times a length of a side facing one of the exhaust gas emission cells among the sides forming the cross-sectional shape of each of the first exhaust gas introduction cells.

3. The honeycomb filter according to claim 1,
wherein, in the cross section perpendicular to the longitudinal direction of the plurality of cells, the exhaust gas emission cells are octagonal, the first exhaust gas introduction cells are square, and the second exhaust gas introduction cells are octagonal.

4. The honeycomb filter according to claim 1,
wherein, in the cross section perpendicular to the longitudinal direction of the plurality of cells, the cross-sectional area of each of the second exhaust gas introduction cells is equal to the cross-sectional area of each of the exhaust gas emission cells, and the cross-sectional area of each of the first exhaust gas introduction cells is about 20 to about 50% of the cross-sectional area of each of the second exhaust gas introduction cells.

5. The honeycomb filter according to claim 3,
wherein the porous cell walls separating the plurality of cells have a uniform thickness throughout the porous cell walls.

6. The honeycomb filter according to claim 3,
wherein, in the cross section perpendicular to the longitudinal direction of the plurality of cells, the exhaust gas emission cells each have an octagonal cross section, the first exhaust gas introduction cells each have a square cross section, and the second exhaust gas introduction cells each have an octagonal cross section,
wherein, in the cross section perpendicular to the longitudinal direction of the plurality of cells, the cross-sectional shape of each of the second exhaust gas introduction cells is congruent with the cross-sectional shape of each of the exhaust gas emission cells, and
wherein, in the cross section perpendicular to the longitudinal direction of the plurality of cells, the exhaust gas emission cells, the first exhaust gas introduction cells, and the second exhaust gas introduction cells are arranged in a manner that
the exhaust gas emission cells are each surrounded by four cells of the first exhaust gas introduction cells and four cells of the second exhaust gas introduction cells across the porous cell walls, the four cells of the first exhaust gas introduction cells and the four cells of the second exhaust gas introduction cells being alternately arranged,
provided that hypothetical segments connecting centroids of octagonal cross sections of the four cells of the second exhaust gas introduction cells surrounding a reference exhaust gas emission cell of the exhaust gas emission cells are drawn, an intersection of two hypothetical segments intersecting the reference exhaust gas emission cell coincides with a centroid of an octagonal cross section of the reference exhaust gas emission cell, and
four hypothetical segments that do not intersect the reference exhaust gas emission cell form a square, and midpoints of respective sides of the square coincides with centroids of square cross sections of the four cells of the first exhaust gas introduction cells surrounding the reference exhaust gas emission cell, and
wherein, in the cross section perpendicular to the longitudinal direction of the plurality of cells, a side facing one of the first exhaust gas introduction cells across a first cell wall among sides forming the cross-sectional shape of the reference exhaust gas emission cell is parallel to a side facing the reference exhaust gas emission cell across the first cell wall among sides forming the cross-sectional shape of one of the first exhaust gas introduction cells,
wherein, in the cross section perpendicular to the longitudinal direction of the plurality of cells, a side facing one of the second exhaust gas introduction cells across a second cell wall among sides forming the cross-sectional shape of the reference exhaust gas emission cell is parallel to a side facing the reference exhaust gas emission cell across the second cell wall among the sides forming the cross-sectional shape of one of the second exhaust gas introduction cells, wherein, in the cross section perpendicular to the longitudinal direction of the plurality of cells, a side facing one of the second exhaust gas introduction cells across a third cell wall among sides forming the cross-sectional shape of one of the first exhaust gas introduction cells is parallel to a side facing one of the first exhaust gas introduction cells across the third cell wall among sides forming the cross-sectional shape of one of the second exhaust gas introduction cells, and wherein, in the cross section perpendicular to the longitudinal direction of the plurality of cells, distances between parallel sides are the same in any pair.

7. The honeycomb filter according to claim 3,
wherein, in the cross section perpendicular to the longitudinal direction of the plurality of cells, the outer wall has corner portions, and
wherein, in the cross section perpendicular to the longitudinal direction of the plurality of cells, a side contacting the outer wall among sides forming the cross-sectional shape of each of the exhaust gas introduction cells adjacent to the outer wall is straight and parallel to a side defining an outer surface of the outer wall so that a thickness of the outer wall is uniform excluding the corner portions.

8. The honeycomb filter according to claim 1,
wherein, in the cross section perpendicular to the longitudinal direction of the plurality of cells, the exhaust gas emission cells, the first exhaust gas introduction cells, and the second exhaust gas introduction cells are all square.

9. The honeycomb filter according to claim 8,
wherein, in the cross section perpendicular to the longitudinal direction of the plurality of cells, the cross-sectional area of each of the second exhaust gas introduction cells is equal to the cross-sectional area of each of the exhaust gas emission cells, and
wherein, in the cross section perpendicular to the longitudinal direction of the plurality of cells, the cross-sectional area of each of the first exhaust gas introduction cells is about 20 to about 50% of the cross-sectional area of each of the second exhaust gas introduction cells.

10. The honeycomb filter according to claim 8,
wherein, in the cross section perpendicular to the longitudinal direction of the plurality of cells, the exhaust gas emission cells each have a square cross section, the first exhaust gas introduction cells each have a square cross section, and the second exhaust gas introduction cells each have a square cross section,
wherein, in the cross section perpendicular to the longitudinal direction of the plurality of cells, the cross-sectional shape of each of the second exhaust gas introduction cells is congruent with the cross-sectional shape of each of the exhaust gas emission cells,
wherein, in the cross section perpendicular to the longitudinal direction of the plurality of cells, the exhaust gas emission cells, the first exhaust gas introduction cells, and the second exhaust gas introduction cells are arranged in a manner that
the exhaust gas emission cells are each surrounded by four cells of the first exhaust gas introduction cells and four cells of the second exhaust gas introduction cells across the porous cell walls, the four cells of the first exhaust gas introduction cells and the four cells of the second exhaust gas introduction cells being alternately arranged,
provided that hypothetical segments connecting centroids of square cross sections of the four cells of the second exhaust gas introduction cells surrounding a reference exhaust gas emission cell are drawn, an intersection of two hypothetical segments intersecting the reference exhaust gas emission cell coincides with a centroid of a square cross section of the reference exhaust gas emission cell, and
four hypothetical segments that do not intersect the reference exhaust gas emission cell form a square, and midpoints of respective sides of the square coincides with centroids of square cross sections of the four cells of the first exhaust gas introduction cells surrounding the reference exhaust gas emission cell,
wherein, in the cross section perpendicular to the longitudinal direction of the plurality of cells, a side facing one of the first exhaust gas introduction cells across a first cell wall among the sides forming the cross-sectional shape of the reference exhaust gas emission cell is parallel to a side facing the reference exhaust gas emission cell across the first cell wall among sides forming the cross-sectional shape of one of the first exhaust gas introduction cells,
wherein, in the cross section perpendicular to the longitudinal direction of the plurality of cells, a side facing one of the second exhaust gas introduction cells across a second cell wall among sides forming the cross-sectional shape of one of the first exhaust gas introduction cells is parallel to a side facing one of the first exhaust gas introduction cells across the second cell wall among sides forming the cross-sectional shape of one of the second exhaust gas introduction cells, and
wherein, in the cross section perpendicular to the longitudinal direction of the plurality of cells, distances between parallel sides are the same in any pair.

11. The honeycomb filter according to claim 8,
wherein, in the cross section perpendicular to the longitudinal direction of the plurality of cells, the outer wall has corner portions, and
wherein, in the cross section perpendicular to the longitudinal direction of the plurality of cells, the outer wall has corner portions, a side contacting the outer wall among side forming the cross-sectional area of each of the exhaust gas introduction cells adjacent to the outer wall is straight and parallel to a side defining an outer surface of the outer wall so that a thickness of the outer wall is uniform excluding the corner portions.

12. The honeycomb filter according to claim 1,
wherein, in the cross section perpendicular to the longitudinal direction of the plurality of cells, vertex portions of the polygonal shape are roundly chamfered.

13. The honeycomb filter according to claim 1,
wherein, in the cross section perpendicular to the longitudinal direction of the plurality of cells, the exhaust gas emission cells, the first exhaust gas introduction cells, and the second exhaust gas introduction cells are point-symmetrical polygons each having not more than eight sides.

14. The honeycomb filter according to claim 1,
wherein the exhaust gas introduction cells include the first exhaust gas introduction cells and the second exhaust gas introduction cells, each of the second exhaust gas introduction cells having a cross-sectional area larger than a cross-sectional area of each of the first exhaust gas introduction cells in the cross section perpendicular to the longitudinal direction of the plurality of cells,
wherein the cross-sectional area of each of the exhaust gas emission cells in the cross section perpendicular to the longitudinal direction of the plurality of cells is equal to or larger than the cross-sectional area of each of the second exhaust gas introduction cells in the cross section perpendicular to the longitudinal direction of the plurality of cells,
wherein the porous cell walls include
first porous cell walls separating the first exhaust gas introduction cells and the exhaust gas emission cells, and
second porous cell walls separating the second exhaust gas introduction cells and the exhaust gas emission cells, and
wherein, in the cross section perpendicular to the longitudinal direction of the plurality of cells, the exhaust gas introduction cells and the exhaust gas emission cells are formed by curved lines, and the first porous cell walls are thinner than the second porous cell walls.

15. The honeycomb filter according to claim 14,
wherein, in the cross section perpendicular to the longitudinal direction of the plurality of cells, the exhaust gas introduction cells and the exhaust gas emission cells are formed by curved lines, and
wherein, in the cross section perpendicular to the longitudinal direction of the plurality of cells, a thickness of the porous cell walls separating the first exhaust gas introduction cells and the exhaust gas emission cells is about 40 to about 75% of a thickness of the porous cell walls separating the second exhaust gas introduction cells and the exhaust gas emission cells.

16. The honeycomb filter according to claim 14,
wherein, in the cross section perpendicular to the longitudinal direction of the plurality of cells, the exhaust gas emission cells, the first exhaust gas introduction cells, and the second exhaust gas introduction cells are all circular.

17. The honeycomb filter according to claim 14,
wherein, in the cross section perpendicular to the longitudinal direction of the plurality of cells, the exhaust gas emission cells and the second exhaust gas introduction cells each have a convex square cross section formed by four outwardly curved lines, and
wherein, in the cross section perpendicular to the longitudinal direction of the plurality of cells, the first exhaust gas introduction cells each have a concave square cross section formed by four inwardly curved lines.

18. The honeycomb filter according to claim 14,
wherein, in the cross section perpendicular to the longitudinal direction of the plurality of cells, the cross-sectional area of each of the second exhaust gas introduction cells is equal to the cross-sectional area of each of the exhaust gas emission cells, and
wherein, in the cross section perpendicular to the longitudinal direction of the plurality of cells, the cross-sectional area of each of the first exhaust gas introduction cells is about 20 to about 50% of the cross-sectional area of each of the second exhaust gas introduction cells.

19. The honeycomb filter according to claim 1,
wherein the exhaust gas introduction cells include the first exhaust gas introduction cells and the second exhaust gas introduction cells.

20. The honeycomb filter according to claim 1,
wherein at least one of the plurality of honeycomb fired bodies includes one of silicon carbide and silicon-containing silicon carbide.

21. The honeycomb filter according to claim 1,
wherein the porous cell walls have a thickness of about 0.10 to about 0.46 mm.

22. The honeycomb filter according to claim 1,
wherein the porous cell walls have a porosity of about 40 to about 65%.

23. The honeycomb filter according to claim 1,
wherein the porous cell walls have pores having an average pore diameter of about 8 to about 25 µm.

24. The honeycomb filter according to claim 1, further comprising:
a peripheral coat layer formed on a periphery of the honeycomb filter.

25. The honeycomb filter according to claim 1,
wherein, in the cross-sectional shape perpendicular to the longitudinal direction of the plurality of cells forming the honeycomb filter, the first exhaust gas introduction cells, the second exhaust gas introduction cells, and the exhaust gas emission cells each have a uniform cross-sectional shape throughout from the end at the exhaust gas inlet side to the end at the exhaust gas outlet side excluding the plugged portion,
wherein, in the cross-sectional shape perpendicular to the longitudinal direction of the plurality of cells forming the honeycomb filter, the cross-sectional shape of each of the first exhaust gas introduction cells is different from the cross-sectional shape of each of the second exhaust gas introduction cells, and
wherein, in the cross-sectional shape perpendicular to the longitudinal direction of the plurality of cells forming the honeycomb filter, the cross-sectional shape of each of the exhaust gas emission cells is different from the cross-sectional shape of each of the first exhaust gas introduction cells.

26. The honeycomb filter according to claim 1,
wherein, in the cross section perpendicular to the longitudinal direction of the plurality of cells, a cell unit is two-dimensionally repeated, where the first exhaust gas introduction cells and the second exhaust gas introduction cells surrounding each of the exhaust gas emission cells in the cell unit are shared between adjacent cell units,
wherein, the cell unit has a cell structure such that
each of the exhaust gas emission cells is adjacently surrounded fully by the exhaust gas introduction cells across the porous cell walls,
the exhaust gas introduction cells include the first exhaust gas introduction cells and the second exhaust gas introduction cells, each of the second exhaust gas introduction cells having a cross-sectional area larger than a cross-sectional area of each of the first exhaust gas introduction cells in the cross section perpendicular to the longitudinal direction of the plurality of cells, and
the cross-sectional area of each of the exhaust gas emission cells in the cross section perpendicular to the longitudinal direction of the plurality of cells is equal to or larger than the cross-sectional area of each of the second exhaust gas introduction cells in the cross section perpendicular to the longitudinal direction of the plurality of cells, and
wherein, in the cross section perpendicular to the longitudinal direction of the plurality of cells, the exhaust gas introduction cells and the exhaust gas emission cells have one of
a first structure such that
the exhaust gas introduction cells and the exhaust gas emission cells are all polygonal, and a side facing one of the exhaust gas emission cells among sides forming the cross-sectional shape of each of the first exhaust gas introduction cells is longer than a side facing one of the exhaust gas emission cells among sides forming the cross-sectional shape of each of the second exhaust gas introduction cells, or
the exhaust gas introduction cells and the exhaust gas emission cells are all polygonal, one of sides forming the cross-sectional shape of each of the first exhaust gas introduction cells faces one of the exhaust gas emission cells, and none of sides forming the cross-sectional shape of each of the second exhaust gas introduction cells faces the exhaust gas emission cells, and
a second structure such that
the exhaust gas introduction cells and the exhaust gas emission cells are formed by curved lines,
the porous cell walls include
first porous cell walls separating the first exhaust gas introduction cells and the exhaust gas emission cells, and
second porous cell walls separating the second exhaust gas introduction cells and the exhaust gas emission cells, and
the first porous cell walls are thinner than the second porous cell walls.

* * * * *